United States Patent
Ishida et al.

(10) Patent No.: US 9,992,196 B2
(45) Date of Patent: Jun. 5, 2018

(54) INFORMATION PROCESSING DEVICE, WIRELESS COMMUNICATION SYSTEM, INFORMATION PROCESSING METHOD, AND PROGRAM

(71) Applicant: SONY CORPORATION, Tokyo (JP)

(72) Inventors: Katsuhito Ishida, Kanagawa (JP); Kento Suzuki, Kanagawa (JP); Yoichiro Sako, Tokyo (JP); Kazuyuki Sakoda, Chiba (JP); Kouichirou Ono, Tokyo (JP); Mitsuru Takehara, Tokyo (JP); Takushi Kunihiro, Tokyo (JP); Makoto Akagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 14/786,502

(22) PCT Filed: Feb. 24, 2014

(86) PCT No.: PCT/JP2014/054369
§ 371 (c)(1),
(2) Date: Oct. 22, 2015

(87) PCT Pub. No.: WO2014/178218
PCT Pub. Date: Nov. 6, 2014

(65) Prior Publication Data
US 2016/0105433 A1    Apr. 14, 2016

(30) Foreign Application Priority Data

Apr. 30, 2013  (JP) ................. 2013-095545

(51) Int. Cl.
*H04L 29/06* (2006.01)
*H04W 12/06* (2009.01)
*H04W 12/04* (2009.01)

(52) U.S. Cl.
CPC ...... *H04L 63/0869* (2013.01); *H04L 63/0876* (2013.01); *H04W 12/06* (2013.01); *H04L 63/062* (2013.01); *H04W 12/04* (2013.01)

(58) Field of Classification Search
CPC . H04L 63/0869; H04L 63/0876; H04W 12/06
USPC .......................................................... 726/7
See application file for complete search history.

(56) References Cited

U.S. PATENT DOCUMENTS

| | | | |
|---|---|---|---|
| 2010/0023755 A1* | 1/2010 | Kotani | G06F 21/33 713/156 |
| 2013/0103765 A1 | 4/2013 | Papakipos | |
| 2014/0245392 A1* | 8/2014 | Masters | G06F 21/313 726/4 |

FOREIGN PATENT DOCUMENTS

| | | |
|---|---|---|
| JP | 2006-165984 A | 6/2006 |
| JP | 2012-520014 A | 8/2012 |

* cited by examiner

*Primary Examiner* — Anthony Brown
(74) *Attorney, Agent, or Firm* — Oblon, McClelland, Maier & Neustadt, L.L.P.

(57) ABSTRACT

[Object] To propose an information processing device, wireless communication system, information processing method, and storage medium which can mutually authenticate communication partners simply and safely.
[Solution] The information processing device including: an acquisition unit configured to acquire first identification information for identifying another terminal; and a communication unit configured to transmit information for mutual authentication between an own terminal and the other terminal to the other terminal specified based on the first identification information through a network service.

18 Claims, 26 Drawing Sheets

FIG. 6

| ID TYPE | OWNER ID |
|---|---|
| 0x001e<br>(SERVICE A ACCOUNT) | @kekeke333 |
| 0x003f<br>(SERVICE B ACCOUNT) | kekek123 |
| 0x005a<br>(SERVICE A ENCRYPTION ACCOUNT) | sha61e3rlkge |
| 0x0075<br>(SERVICE B ENCRYPTION ACCOUNT) | w48tpboiwutpqw84t |
| 0x0082<br>(SERVICE A ENCRYPTION ACCOUNT FOR INTERNAL RECORD SEARCH) | sha61e3rlkge |
| 0x0156<br>(SERVICE B ENCRYPTION ACCOUNT FOR INTERNAL RECORD SEARCH) | w48tpboiwutpqw84t |

INFORMATION PROCESSING DEVICE, WIRELESS COMMUNICATION SYSTEM, INFORMATION PROCESSING METHOD, AND PROGRAM

TECHNICAL FIELD

The present disclosure relates to an information processing device, a wireless communication system, an information processing method, and a program.

BACKGROUND ART

There is a technique for performing an interconnection between communication devices such as a smartphone, for example, an ad-hoc network.

In addition, when interconnection is performed between communication devices as described above, it is possible to ensure security when communication is performed by checking whether a connection destination is a reliable partner.

CITATION LIST

Patent Literature

Patent Literature 1: JP 2012-520014T

SUMMARY OF INVENTION

Technical Problem

However, since a procedure for checking whether a connection destination is a reliable partner is complicated, there is a need to simplify a procedure for ensuring security when communication is performed.

Therefore, the present disclosure proposes a novel and improved information processing device, wireless communication system, information processing method, and storage medium which can mutually authenticate communication partners simply and safely.

Solution to Problem

According to the present disclosure, there is provided an information processing device including: an acquisition unit configured to acquire first identification information for identifying another terminal; and a communication unit configured to transmit information for mutual authentication between an own terminal and the other terminal to the other terminal specified based on the first identification information through a network service.

According to the present disclosure, there is provided a wireless communication system including: a first information processing device; and a second information processing device configured to wirelessly communicate with the first information processing device. The first information processing device includes a first communication unit configured to transmit first identification information for specifying the first information processing device to the second information processing device. The second information processing device includes an acquisition unit configured to acquire the first identification information, and a second communication unit configured to transmit information for mutual authentication between the second information processing device and the first information processing device to the first information processing device specified based on the first identification information through a network service.

According to the present disclosure, there is provided an information processing method including: acquiring first identification information for identifying another terminal; and transmitting information for mutual authentication between an own terminal and the other terminal to the other terminal specified based on the first identification information through a network service.

According to the present disclosure, there is provided a program causing a computer to execute: acquiring first identification information for identifying another terminal; and transmitting information for mutual authentication between an own terminal and the other terminal to the other terminal specified based on the first identification information through a network service.

Advantageous Effects of Invention

According to the present disclosure described above, there are provided a novel and improved information processing device, wireless communication system, information processing method, and storage medium which can mutually authenticate communication partners simply and safely.

BRIEF DESCRIPTION OF DRAWINGS

FIG. 6 is a diagram illustrating exemplary owner information.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Figure 1:
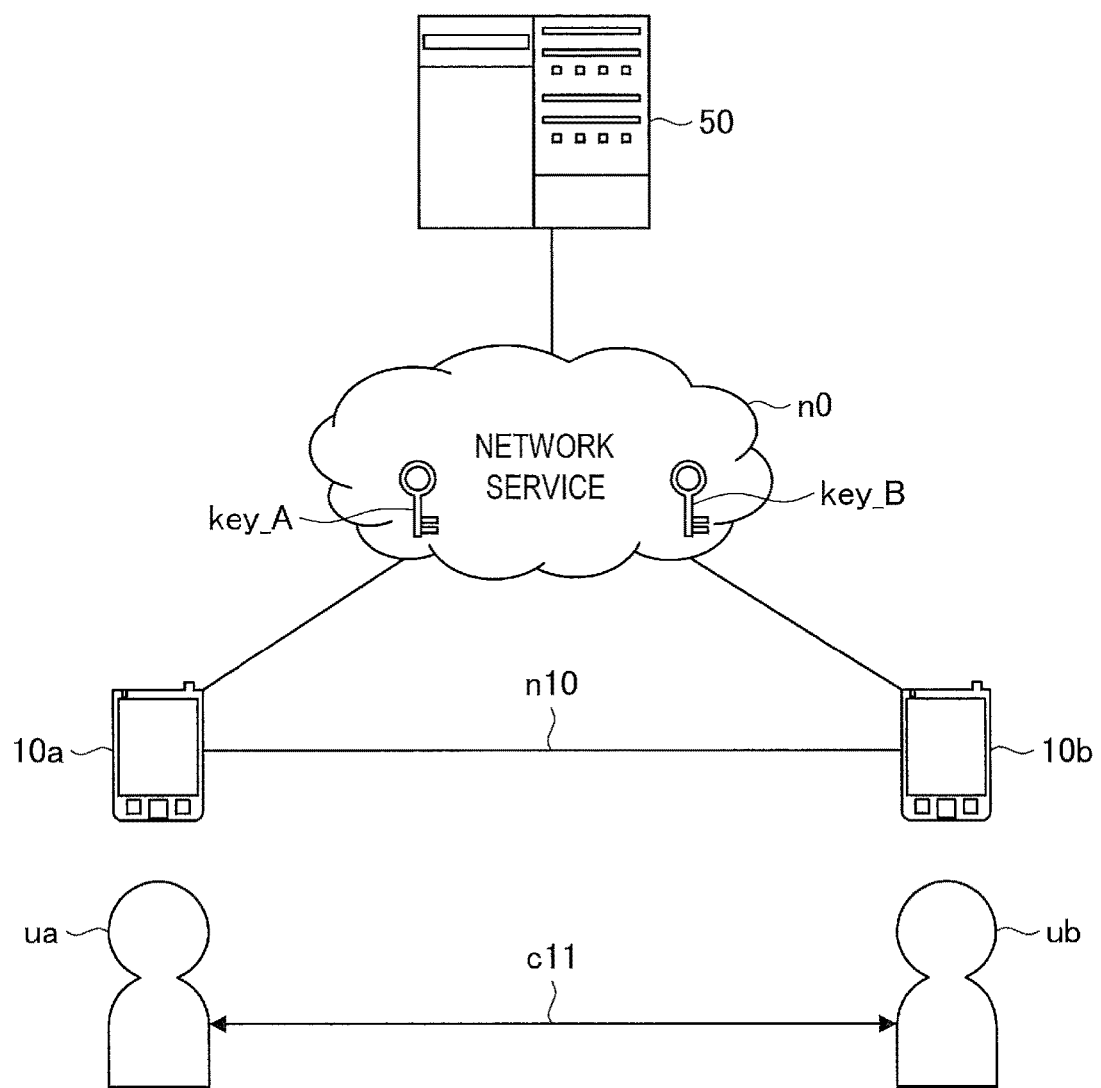
FIG. 1 is a diagram for describing a schematic configuration of a wireless communication system according to a first embodiment of the present disclosure.

Description will proceed in the following order.
1. First Embodiment
1.1. Outline of wireless communication system
1.2. Configuration of user terminal
1.3. Distribution of owner information
1.4. Communication sequences (method in which identification information is not encrypted)
1.5. Communication sequences (method in which identification information is encrypted)
1.6. Communication sequences (method using a partner key)
1.7. Conclusion
2. Second Embodiment
2.1. Outline of wireless communication system
2.2. Communication sequences (method in which identification information is not encrypted)
2.3. Communication sequences (method in which identification information is encrypted)
2.4. Communication sequences (method using a partner key)
2.5. Conclusion
3. Third Embodiment
3.1. Outline of wireless communication system
3.2. Configuration of user terminal
3.3. Conclusion 1. First Embodiment 1.1. Outline of Wireless Communication System First, an outline of a communication system according to the first embodiment of the present disclosure will be described with reference to FIG. 1. FIG. 1 is a diagram for describing a schematic configuration of the wireless communication system according to the embodiment.

As illustrated in FIG. 1, the wireless communication system according to the embodiment includes a server 50, a network service n0, and user terminals 10a and 10b. The user terminals 10a and 10b are terminals (information processing devices) capable of performing wireless communication such as smartphones. The user terminal 10a is a terminal that is operated by a user ua. The user terminal 10b is a terminal that is operated by a user ub. Also, when the user terminals 10a and 10b are not particularly distinguished, they will be simply described below as a "user terminal 10" in some cases.

In addition, the network service n0 is a network service that is provided by the server 50 via a network such as the Internet. As a specific example, a social networking service (SNS) is exemplified.

The wireless communication system according to the embodiment provides a unit configured to check whether a connection destination is a reliable partner in order to ensure security when communication is performed to establish a connection (interconnection) n10 (for example, an ad-hoc network) between the user terminal 10a and the user terminal 10b. Therefore, communication (interconnection) between the user terminals 10 such as the ad-hoc network will be simply described below, and problems will be organized. Then, the wireless communication system according to the embodiment will be described.

Figure 2:
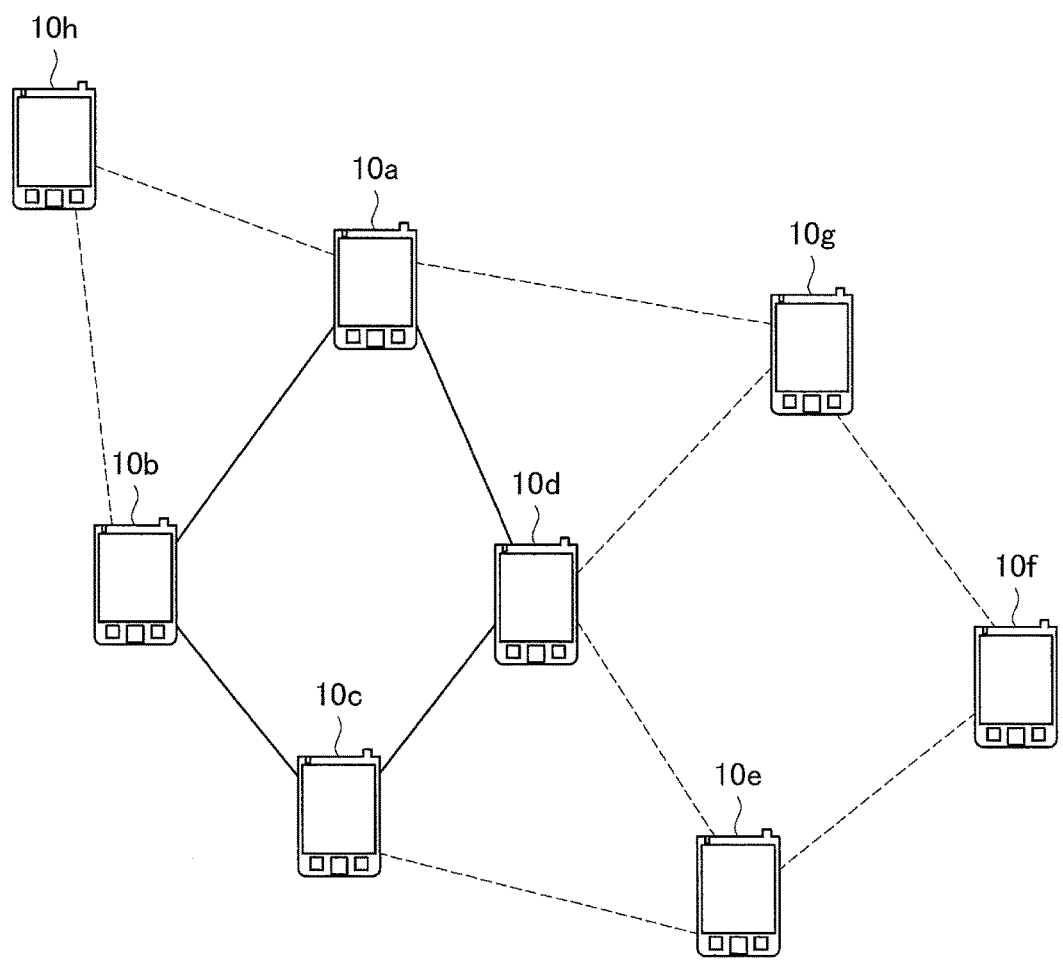
FIG. 2 is a diagram for describing communication between user terminals according to the embodiment.

First, a summary of the ad-hoc network will be described with reference to FIG. 2. FIG. 2 is a diagram for describing communication between the user terminals 10 according to the embodiment. The ad-hoc network uses a technique that enables communication between the user terminals 10 by performing autonomous routing between the adjacent user terminals 10 without depending on infrastructure facilities such as a base station or a fixed network connecting base stations.

In the ad-hoc network, for example, even if the user terminals 10a and 10b are not directly connected when the user terminal 10a and the user terminal 10b perform communication, it is possible to perform communication (that is, multi-hop communication) by relaying another user terminal 10 in the ad-hoc network. For example, as exemplified in FIG. 2, even when the user terminals 10b and 10d do not have a positional relation in which direct communication is possible (for example, when radio waves do not reach directly), the user terminal 10a or 10c interposed between the user terminals 10b and 10d can serve as a repeater.

Each of the user terminals 10 can execute a predetermined procedure (process) to appropriately participate in the ad-hoc network that has already been built. For example, in the example illustrated in FIG. 2, the user terminals 10a to 10d build the ad-hoc network. In this case, the other user terminals 10e to 10h can participate in the ad-hoc network that is built by the user terminals 10a to 10d as illustrated in FIG. 2. When a new user terminal 10 participates in the ad-hoc network that has already been built in this manner, a communicable range via the ad-hoc network extends to an extent that the newly participated user terminal 10 can communicate. As a specific example, it is assumed that the user terminal 10f is unable to directly access the ad-hoc network built by the user terminals 10a to 10d. Even in such a case, for example, when the user terminal 10e or 10g participates in the ad-hoc network, the user terminal 10f can access the ad-hoc network through the user terminal 10e or 10g.

In this manner, in the ad-hoc network, for example, even when the user terminals 10b and 10d perform communication, the user terminals 10b and 10d do not necessarily perform direct communication. Therefore, when secure communication is performed via the ad-hoc network, it is necessary to check whether the connection destination is a reliable partner. However, since a procedure for checking whether the connection destination is a reliable partner is complicated, there is a need to simplify a procedure for ensuring security when communication is performed. Therefore, the present embodiment proposes a wireless communication system capable of ensuring security simply and safely when communication is performed.

Here, referring again to FIG. 1, in the wireless communication system according to the embodiment, each of the user terminals 10 determines whether the user terminal 10 of the connection destination is a reliable partner based on whether itself and the user terminal 10 of the connection destination are associated in the network service n0.

Specifically, for example, in the network service n0 such as social networking, based on information indicating whether user relationships designated by each user are friendship, an account (hereinafter referred to as a "user ID") of each user is associated. The association between user IDs is called a social graph in some cases. By utilizing this social graph, for example, when a relation c11 between the user ua and the user ub is friendship in the network service n0 (that is, when the user ua and the user ub are associated), the user terminal 10a can acquire information that is registered in the network service n0 by the user ub.

Therefore, in the wireless communication system according to the embodiment, for example, when the users ua and ub are associated in the network service n0, the user terminals 10a and 10b of the users ua and ub determine that partners can rely on each other. Also, when partners can rely on each other, the user terminals 10a and 10b send an encryption key for encryption through the social graph in the network service n0 to each other when mutual communication is performed.

Specifically, the user terminals 10a and 10b generate (or acquire) an encryption key for encrypting data and a decryption key for decryption when the user terminals communicate with each other, and enable the encryption key to be managed in the network service n0. For example, in the example of FIG. 1, encryption keys key_A and key_B created in the user terminals 10a and 10b, respectively, are managed in the network service n0. In such a configuration, when the users ua and ub are associated in the network service n0 (the relation c11), for example, the user terminal 10a can acquire the encryption key key_B managed in the network service n0 through the social graph. In addition, when the users ua and ub are not associated in the network service n0, the user terminal 10a is unable to specify the user ub in the network service n0. As a result, it may be impossible to acquire the encryption key key_B.

In addition, the network service n0 according to the embodiment manages a service-specific encryption key and decryption key. The network service n0 provides the service-specific encryption key (hereinafter referred to as an "encryption key key_S") to a user terminal of a user who can use the network service n0. In addition, the network service n0 has a function of decrypting data encrypted with the encryption key key_S for a user (that is, a user who possesses the user ID of the network service n0) who is accessible the service. Accordingly, it is possible to perform encrypted communication using the service-specific encryption key key_S between users who can use the network service n0. Also, details of communication using the service-specific encryption key key_S will be separately described below.

In such a configuration, in the wireless communication system according to the embodiment, each of the user terminals 10 determines whether a partner is reliable through the social graph in the network service n0, and can acquire an encryption key for performing communication with the partner based on the determination result. Therefore, users of the respective user terminals 10 can perform secure communication between the user terminals 10 without complicated procedures. Hereinafter, the wireless communication system according to the embodiment will be described in detail.

1.2 Configuration of User Terminal

Figure 3:
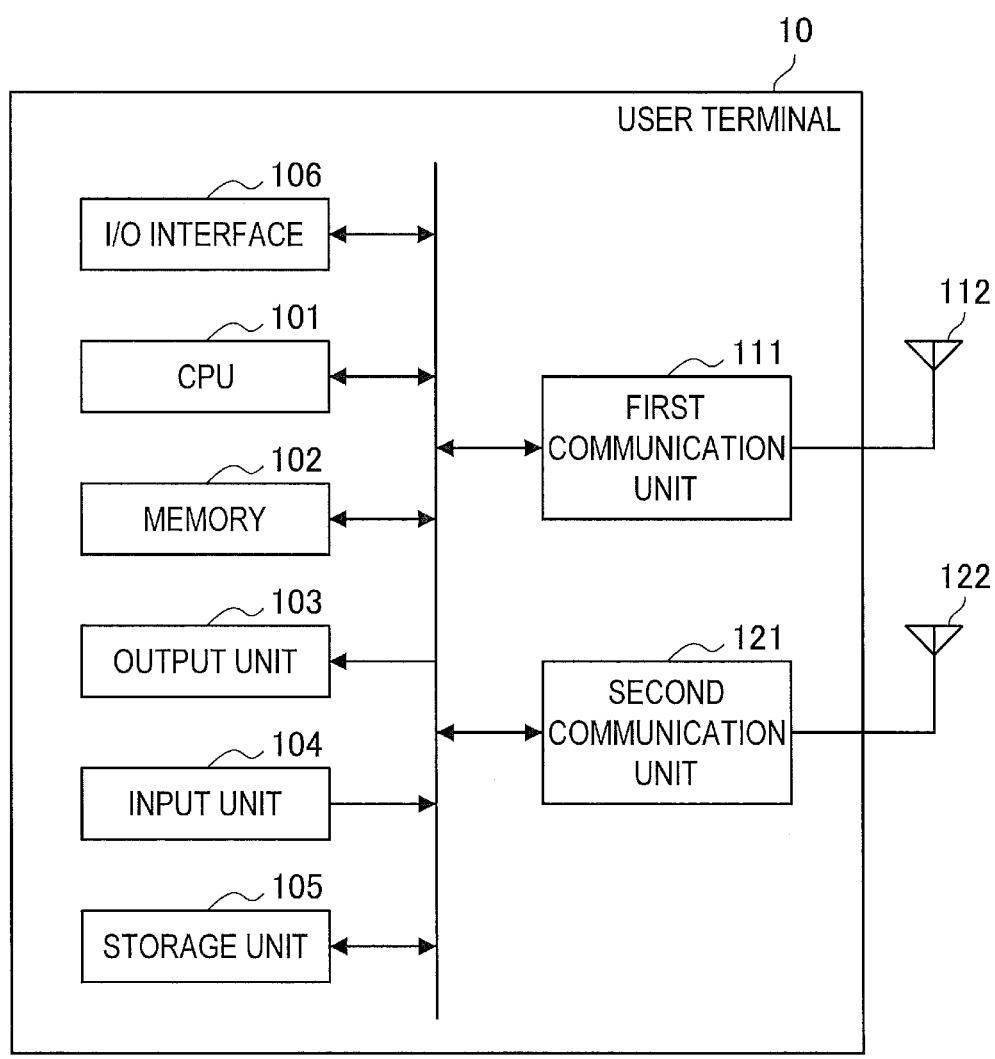
FIG. 3 is a diagram schematically illustrating an exemplary hardware configuration of a user terminal according to the embodiment.

First, a hardware configuration of the user terminal 10 will be described with reference to FIG. 3. FIG. 3 is a diagram schematically illustrating an exemplary hardware configuration of a user terminal according to the embodiment. As illustrated in FIG. 3, the user terminal 10 includes a CPU 101, a memory 102, an output unit 103, an input unit 104, a storage unit 105, an I/O interface 106, a first communication unit 111, a first communication antenna 112, a second communication unit 121, and a second communication antenna 122.

The CPU 101 functions as an arithmetic processing device and a control device, and controls overall operations of the user terminal 10 according to various programs. In addition, the CPU 101 may be a microprocessor. This CPU 101 can implement various functions according to various programs.

The memory 102 is configured by a read only memory (ROM) or a random access memory (RAM). The ROM can store programs, computation parameters or the like that can be used by the CPU 101. The RAM can temporarily store a program that is used to execute the CPU 101, parameters that are appropriately changed during execution thereof, and the like.

The output unit 103 is an example of an output device, and may be a display device such as a liquid crystal display (LCD) device or an organic light emitting diode (OLED) display device. The output unit 103 can provide information by displaying a screen for the user.

The input unit 104 has a function of generating an input signal for the user to perform a desired operation. The input unit 104 may include an input unit configured for a user to input information, for example, a touch sensor, a mouse, a keyboard, a button, a microphone, a switch and a lever, and an input control circuit configured to generate an input signal based on the user input and output the signal to the CPU 101.

The storage unit 105 is a device for storing data, and can include a storage medium, a recording device for recording data in the storage medium, a reading device for reading data from the storage medium, and a deleting device for deleting data recorded in the storage medium. Here, examples of the storage medium may include a non-volatile memory such as a flash memory, a magnetoresistive random access memory (MRAM), a ferroelectric random access memory (FeRAM), a phase change random access memory (PRAM) and an electronically erasable and programmable read only memory (EEPROM), and a magnetic recording medium such as a hard disk drive (HDD).

The I/O interface 106 is an interface that connects an external device, for example, an actuator such as the display device or a sensor in which key input is possible, and transmits and receives a signal with the connected external devices. The I/O interface 106 can supply the signal from the connected external device to the CPU 101. In addition, the I/O interface 106 can supply the signal from the CPU 101 to the connected external device.

The first communication antenna 112 and the second communication antenna 122 are antennas having a function of transmitting and receiving a communication signal via, for example, a mobile communication network or a wireless local area network (LAN) communication network. The first communication antenna 112 can supply the received signal to the first communication unit 111. In addition, the first communication antenna 112 may transmit the signal from the first communication unit 111 to other communication devices via the mobile communication network or the wireless LAN communication network. Similarly, the second communication antenna 122 can supply the received signal to the second communication unit 121. In addition, the second communication antenna 122 may transmit the signal from the second communication unit 121 to other communication devices via a mobile communication network or a wireless LAN communication network.

The first communication unit 111 has a function of performing various types of signal processing on the signal supplied from the first communication antenna 112. The first communication unit 111 can supply a digital signal that is generated from a supplied analog signal to the CPU 101. Similarly, the second communication unit 121 has a function of performing various types of signal processing on the signal supplied from the second communication antenna 122. The second communication unit 121 can supply a digital signal that is generated from the supplied analog signal to the CPU 101.

Also, it will be described below that the first communication unit 111 and the first communication antenna 112 are used by the user terminal 10 in order to communicate with other communication devices through infrastructure facilities, for example, a mobile communication network (for example, a base station and a fixed network connecting base stations). In addition, it will be described that the second communication unit 121 and the second communication antenna 122 are used by the user terminal 10 in order to interconnect (in other words, in order to build the ad-hoc network) with another user terminal 10.

Also, the above-described hardware configuration is an example, and as long as operations of the user terminal 10 according to the embodiment to be described below can be implemented, the hardware configuration of the user terminal 10 is not limited to the above configuration. For example, the first communication unit 111 and the first communication antenna 112, and the second communication unit 121 and the second communication antenna 122 need not be separately provided but either may concurrently perform both roles.

Next, a configuration of the user terminal 10 according to the embodiment will be described. In the wireless communication system according to the embodiment, in order for the plurality of user terminals 10 to determine whether partners can rely on each other, one user terminal 10 receives identification information for identifying a partner in the network service n0 from the other user terminal 10. The identification information may include, for example, the user ID in the network service n0 of the user of the user terminal 10 or an ID (hereinafter referred to as a "device ID") uniquely specifying the user terminal 10. Hereinafter, in an example in which the user terminals 10a and 10b communicate with each other, the user terminal 10b will be described as a transmission side of identification information, and the user terminal 10a will be described as a reception side of identification information. Also, details of information included in identification information and a difference of processes according to a difference of information included in identification information will be separately described below. In addition, the identification information corresponds to an example of "first identification information" and "second identification information."

(The User Terminal 10 at a Side from which Identification Information is Transmitted)

Figure 4:
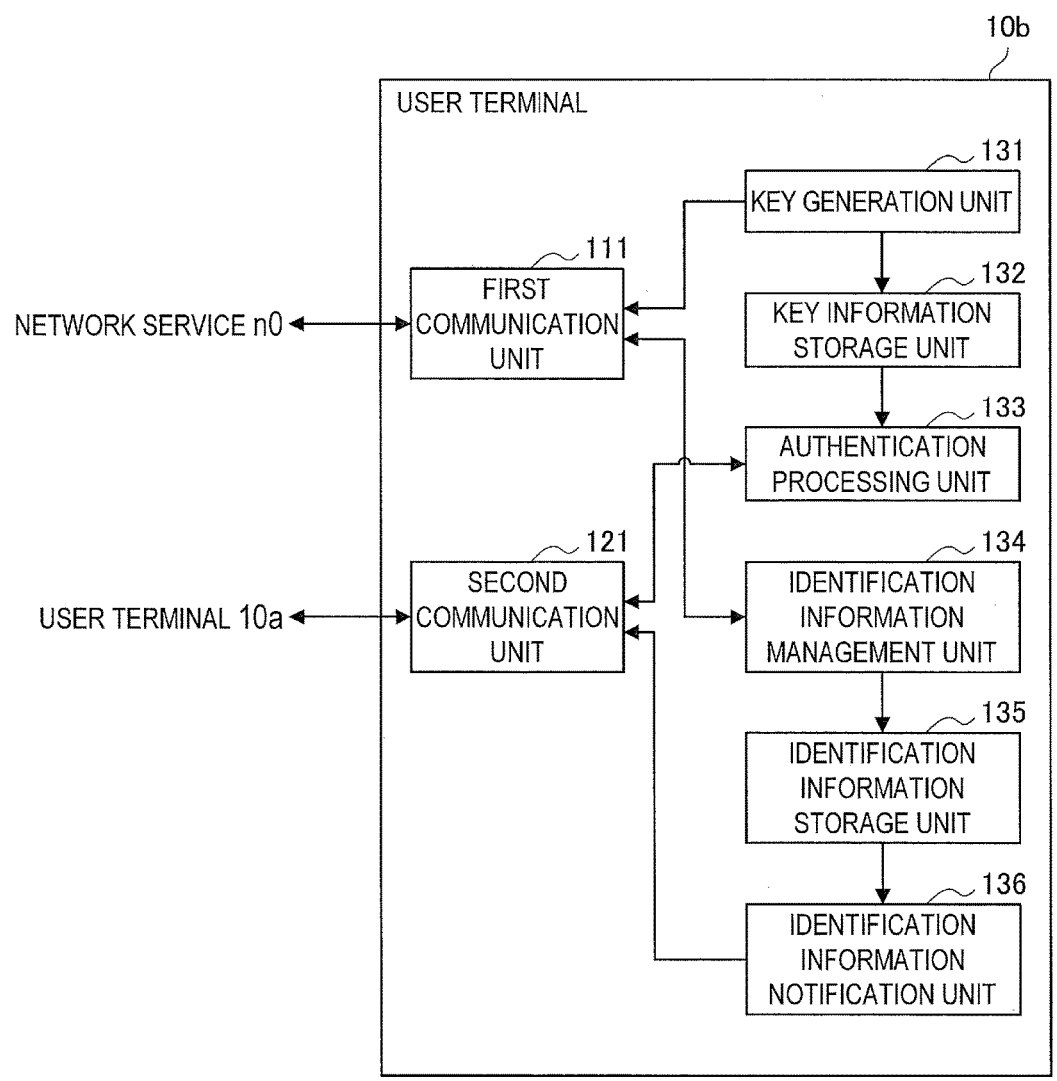
FIG. 4 is a block diagram illustrating a configuration of the user terminal according to the embodiment.

First, a configuration of the user terminal 10b at a side from which identification information is transmitted will be described with reference to FIG. 4. FIG. 4 is a block diagram illustrating a configuration of the user terminal 10b according to the embodiment and illustrates an exemplary configuration of the user terminal 10b at a side from which identification information is transmitted. As illustrated in FIG. 4, the user terminal 10b includes the first communication unit 111, the second communication unit 121, a key generation unit 131, a key information storage unit 132, an authentication processing unit 133, an identification information management unit 134, an identification information storage unit 135, and an identification information notification unit 136. In addition, the user terminal 10 (which will be described below) at a side from which identification information is transmitted may also be operated as "a user terminal 10 at a side on which identification information is received" (which will be described below). In this case, it is needless to say that the user terminal 10 includes respective components of the user terminal 10 at a side on which identification information is received" (which will be described below).

The first communication unit 111 is used for respective components in the user terminal 10b to communicate with other communication devices through infrastructure facilities such as a mobile communication network. Also, in FIG. 4, the first communication antenna 112 is not illustrated. In the wireless communication system according to the embodiment, the respective components in the user terminal 10b access the network service n0 through the first communication unit 111. Also, when the respective components in the user terminal 10b transmit and receive data to and from the network service n0, unless otherwise specified, it is assumed below that data is transmitted and received through the first communication unit 111.

The second communication unit 121 is used for the respective components in the user terminal 10b to interconnect with another user terminal 10 (for example, the user terminal 10a). Also, in FIG. 4, the second communication antenna 122 is not illustrated. When the user terminals 10a and 10b build the ad-hoc network, the respective components in the user terminal 10b access the user terminal 10a through the second communication unit 121. Also, when the respective components in the user terminal 10b transmit and receive data to and from another user terminal (for example, the user terminal 10a), unless otherwise specified, it is assumed below that data is transmitted and received through the second communication unit 121.

When the user terminal 10b communicates with another user terminal, the key generation unit 131 generates an encryption key for encrypting data and a decryption key for decrypting the data. As a specific example, the key generation unit 131 may generate an encryption key (public key) and a decryption key (secret key) used in public-key cryptography. Also, the key generation unit 131 may acquire an encryption key and a decryption key that are generated externally without generating the encryption key and the decryption key itself. Also, the generated encryption key corresponds to an example of a "first encryption key" and a "second encryption key." Similarly, the generated decryption key corresponds to an example of a "first decryption key" and a "second decryption key."

The key generation unit 131 stores the decryption key between the generated encryption key and decryption key in the key information storage unit 132. The key information storage unit 132 is a storage unit for storing the decryption key. In addition, the key generation unit 131 may also store the encryption key in the key information storage unit 132. In this manner, the key information storage unit 132 stores information for performing encryption or decryption.

In addition, the key generation unit 131 transmits the encryption key between the generated encryption key and decryption key to the network service n0 in association with identification information for specifying the user terminal 10b in the network service n0. The encryption key transmitted to the network service n0 corresponds to the encryption key key_B. Also, the identification information for specifying the user terminal 10b may be, for example, the user ID for specifying the user ub of the user terminal 10b. In addition, as another example, the identification information may be the device ID that can uniquely specify the user terminal 10b such as a MAC address. In addition, as long as the device ID can uniquely specify the user terminal 10b in the network service n0, the MAC address is not necessarily used. For example, information generated for uniquely specifying the user terminal 10b in the network service n0 may be used.

In addition, identification information includes both the user ID and the device ID, and a combination of the user ID and the device ID may be used. When the user ID and the device ID are combined, if, for example, one user properly uses a plurality of user terminals 10, it is possible to uniquely specify a user terminal 10 that is used by the user. For example, FIG. 5 is a diagram illustrating an exemplary association between the user terminals 10 in the network service n0 and illustrates an example in which the users ua and ub properly use the plurality of user terminals 10.

Figure 5:
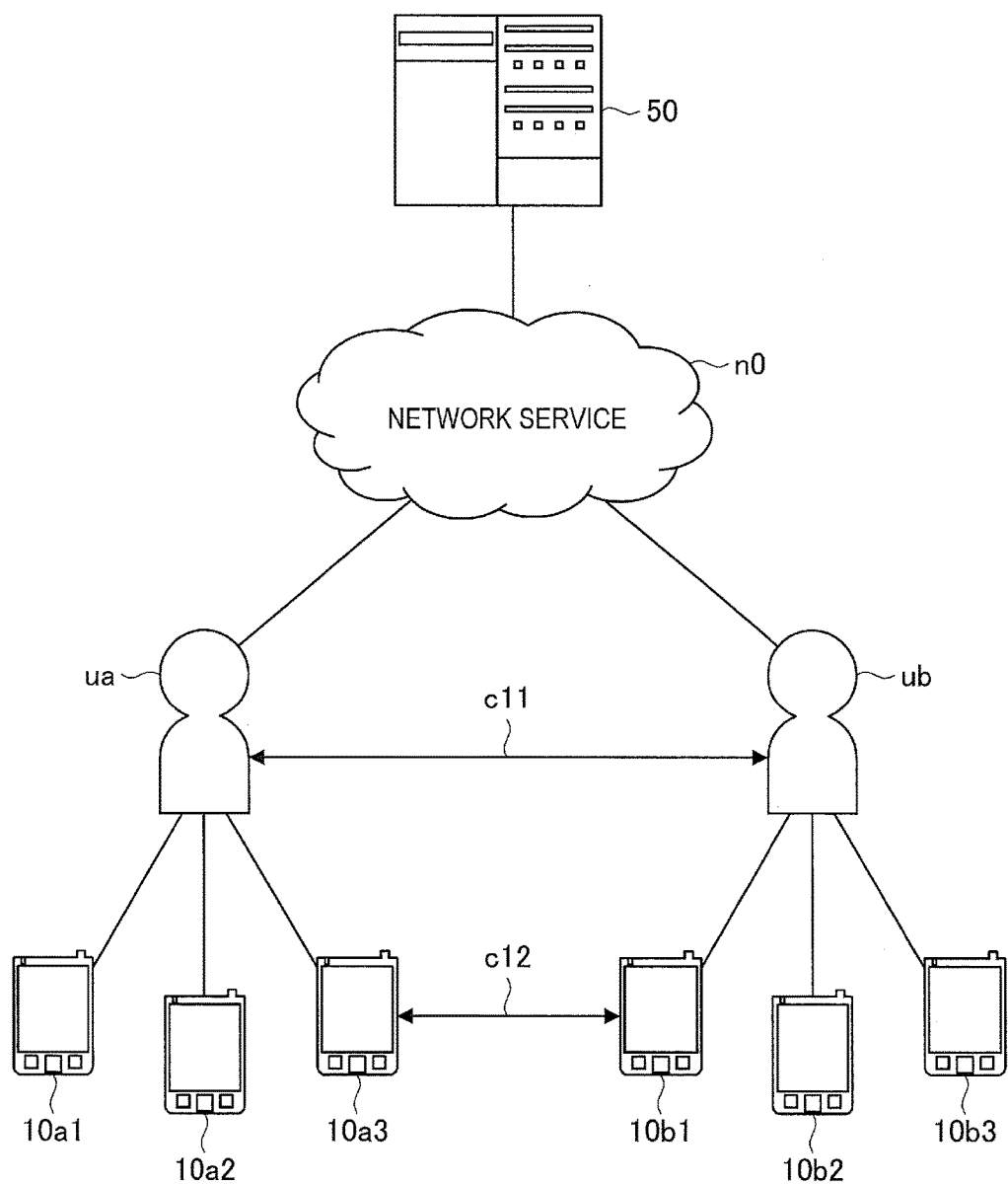
FIG. 5 is a diagram illustrating an exemplary association between user terminals in a network service.

In the example illustrated in FIG. 5, the user ua possesses user terminals 10a1 to 10a3, switches the user terminals, and uses the network service n0. In addition, the user ub possesses user terminals 10b1 to 10b3, switches the user terminals, and uses the network service n0. In this case, when the user terminals 10 used by the users ua and ub need to be specified, it is difficult to uniquely specify them using only a relation c11 between the users ua and ub.

On the other hand, when the device ID of the user terminal 10 that is used by each user is associated with the user IDs of the users ua and ub in the network service n0, it is possible to uniquely specify the user terminal 10 that is used by each user. As a specific example, the user ua associates the device ID of the user terminal 10a3 with his or her own user ID. Similarly, the user ub associates the device ID of the user terminal 10b1 with his or her own user ID. Accordingly, for example, the user terminal 10a3 of the user ua can specify the user terminal 10b1 of the user ub through the social graph in the network service n0. That is, even when the users ua and ub each use the plurality of user terminals 10, for example, as indicated by a reference numeral c12 of FIG. 5, it is possible to associate the user terminal 10a3 with the user terminal 10b1 in the network service n0. Also, an example in which identification information includes both the user ID and the device ID will be described below.

The identification information management unit 134 acquires the user ID in the network service n0 of the user (for example, the user ub) who operates the user terminal 10b, and stores the acquired user ID in the identification information storage unit 135 as owner information d10. The identification information storage unit 135 is a storage unit for storing the owner information d10. Operations of the identification information management unit 134 and details of the owner information d10 will be described below.

The identification information management unit 134 stores the user ID that is input when the user ub logs in to the network service n0 in association with an ID type indicating to which network service n0 the user ID belongs in the identification information storage unit 135 as the owner information d10. Identification information (the user ID) and an ID type d110 set in the owner information d10 stored in the identification information storage unit 135 are transmitted to another user terminal 10 (for example, the user terminal 10a) by the identification information notification unit 136 to be described below. Accordingly, the user terminal 10 that has received the identification information (the user ID) and the ID type d110 can specify the network service n0 by the ID type d110. In addition, the user terminal 10 can search for the acquired identification information (the user ID) through the social graph of the specified network service n0.

Also, although details will be described below, in the wireless communication system according to the embodiment, it is configured such that encryption of the user ID to be transmitted for mutual authentication is selectable. Hereinafter, in some cases, a method in which mutual authentication is performed by encrypting the user ID is called a "method in which identification information is encrypted," and a method in which mutual authentication is performed without encrypting the user ID is called a "method in which identification information is not encrypted." In addition, in the wireless communication system according to the embodiment, when the encryption key (for example, the public key) has already been exchanged between the user terminals 10, the user ID is encrypted using the encryption key of the partner. Therefore, it is configured such that a mutual authentication method without passing through the network service n0 is selectable. Also, the method in which the user ID is encrypted using the encryption key of the partner to perform mutual authentication is called a "method using a partner key" below.

As the mutual authentication method according to which one is selected from among the "method in which identification information is encrypted," the "method in which identification information is not encrypted," and the "method using a partner key," an aspect of the user ID included in the owner information d10, that is, whether the user ID is encrypted, is different. However, when the ID type d110 can identify only a difference of the network service n0, it is difficult for the user terminal 10 serving as the connection destination to recognize which of the above-described mutual authentication methods can be used by the user terminal 10b.

Therefore, the identification information management unit 134 generates an ID type included in the owner information d10 such that a difference of the above-described mutual authentication methods can also be identified in addition to a difference of the network service n0. Specifically, the identification information management unit 134 generates different information as an ID type when the mutual authentication method is different even in the user ID of the same network service n0. In such a configuration, according to the ID type, the other user terminal 10 can recognize a network service n0 in which the user ub of the user terminal 10b can be searched for through a social graph thereof and which mutual authentication method can be used.

Also, when the user ID is encrypted, it is possible to encrypt the user ID with, for example, the encryption key key_S provided by the network service n0. In this case, when the user of the user terminal 10 serving as the connection destination is a user of the network service n0 that provides the encryption key key_S, it is possible to decrypt the encrypted user ID. It will be described below that encryption is performed with the encryption key key_S provided by the network service n0 when the user ID is encrypted.

Details of the owner information d10 will be described below with reference to FIG. 6. FIG. 6 is a diagram illustrating an example of the owner information d10. Also, details of the above-described mutual authentication methods will be provided below in "1.4. Communication sequences (method in which identification information is not encrypted)," "1.5. Communication sequences (method in which identification information is encrypted)," and "1.6. Communication sequences (method using a partner key)."

As illustrated in FIG. 6, the owner information d10 includes the ID type d110, and an owner ID d120. The ID type d110 is information for identifying a difference of the network service n0, whether the user ID is encrypted, and a difference of the mutual authentication method. For example, a reference numeral d11 indicates the owner information d10 (hereinafter referred to as "owner information d11") when the user ID is not encrypted. In addition, a reference numeral d13 indicates the owner information d10 (hereinafter referred to as "owner information d13") when the user ID is encrypted. In addition, a reference numeral d15 indicates the owner information d10 (hereinafter referred to as "owner information d15") when use of the mutual authentication method in which the user ID is encrypted using an encryption key of a partner and transmitted and received is permitted if the encryption key (for example, the public key) has already been exchanged between the user terminals 10.

In addition, the owner ID d120 indicates the user ID of the network service n0 indicated by the ID type. Also, in the owner ID d120, when the ID type d110 indicates encryption of the user ID, the user ID encrypted with the encryption key key_S is set, and when the ID type d110 does not indicate encryption of the user ID, the user ID that is not encrypted is set.

As a specific example, the owner information d11 whose ID type d110 is "0x003f" indicates that the network service n0 is a "service B," and the user terminal 10 corresponds to a "method in which a user ID is not encrypted." That is, when the ID type 110 is "0x003f," it indicates that the owner ID d120 is an account (a user ID) of a service B that is not encrypted. In this case, the identification information management unit 134 sets "kekek123" in the owner ID d120 as the user ID of the "service B" that is not encrypted. Also, the ID type d110 indicating the "method in which a user ID is not encrypted" will be simply referred to as an "account" and an "account" of the "service B" will be referred to as a "service B account" below in some cases.

In addition, owner information d12 whose ID type d110 is "0x005a" indicates that the network service n0 is a "service A" and the user terminal 10 corresponds to a "method in which a user ID is encrypted." That is, when the ID type D110 is "0x005a," the owner ID d120 indicates an account (a user ID) of an encrypted service A. In this case, the identification information management unit 134 sets "sha6le3rlkge" in the owner ID d120 as the user ID of the encrypted "service A." Also, the ID type d110 indicating the "method in which a user ID is encrypted" will be referred to as an "encryption account" and an "encryption account" of the "service A" will be referred to as a "service A encryption account" below in some cases.

In addition, owner information d13 whose ID type d110 is "0x0156" indicates that the network service n0 is the "service B" and the user terminal 10 corresponds to a "method using a partner key." That is, when the ID type d110 is "0x0156," it indicates that, when the encryption key (public key) has already been exchanged with the user terminal 10b, authentication using each other's encryption keys is permitted in the user terminal 10b. In this case, the identification information management unit 134 sets "w48tpboiwutpqw84t" in the owner ID d120 as the user ID of the encrypted "service B." Also, the ID type d110 indicating the "method using a partner key" will be referred to as an "encryption account for internal record search" and an "encryption account for internal record search" of the "service B" will be referred to as a "service B encryption account for internal record search" below in some cases.

Also, the identification information management unit 134 may determine which of the "method in which a user ID is encrypted," the "method in which a user ID is not encrypted," and the "method using a partner key" is selected based on input by the user ub of the user terminal 10b. In addition, as another example, which of the "method in which a user ID is encrypted," the "method in which a user ID is not encrypted," and the "method using a partner key" is used may be set in advance.

The identification information management unit 134 generates the owner information d10 corresponding to a method that is selected from among the "method in which a user ID is encrypted," the "method in which a user ID is not encrypted," and the "method using a partner key," and stores the generated owner information d10 in the identification information storage unit 135. Also, as the mutual authentication method, at least one of the "method in which a user ID is encrypted" and the "method in which a user ID is not encrypted" may be selected.

In addition, the identification information storage unit 135 may use a non-volatile storage medium or a volatile storage medium. When the identification information storage unit 135 uses the volatile storage medium, it is needless to say that the owner information d10 stored in the identification information storage unit 135 is deleted when the user terminal 10b stops. On the other hand, when the identification information storage unit 135 uses the non-volatile storage medium, the owner information d10 stored in the identification information storage unit 135 is not deleted even when the user terminal 10b stops. Therefore, the identification information management unit 134 may delete the owner information d10 stored in the identification information storage unit 135.

The identification information notification unit 136 reads the owner information d10 from the identification information storage unit 135, and distributes the read owner information d10 to another user terminal 10. Accordingly, the other user terminal 10 can recognize the user ID of the user ub who is a user of the user terminal 10b, a network service n0 to which the user ID belongs, and whether the user ID is encrypted. In addition, the other user terminal 10 can recognize which of the "method in which a user ID is encrypted," the "method in which a user ID is not encrypted," and the "method using a partner key" the user terminal 10b permits as the mutual authentication method based on the distributed owner information d10. Also, the identification information notification unit 136 may broadcast the owner information d10 to a plurality of other unspecified user terminals 10 near the user terminal 10b or unicast the owner information d10 to a specified user terminal 10. A method of the identification information notification unit 136 distributing owner information will be separately described below in detail.

In addition, for example, when the encryption key key_A of the user terminal 10a has already been acquired, the identification information notification unit 136 may encrypt the owner information d10 with the encryption key key_A, and unicast the encrypted owner information d10 to the user terminal 10a. The ID type d110 in this case may be an "encryption account for internal record search." Also, when the user terminal 10b acquires the encryption key key_A of the user terminal 10a, for example, the user terminal 10b may be operated as the user terminal 10 (which will be described below) at a side on which identification information is received.

In addition, the identification information notification unit 136 may notify the other user terminal 10 of the device ID for specifying the user terminal 10b. In this case, the identification information notification unit 136 may encrypt the device ID. When the device ID is encrypted, the identification information notification unit 136 may encrypt the device ID with the encryption key that is used to encrypt the user ID.

The authentication processing unit 133 executes a process for mutual authentication with the user terminal 10 (for example, the user terminal 10a) of the connection destination. As a specific example of the process for mutual authentication, wired equivalent privacy (WEP), Wi-Fi protected access (WPA), WPA2 and the like are known. The specific example of the process for mutual authentication by the authentication processing unit 133 will be separately described below.

In addition, when data acquired from the other user terminal 10 of the connection destination is encrypted with the encryption key key_B generated in the key generation unit 131, the authentication processing unit 133 decrypts the data with the decryption key stored in the key information storage unit 132.

(The User Terminal 10 at a Side on which Identification Information is Received)

Figure 7:
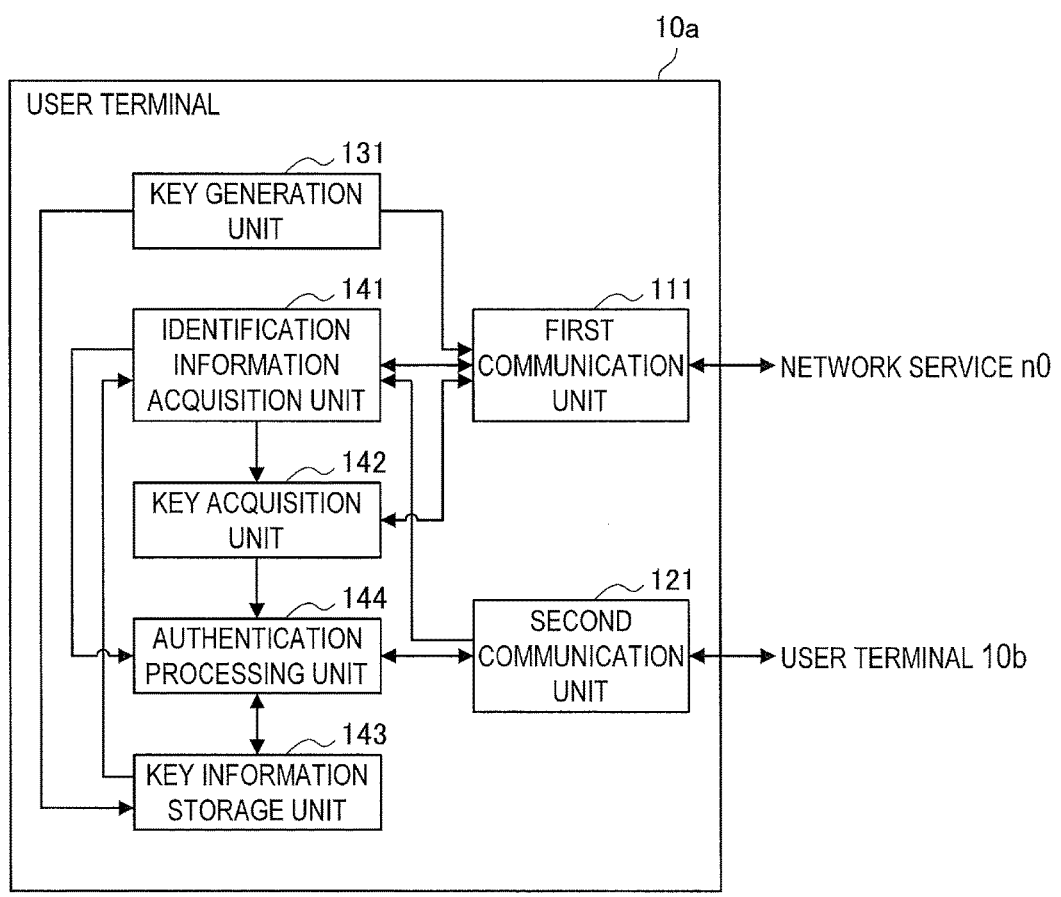
FIG. 7 is a block diagram illustrating a configuration of the user terminal according to the embodiment.

Next, a configuration of the user terminal 10a at a side on which transmitted identification information is received will be described with reference to FIG. 7. FIG. 7 is a block diagram illustrating a configuration of the user terminal 10a according to the embodiment and illustrates an exemplary configuration of the user terminal 10a at a side on which identification information is received. As illustrated in FIG. 7, the user terminal 10a includes the first communication unit 111, the second communication unit 121, the key generation unit 131, an identification information acquisition unit 141, a key acquisition unit 142, a key information storage unit 143, and an authentication processing unit 144. Also, the user terminal 10 (which will be described below) at a side on which identification information is received may be operated as "the user terminal 10 at a side from which identification information is transmitted" described above. In this case, it is needless to say that the user terminal 10 includes respective components of "the user terminal 10 at a side from which identification information is transmitted" described above.

The first communication unit 111 is used for respective components in the user terminal 10a to communicate with other communication devices through infrastructure facilities such as a mobile communication network. Also, in FIG. 7, the first communication antenna 112 is not illustrated. In the wireless communication system according to the embodiment, the respective components in the user terminal 10a access the network service n0 through the first communication unit 111. Also, when the respective components in the user terminal 10a transmit and receive data to and from the network service n0, unless otherwise specified, it is assumed below that data is transmitted and received through the first communication unit 111.

The second communication unit 121 is used for the respective components in the user terminal 10a to interconnect with another user terminal 10 (for example, the user terminal 10b). Also, in FIG. 7, the second communication antenna 122 is not illustrated. When the user terminals 10a and 10b build the ad-hoc network, the respective components in the user terminal 10a access the user terminal 10b through the second communication unit 121. Also, when the respective components in the user terminal 10a transmit and receive data to and from another user terminal (for example, the user terminal 10b), unless otherwise specified, it is assumed below that data is transmitted and received through the second communication unit 121.

The key generation unit 131 is the same as the above-described key generation unit 131 of the user terminal 10b. The key generation unit 131 generates an encryption key and a decryption key and stores the decryption key between the generated encryption key and decryption key in the key information storage unit 143. In addition, the key generation unit 131 transmits the encryption key between the generated encryption key and decryption key in association with identification information for specifying the user terminal 10a in the network service n0 to the network service n0. The encryption key transmitted to the network service n0 corresponds to the encryption key key_A.

The identification information acquisition unit 141 acquires identification information for identifying the user terminal 10b in the network service n0 from the user terminal 10b, and determines whether the acquired identification information is associated with identification information of the user terminal 10a in the network service n0.

As a specific example, the identification information acquisition unit 141 acquires identification information (the user ID) and the ID type d110 from the user terminal 10b. The identification information acquisition unit 141 also specifies a network service n0 to which the acquired identification information (the user ID) belongs based on the acquired ID type d110.

When the network service n0 is specified, the identification information acquisition unit 141 determines whether the identification information (the user ID) is encrypted based on the acquired ID type d110. When the identification information is encrypted, the identification information acquisition unit 141 accesses the specified network service n0 and decrypts the encrypted identification information in the network service n0. In this case, decryption of the identification information may also be executed in the network service n0, and the identification information acquisition unit 141 may acquire the decryption key from the network service n0 and perform decryption. On the other hand, when the identification information is not encrypted, it is needless to say that decryption is unnecessary. When the encrypted identification information is decrypted, the identification information acquisition unit 141 acquires the user ID of the user ub who is a user of the user terminal 10b.

In addition, the identification information acquisition unit 141 may acquire the device ID from the user terminal 10b. When the acquired device ID is encrypted, the identification information acquisition unit 141 may perform decryption similarly to that of the user ID. Also, it will be described below that the identification information acquisition unit 141 acquires the user ID and the device ID from the user terminal 10b.

The identification information acquisition unit 141 notifies the key acquisition unit 142 and the authentication processing unit 144 of the acquired user ID and device ID and the ID type d110 extracted from the owner information d10.

Also, when the user terminal 10b unicasts and sends the identification information, the user terminal 10b encrypts the user ID and the device ID with the encryption key key_A corresponding to the user terminal 10a and transmits the result. In this case, mutual authentication with the user terminal 10b is possible based on the "method using a partner key." Therefore, when the ID type d110 indicates the "encryption account for internal record search," the identification information acquisition unit 141 decrypts the encrypted user ID based on the decryption key stored in the key information storage unit 143, and acquires the decrypted user ID. Also, this is similar to a case in which the device ID is encrypted.

Also, when the ID type d110 indicates a method that is not permitted by the user terminal 10a as the mutual authentication method, the identification information acquisition unit 141 may reject a connection request from the user terminal 10b. As a specific example, when the user terminal 10a permits only the "method in which identification information is encrypted," if the identification information acquired from the user terminal 10b is not the encryption account, the identification information acquisition unit 141 may reject the connection request from the user terminal 10b.

In addition, as another example, when the user terminal 10a permits only the "method in which identification information is not encrypted," if the identification information acquired from the user terminal 10b is only the encryption account, the identification information acquisition unit 141 may reject the connection request from the user terminal 10b.

Also, when the connection request is rejected, the identification information acquisition unit 141 may terminate a series of processes without subsequent processes. In addition, in this case, the identification information acquisition unit 141 may notify the user terminal 10b of the fact that a response for the connection request may be impossible.

When the user ID and the device ID are acquired, the identification information acquisition unit 141 checks whether the encryption key associated with a type of the network service n0 indicated by the ID type d110 and the acquired user ID and device ID are stored in the key information storage unit 143. Also, a process of storing the encryption key in the key information storage unit 143 will be separately described below.

When a corresponding encryption key is stored in the key information storage unit 143, the identification information acquisition unit 141 notifies the authentication processing unit 144 of the acquired user ID and device ID and the ID type d110 extracted from the owner information d10. In this case, the identification information acquisition unit 141 does not necessarily notify the key acquisition unit 142 of the user ID, the device ID, and the ID type d110.

The key acquisition unit 142 acquires the user ID, the device ID, and the ID type d110 from the identification information acquisition unit 141. The key acquisition unit 142 accesses the network service n0 corresponding to the acquired ID type d110 and searches the acquired user ID and device ID through the social graph in the network service n0. In this case, when the user (for example, the user ub) indicated by the acquired user ID and the user ua of the user terminal 10a are associated in the network service n0, the key acquisition unit 142 can specify the user ID and the device ID in the network service n0.

Also, a process of searching the social graph may be executed by the network service n0 (in other words, the server 50 configured to provide the network service n0) based on a request of the key acquisition unit 142. In addition, as another example, the process of searching the social graph may be executed by the key acquisition unit 142 (that is, the user terminal 10a). In this case, the network service n0 may provide the user terminal 10a with data and a program for executing the process of searching the social graph.

When the user ID and the device ID are specified in the network service n0, the key acquisition unit 142 acquires the encryption key associated with the user ID and the device ID through the social graph in the network service n0. Accordingly, the key acquisition unit 142 can acquire the encryption key key_B associated with the user terminal 10b specified by for example, the acquired user ID and device ID through the social graph in the network service n0.

When the encryption key is acquired, the key acquisition unit 142 outputs the encryption key acquired through the network service n0 in association with the user ID, device ID and ID type d110 acquired from the identification information acquisition unit 141 to the authentication processing unit 144.

The authentication processing unit 144 acquires the user ID, the device ID, and the ID type d110 from the identification information acquisition unit 141. The authentication processing unit 144 extracts the encryption key associated with the acquired user ID, device ID, and ID type d110 from the key information storage unit 143. Details of the key information storage unit 143 will be described below. When the corresponding encryption key has already been stored in the key information storage unit 143, the authentication processing unit 144 successfully extracts the encryption key. When the encryption key is successfully extracted, the authentication processing unit 144 encrypts data based on the extracted encryption key, and executes a process for mutual authentication with the user terminal 10 specified by the acquired user ID and device ID.

When the corresponding encryption key is not stored in the key information storage unit 143, the authentication processing unit 144 of the user terminal 10a fails at extracting the encryption key. When extraction of the encryption key fails, the authentication processing unit 144 acquires the encryption key associated with the user ID, the device ID, and the ID type d110 from the key acquisition unit 142. The authentication processing unit 144 encrypts data based on the acquired encryption key and executes a process for mutual authentication with the user terminal 10 specified by the acquired user ID and device ID. In addition, the authentication processing unit 144 stores the encryption key associated with the user ID, the device ID, and the ID type d110 acquired from the key acquisition unit 142 in the key information storage unit 143.

Also, when the user terminal 10a is operated as the user terminal 10 at a side on which identification information is received, the authentication processing unit 144 may be operated as the above-described authentication processing unit 133. Therefore, when either of "the authentication processing unit 133" and "the authentication processing unit 144" is described below as one authentication processing unit, it is assumed that the authentication processing unit can be operated as the other authentication processing unit.

The key information storage unit 143 stores the decryption key generated by the key generation unit 131. Also, the key information storage unit 143 may store the encryption key generated by the key generation unit 131.

Figure 8:
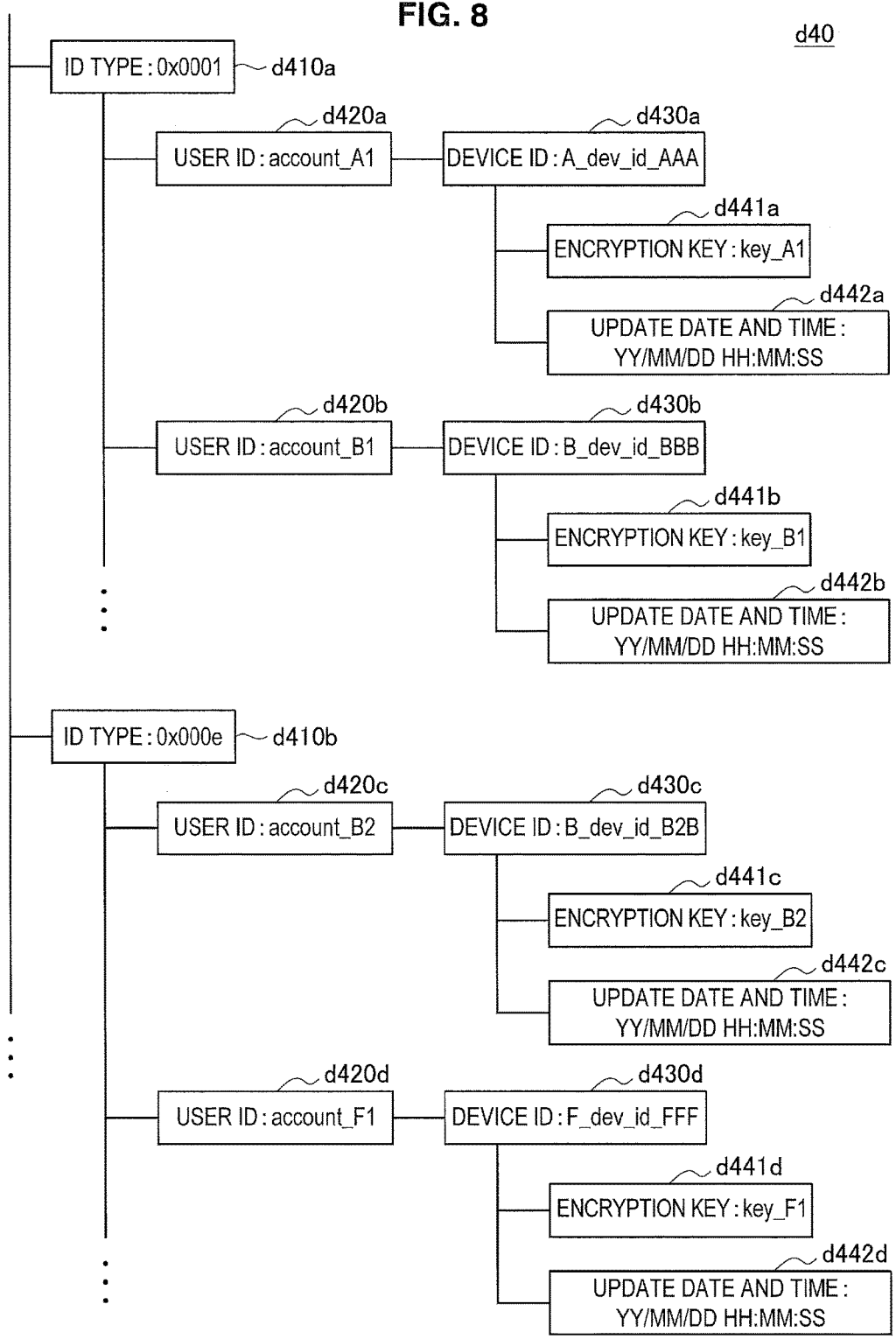
FIG. 8 is a diagram illustrating exemplary management data for managing an encryption key.

In addition, the key information storage unit 143 stores the encryption key (the encryption key generated or acquired by the other user terminal 10) for each user ID, device ID, and ID type d110 (in other words, a type of the network service n0). The encryption keys stored in the key information storage unit 143 are managed and extractable using the user ID, the device ID, and the ID type d110 as a retrieval key. Here, FIG. 8 will be referred to. FIG. 8 is a diagram illustrating exemplary management data d40 for management such that each encryption key is extractable using the user ID, the device ID, and the ID type d110 as a retrieval key in the key information storage unit 143.

In FIG. 8, reference numerals d410a and d410b correspond to the ID type d110. In addition, reference numerals d420a to d420d indicate user IDs, and reference numeral d430a to d430d indicate device IDs. In addition, reference numerals d441a to d441d indicate encryption keys, and reference numerals d442a to d442d indicate update dates and times at which encryption keys d441a to d441d are each acquired or updated. Also, when the encryption keys d441a to d441d are not particularly distinguished below, they will be described as an "encryption key d441" in some cases. Similarly, when the update dates and times d442a to d442d are not particularly distinguished, they will be described as an "update date and time d442" in some cases.

As a specific example, the encryption key d441a indicated by "key_A1" is associated with the ID type d410a indicated by "0x0001," the user ID d420a indicated by "account_A1," and the device ID d430a indicated by "A_dev_id_AAA." In addition, the update date and time d442a indicated by "YY/MM/DD HH:MM:SS" indicate a date and time at which the encryption key d441a is acquired or updated.

As illustrated in FIG. 8, when the encryption key is managed for each user ID, device ID, and ID type d110, it is possible to set a different encryption key for each user terminal 10, even if, for example, one user properly uses a plurality of different user terminals 10.

Also, when data is encrypted and transmitted and received between the user terminals 10, as long as the encrypted data can be correctly decrypted in each of the user terminals 10, a unit of managing the encryption key is not limited to the example illustrated in FIG. 8. For example, even when a user uses the plurality of user terminals 10, if a common encryption key and decryption key are used among the plurality of user terminals 10, the encryption key may be managed for each user ID. In addition, as another example, the encryption key may be managed for each device ID without association with the user ID.

Also, when the user terminal 10a is operated as the user terminal 10 at a side on which identification information is received, the key information storage unit 143 may be operated as the above-described key information storage unit 132. Therefore, when either of "the key information storage unit 132" and "the key information storage unit 143" is described below as one key information storage unit, it is assumed that the key information storage unit can be operated as the other key information storage unit.

In addition, as described above, when the network service n0 decrypts the identification information of the user terminal 10 encrypted with the encryption key key_S, the identification information acquisition unit 141 is notified of the decrypted identification information, but it may be operated such that the decrypted identification information is not notified of. For example, when the identification information of the user terminal 10b is decrypted, the network service n0 does not notify the user terminal 10a of the identification information of the user terminal 10b, and checks whether the user terminal 10a and the user terminal 10b are associated. Then, when the user terminal 10a and the user terminal 10b are associated, the network service n0 may acquire the encryption key key_B of the user terminal 10b and transmit the acquired encryption key key_B to the user terminal 10a. According to the operation in this manner, the user terminal 10a acquires the encryption key key_B of the user terminal 10b only when the user terminal 10a and the user terminal 10b are associated, without recognizing content of the identification information of the user terminal 10b. That is, it is possible to deliver the encryption key key_B of the user terminal 10b to the user terminal 10a while the identification information of the user terminal 10b is concealed from the user terminal 10a.

1.3. Distribution of Owner Information

Next, a summary of a process of the user terminal 10 distributing identification information (that is, the user ID and the device ID) and the ID type d110 to another user terminal 10 will be described. When the user terminal 10 distributes the identification information and the ID type d110 to the other user terminal 10, a method of broadcasting the identification information and the ID type d110 to a plurality of other unspecified user terminals 10 or a method of unicasting the identification information and the ID type d110 to a specified user terminal 10 is used. Therefore, this section will be described focusing on a case in which the user terminal 10 broadcasts the identification information and the ID type d110, and a case of the unicast will be separately described below in the next section.

A communication device capable of performing wireless communication such as the user terminal 10 uses a passive scan, an active scan or a combination of these methods, and thus searches for other nearby user terminals 10. The user terminal according to the embodiment uses transmission and reception of a signal when the passive scan or active scan is performed, and thus broadcasts the identification information and the ID type d110 to the other user terminals 10. First, an example of the passive scan will be described below. Next, an example of the active scan will be described.

(Passive Scan)

Figure 9:
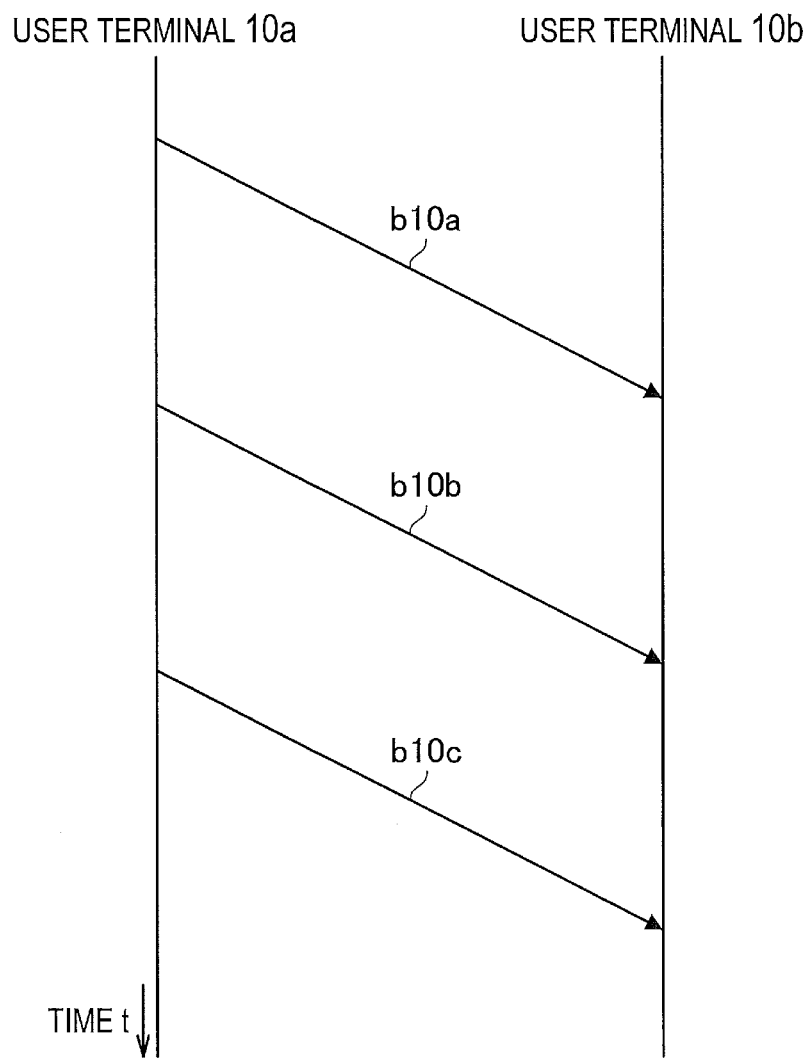
FIG. 9 is a diagram for describing an exemplary method of a user terminal distributing owner information to another user terminal.

An example of the passive scan will be described with reference to FIG. 9. FIG. 9 is a diagram for describing an exemplary method of the user terminal 10 distributing identification information and the ID type d110 to another user terminal 10, and illustrates a case in which the passive scan is performed.

When the passive scan is performed, the user terminal 10 transmits a beacon to the other nearby user terminal 10 at predetermined periods. For example, in the example illustrated in FIG. 9, the user terminal 10a transmits beacons b10a to b10c to another nearby user terminal 10b at predetermined periods. The beacons b10a to b10c include information for specifying the user terminal 10a serving as a transmission source. Therefore, when the user terminal 10b receives at least one of the beacons b10a to b10c, it is possible to recognize the presence of the user terminal 10a nearby.

By including the identification information and the ID type d110 in the above-described beacons b10a to b10c, the user terminal 10 according to the embodiment distributes main information and the device ID to the other user terminal. Also, when the beacons b10a to b10c are not particularly distinguished, they will be simply described below as "a beacon b10." In addition, in this description, a transmission side of the beacon b10 will be described as the user terminal 10a, and a reception side of the beacon b10 will be described as the user terminal 10b.

Figure 10:
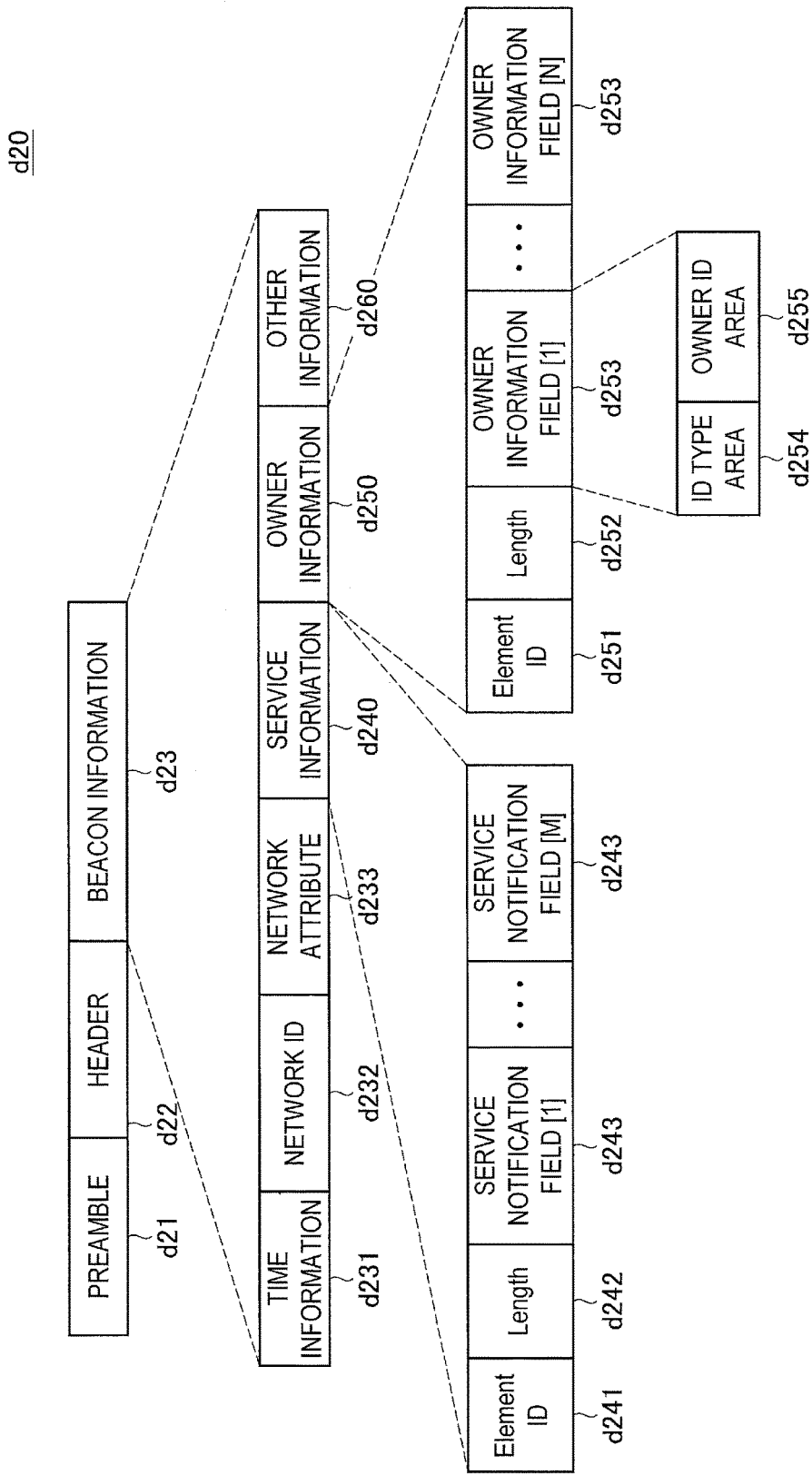
FIG. 10 is a diagram illustrating an exemplary data structure of communication data for a user terminal to transmit owner information.

Here, a data structure of communication data d20 to be transmitted as the beacon b10 according to the embodiment will be described with reference to FIG. 10. FIG. 10 is a diagram illustrating an exemplary data structure of the communication data d20 for the user terminal 10 to transmit the identification information and the ID type d110.

As illustrated in FIG. 10, the communication data d20 includes a preamble d21, a header d22, and beacon information d23.

The preamble d21 is data for signal synchronization when communication is performed between communication devices, and is generally arranged immediately before a frame (in other words, at the beginning of the communication data d20). In addition, the header d22 is an area for storing control information such as a transmission source and a destination of the communication data d20, and a type of the communication data d20 (for example, inclusion of the beacon information d23). In addition, the header d22 includes a type of each piece of information included in the beacon information d23 and information indicating a position in which the information is stored. Accordingly, when the header d22 is analyzed, the user terminal 10 determines whether the received communication data d20 is the beacon b10, or can extract information stored in the communication data d20.

The beacon information d23 of the communication data d20 according to the embodiment is different from beacon information used for existing wireless communication in that owner information d250 is included. Also, similar to the beacon information used for existing wireless communication, the communication data d20 may include time information d231, a network ID d232, a network attribute d233, service information d240, and the other information d260. Also, details of the time information d231, the network ID d232, the network attribute d233, and the other information 260 will not be described.

The service information d240 is an area for storing information about a service that can be provided by the user terminal 10a serving as a transmission source of the communication data d20. The service information d240 includes an element ID d241, a length d242, and at least one service notification field d243. The element ID d241 stores identification information indicating the service information d240 in corresponding data. In addition, the length d242 indicates the number of service notification fields d243 or a length of data determined according to the number. That is, the length d242 indicates the extent to which data corresponds to the service notification field d243.

The service notification field d243 indicates information about services that can be provided by the user terminal 10a. When the user terminal 10 can provide, for example, M services, the service notification field d243 is generated for each of the M services.

The owner information d250 is an area for storing the owner information d10 described above. The owner information d250 includes an element ID d251, a length d252, and at least one owner information field d243. The element ID d251 stores identification information indicating that corresponding data is the owner information d250. In addition, the length d252 indicates the number of owner information fields d243 or a length of data determined according to the number. That is, the length d242 indicates the extent to which data corresponds to the owner information field d243.

The owner information field d243 is an area for storing the owner information d10 described above in order for the user terminal 10a to distribute the user ID to another user terminal 10 serving as a transmission destination. The owner information field d243 includes an ID type area d254 and an owner ID area d255.

The ID type d110 of the owner information d10 is stored in the ID type area d254. In addition, in the owner ID area d255, the user ID associated with the ID type d110 stored in the ID type area d254 in the owner information d10 is stored.

The user terminal 10a serving as a transmission source of the communication data d20 partially or entirely stores the owner information d10 stored in the user terminal 10a in each owner field d253, and thus distributes each piece of owner information d10 to the other user terminal 10. Accordingly, the user ID (the encrypted or non-encrypted user ID) indicated in the owner ID d120 of the owner information d10 is distributed to the other user terminal 10.

Also, the communication data d20 is transmitted (broadcast) without specifying a partner. Therefore, when information distributed by the communication data d20 is encrypted, as the encryption key, an encryption key in which a partner that can be decrypted is not uniquely limited, for example, the encryption key key_S provided by the network service n0 may be used.

Also, the user terminal 10a serving as a transmission source may store the device ID in the communication data d20 and distribute the device ID to the other user terminal 10b serving as a transmission destination. In this case, the user terminal 10a may store its own device ID in the header d22 as control information indicating the transmission source of the communication data d20, or may store the device ID in the beacon information d23 as the other information d260. In addition, as another example, the user terminal 10a may store the device ID in the owner information field d253. In this case, the user terminal 10a may encrypt the device ID by the same method (the same encryption key) as that of the owner ID stored in the corresponding owner information field d253.

Also, the example of the communication data d20 described above is only an example. As long as the user terminal 10a serving as a transmission source can distribute the identification information and the ID type d110 of the identification information to the other user terminal 10, a data format of the communication data d20 is not limited. In addition, the user terminal 10a need not necessarily transmit all data as one piece of communication data d20. For example, the user terminal 10a may separately transmit the service information d240 and the owner information d250 as different communication data d20.

As described above, the user terminal 10b that has received the beacon b10 (that is, the communication data d20) recognizes the other nearby user terminal 10 (for example, the user terminal 10a). In this case, the user terminal 10b may present, for example, a candidate for the other user terminal 10 which serves as a connection destination to build the ad-hoc network.

Figure 11:
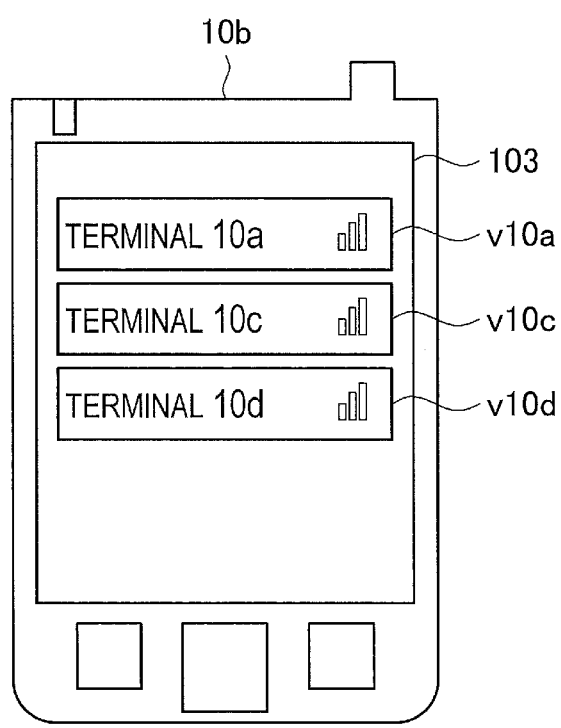
FIG. 11 illustrates an exemplary screen for selecting a candidate for a connection destination.

For example, FIG. 11 is an example of a screen for selecting a candidate for the connection destination. In the example illustrated in FIG. 11, the user terminal 10b recognizes the nearby user terminals 10a, 10c, and 10d, and displays choices v10a, v10c, and v10d showing that the user terminals 10a, 10c, and 10d are candidates for the connection destination on the display unit 103. That is, in this case, the user terminal 10b may receive a selection from the user, and execute a process for mutual authentication in order to establish communication with the selected other user terminal 10. In addition, as another example, the user terminal 10b may automatically execute a process for mutual authentication with the recognized other user terminal 10 without display of a candidate for the connection destination and selection of the candidate by the user.

In addition, the user terminal 10b can specify a network service n0 to which the user ID included in the beacon b10 belongs based on the ID type d110 included in the beacon b10 (that is, the communication data d20). In addition, the user terminal 10b can recognize whether the user ID is encrypted based on the ID type d110 or which mutual authentication method is permitted by the user terminal of a transmission source. Therefore, when the choices v10a, v10c, and v10d are displayed, the user terminal 10b may also display a difference of the network service n0 specified based on the ID type d110 described above, whether the user ID is encrypted, and a difference of the mutual authentication method.

(Active Scan)

Figure 12:
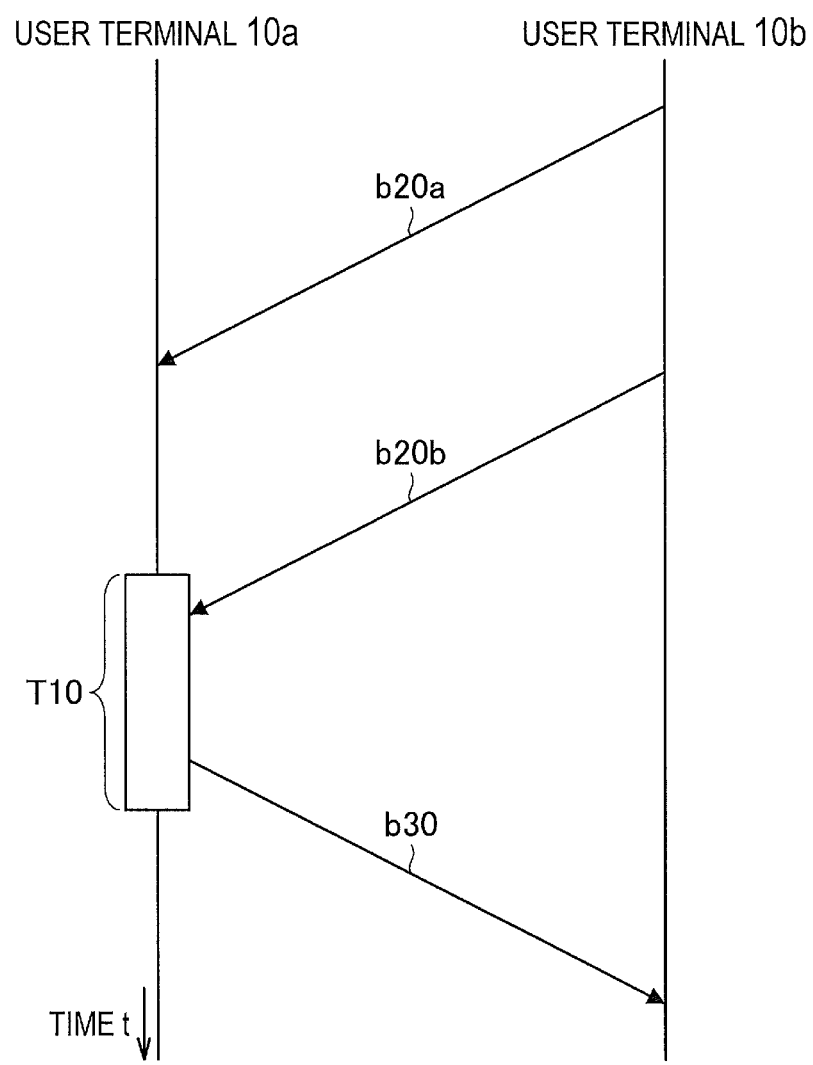
FIG. 12 is a diagram for describing another exemplary method of a user terminal distributing owner information to another user terminal.

Next, an example of the active scan will be described with reference to FIG. 12. FIG. 12 is a diagram for describing an exemplary method of the user terminal 10 distributing owner information and the device ID to another user terminal 10 and illustrates a case in which the active scan is performed.

When the active scan is performed, the user terminal 10 transmits a request message of an inquiry for the other nearby user terminal 10, and receives a response message from the other user terminal 10 in response to the inquiry. For example, in the example illustrated in FIG. 12, the user terminal 10b transmits inquiry messages b20a and b20b to the other nearby user terminal 10a.

The user terminal 10a transmits a response message for request messages b20a and b20b received from the user terminal 10b as long as a response is possible. For example, in the example illustrated in FIG. 12, the user terminal 10a transmits a response message b30 for the received request message b20b to the user terminal 10b at a timing T10 at which a response is possible. When the response message b30 is received, the user terminal 10b can recognize the presence of the user terminal 10a. Also, when the request messages b20a and b20b are not particularly distinguished, they will be described below as a "request message b20" in some cases.

Also, the user terminal 10a may store its own identification information (for example, the user ID and the device ID) and the ID type d110 in the response message b30 and transmit the result. Accordingly, in the user terminal 10b, identification information that is also notified of can specify a network service n0 to which the user ID belongs based on the ID type d110 included in the response message b30. In addition, the user terminal 10b can recognize whether the user ID is encrypted based on the acquired ID type d110, and a mutual authentication method that is permitted by the transmission source.

Also, the user terminal 10a may unicast the response message b30 to the user terminal 10b, or broadcast and transmit the response message b30 to the user terminal 10b. When the response message b30 is broadcast, the user terminal 10a may use the above-described communication data d20 as communication data.

Figure 13:
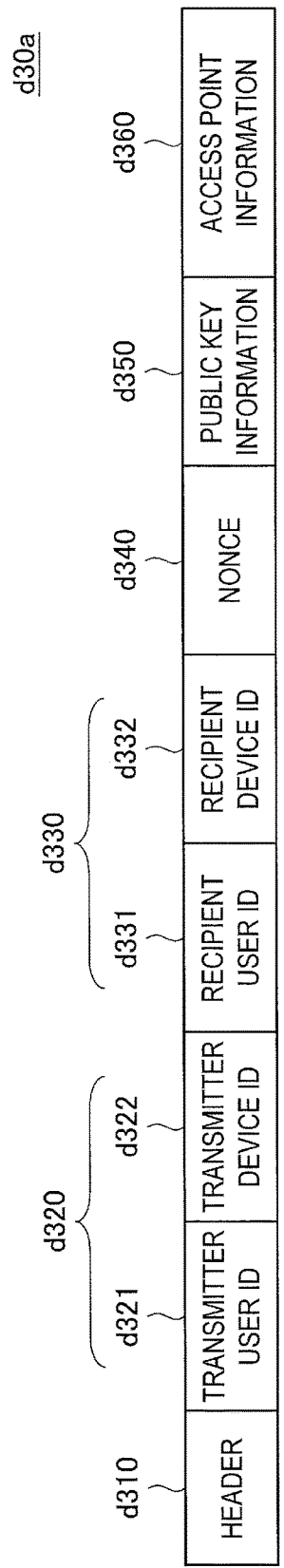
FIG. 13 is a diagram illustrating an exemplary data structure of communication data for transmitting and receiving information in the wireless communication system according to the first embodiment of the present disclosure.

Here, communication data d30a used when information is transmitted and received (is unicast) with a specific partner in the wireless communication system according to the embodiment will be described with reference to FIG. 13. FIG. 13 is a diagram illustrating an exemplary data structure of the communication data d30a for transmitting and receiving information in the wireless communication system according to the embodiment.

As illustrated in FIG. 13, the communication data d30a includes storage areas for storing a header d310, transmitter information d320, recipient information d330, a NONCE d340, public key information d350, and access point information d360. In addition, the transmitter information d320 includes a transmitter user ID d321 and a transmitter device ID d322. Similarly, the recipient information d330 includes a recipient user ID d331 and a recipient device ID d332. Also, a transmission source of the communication data d30a will be described as the user terminal 10a and a transmission destination will be described as the user terminal 10b below.

The header d310 includes control information indicating a process to which the communication data d30a corresponds among communication sequences for establishing a connection between the user terminals 10a and 10b, and information indicating a position in which each piece of information to be described below is stored. Accordingly, the user terminal 10b that has received the communication data d30a analyzes the header d310, determines a process for which the communication data d30a is executed, and can extract each piece of information from the communication data d30a.

In addition, the header d310 may include information for identifying a network service n0 to which the user ID stored in the transmitter user ID d321 and the recipient user ID d331 to be described below belongs.

The transmitter information d320 is an area for storing the identification information for specifying the user terminal 10a which serves as a transmission source of the communication data d30a.

A transmitter user ID 321 is an area for storing the user ID for specifying the user terminal 10a. Specifically, the user ID in the network service n0 of the user ua is stored in the transmitter user ID 321.

The transmitter device ID d322 is an area for storing the device ID for specifying the user terminal 10a. As a specific example, information uniquely specifying the user terminal 10a such as a MAC address may be stored in the transmitter device ID d322. Also, as another example, as long as the user terminal 10a can be specified in the network service n0, the information stored in the transmitter device ID d322 is not limited to the MAC address.

The recipient information d330 is an area for storing the identification information for specifying the user terminal 10b that receives the communication data d30a.

The recipient user ID d331 is an area for storing the user ID for specifying the user terminal 10b. Also, a type of information stored in the recipient user ID d331 is similar to that of information stored in the transmitter user ID 321.

The recipient device ID d332 is an area for storing the device ID for specifying the user terminal 10b. Also, a type of information stored in the recipient device ID d332 is similar to that of information stored in the transmitter device ID d322.

The NONCE d340 is an area for storing information used for the user terminal 10 serving as a transmission source and another user terminal serving as a transmission destination to authenticate each other using each other's encryption keys and decryption keys.

For example, the user terminal 10 (the user terminal 10a) of the transmission source encrypts a string created by a predetermined method using the encryption key key_B of the other user terminal 10 (the user terminal 10b) serving as a transmission destination, stores the encrypted string in the NONCE d340, and transmits the result to the user terminal 10b.

The user terminal 10b decrypts information stored in the NONCE d340 of the communication data d30a transmitted from the user terminal 10a with its own decryption key. The user terminal 10b encrypts the decrypted information with the encryption key key_A of the user terminal 10a, stores the encrypted information in the NONCE d340, and returns the result to the user terminal 10a.

The user terminal 10a decrypts information stored in the NONCE d340 of the communication data d30a returned from the user terminal 10b with its own decryption key. In this case, when encryption and decryption are correctly performed in both of the user terminals 10a and 10b, the decrypted information matches a string (a string before encryption is performed with the encryption key key_B) generated by the user terminal 10a. That is, when the decrypted information is compared with and matches the string generated in the user terminal 10a, the user terminal 10a can recognize that the user terminal 10b serving as the connection destination is a reliable partner.

The public key information d350 is an area for the user terminal 10 (the user terminal 10a) of the transmission source to store its own encryption key (for example, the encryption key key_A), and transmit the key to the other user terminal 10 (the user terminal 10b) serving as a transmission destination.

The access point information d360 is an area for the user terminal 10 (the user terminal 10a) of the transmission source to store information (for example, information of the access point) for establishing interconnection with itself and transmit the information to the other user terminal 10 (the user terminal 10b) serving as a transmission destination.

Also, as long as the user terminal 10 of the transmission source can notify the other user terminal 10 of information required that is occasionally required in a connection sequence with the other user terminal 10 serving as a transmission destination, information need not necessarily be stored in each area, and the areas similarly need not be provided. In this case, the user terminal 10 of the transmission source may appropriately generate or change content of the header d310 such that the other user terminal 10 serving as a transmission destination correctly reads information. In addition, a data format of the communication data d30a illustrated in FIG. 13 is an example. As long as each piece of information illustrated in FIG. 13 can be transmitted and received between the user terminals 10, a data format of the communication data d30a is not limited.

1.4. Communication Sequences (Method in which Identification Information is not Encrypted)

Figure 14:
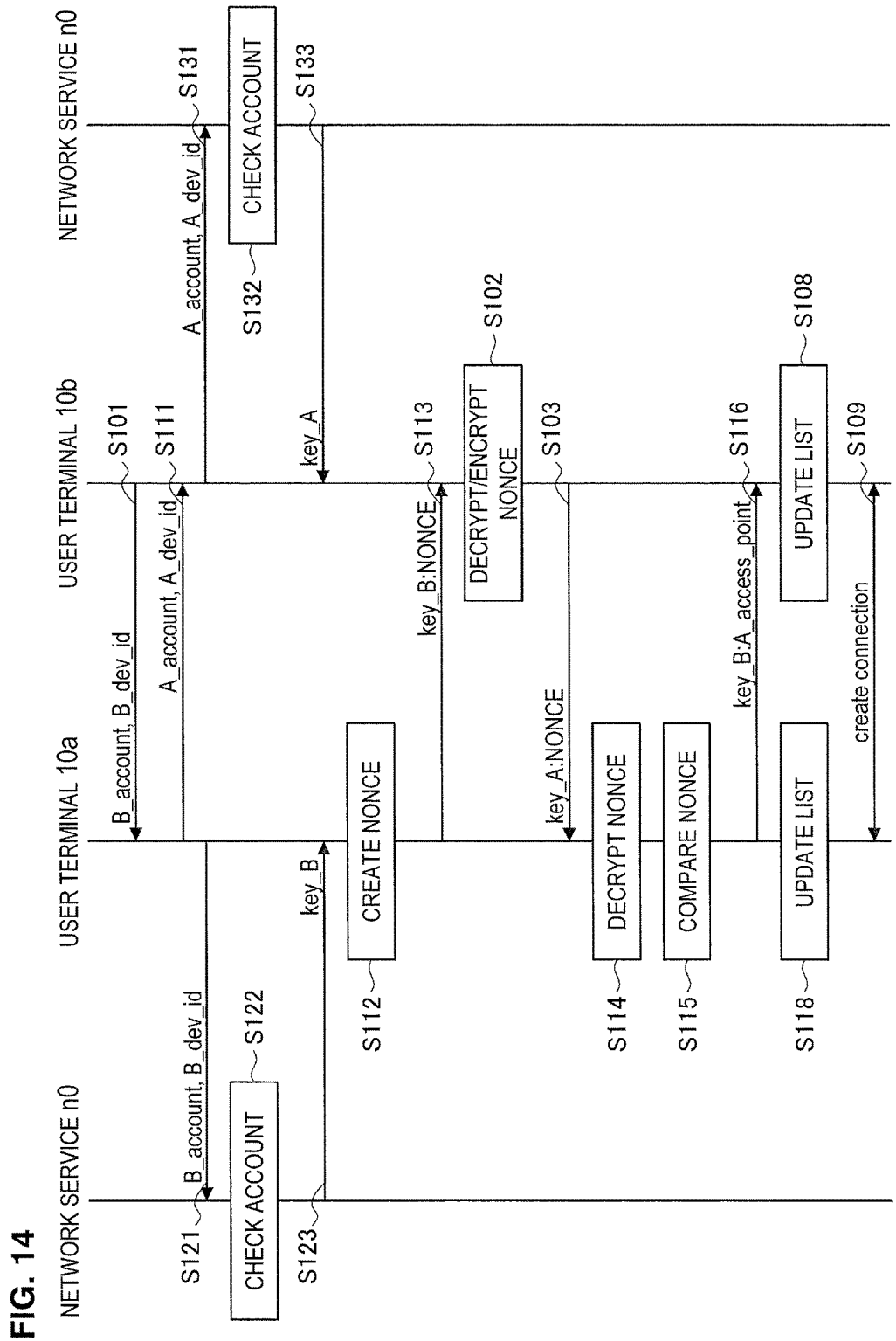
FIG. 14 is a sequence diagram illustrating an exemplary communication processing sequence in the wireless communication system according to the embodiment.

Next, the flow (that is, communication sequences) of processes when the user terminals 10a and 10b authenticate each other and establish interconnection will be described. Here, communication sequences when identification information is not encrypted in the wireless communication system according to the embodiment will be described with reference to FIG. 14. FIG. 14 is a sequence diagram illustrating an exemplary communication processing sequence in the wireless communication system according to the embodiment and illustrates a series of sequences when identification information is not encrypted. Also, the example illustrated in FIG. 14 illustrates a case in which the user terminal 10b issues a connection request to the user terminal 10a.

(Step S101)

First, the identification information notification unit 136 of the user terminal 10b distributes non-encrypted identification information within the identification information for specifying the user terminal 10b stored in the identification information storage unit 135 as the owner information d10 to the user terminal 10a. In the example illustrated in FIG. 14, the identification information notification unit 136 distributes the user ID "B_account" of the user ub and the device ID "B_dev_id" of the user terminal 10b in the network service n0 to the user terminal 10a as identification information.

In this case, the identification information notification unit 136 of the user terminal 10b may also notify the user terminal 10a of the ID type d110. Accordingly, the user terminal 10a that has received the ID type d110 can recognize a network service n0 to which the user ID "B_account" belongs, and a method that is permitted as the mutual authentication method based on the ID type.

Also, this section describes that the "method in which identification information is not encrypted" is set as the mutual authentication method in the ID type d120. Cases in which the "method in which identification information is encrypted" and the "method using a partner key" are set as the mutual authentication method will be described in "1.5. Communication sequences (method in which identification information is encrypted)" and "1.6. Communication sequences (method using a partner key)," respectively.

In addition, the identification information notification unit 136 of the user terminal 10b may broadcast and distribute the identification information for specifying the user terminal 10b to the user terminal 10a. In this case, the identification information notification unit 136 of the user terminal 10b may distribute (broadcast) the identification information for specifying the user terminal 10b to the user terminal 10a, for example, as the beacon b10 (refer to FIG. 9) when the passive scan is performed. In addition, the identification information notification unit 136 of the user terminal 10b may unicast the identification information toward the user terminal 10a. In this case, the identification information notification unit 136 of the user terminal 10b may distribute (unicast) the identification information for specifying the user terminal 10b to the user terminal 10a as the response message b30 in response to the request message b20 from the user terminal 10a.

In addition, when the user terminal 10b unicasts information to the other user terminal 10a, the user terminal 10b may also transmit information (for example, the user ID and the device ID) for identifying the user terminal 10a serving as the connection destination as information of the connection destination. Accordingly, the user terminal 10*a* can determine whether received information is addressed to the user terminal 10*a* according to whether its own identification information is included in the information of the connection destination.

Also, the information of the connection destination may be encrypted using, for example, the service-specific encryption key key_S. In this case, the user terminal 10*a* may access the corresponding network service n0, decrypt the information of the connection destination, and determine whether received information is addressed to the user terminal 10*a* based on the decrypted information of the connection destination. Also, it is assumed below that, when information is unicast between the user terminals 10, unless particularly described, the information of the connection destination may be included, and the information of the connection destination may be encrypted with the encryption key key_S. In addition, when the user terminal 10*b* has already acquired the encryption key key_A corresponding to the user terminal 10*a*, the user terminal 10*b* may encrypt the information of the connection destination with the encryption key key_A. In this case, the user terminal 10*a* may decrypt the information of the connection destination with its own decryption key.

(Step S111)

The identification information acquisition unit 141 of the user terminal 10*a* acquires the identification information for specifying the user terminal 10*b* from the user terminal 10*b*. In this case, the user terminal 10*a* returns identification information for specifying the user terminal 10*a* in the network service n0 to the user terminal 10*b*. In this case, the user terminal 10*a* is operated as "the user terminal 10 at a side from which identification information is transmitted" (refer to FIG. 4). As a process of step S111, the operation of the user terminal 10*a* in this case will be described below.

When the identification information is acquired from the user terminal 10*b*, the identification information notification unit 136 of the user terminal 10*a* extracts identification information for specifying the user terminal 10*a* from the identification information storage unit 135. In this case, the identification information notification unit 136 also acquires identification information from the owner information d10 corresponding to the same type as the ID type d110 that is notified of by the user terminal 10*b*. In this case, non-encrypted identification information is extracted. Also, when the owner information d10 corresponding to the same type as the ID type d110 that is notified of by the user terminal 10*b* is not stored in the identification information storage unit 135 (that is, when the ID type d110 thereof is not permitted), the identification information notification unit 136 need not respond to the user terminal 10*b*. In addition, in this case, the identification information notification unit 136 may notify the user terminal 10*b* of the fact that no response is performed.

When its own identification information is extracted from the identification information storage unit 135, the identification information notification unit 136 of the user terminal 10*a* returns the extracted identification information (that is, non-encrypted identification information) to the user terminal 10*b*. In the example illustrated in FIG. 14, the identification information notification unit 136 of the user terminal 10*a* returns the user ID "A_account" for specifying the user ua and the device ID "A_dev_id" for specifying itself in the network service n0 as identification information. Also, in this case, the identification information notification unit 136 of the user terminal 10*a* may also notify the user terminal 10*b* of the ID type d110 indicating a network service n0 to which the user ID "A_account" belongs.

(Step S121)

In addition, the identification information acquisition unit 141 of the user terminal 10*a* transmits identification information (that is, the user ID "B_account" and the device ID "B_dev_id") for specifying the acquired user terminal 10*b* to the network service n0.

Also, when the user terminal 10*a* performs communication with the network service n0, data may be transmitted and received using the communication data d30*a* illustrated in FIG. 13. In this case, for example, information of the user terminal 10*a* is stored in the transmitter information d320. Accordingly, the network service n0 can recognize that communication is performed from the user terminal 10*a*. In addition, information of the user terminal 10*b* is stored in the recipient information d330. Accordingly, the network service n0 can acquire the identification information (that is, the user ID and the device ID) of the user terminal 10*b* as a search target through the social graph. Also, it is assumed below that information is unicast among the user terminal 10*a*, the user terminal 10*b*, and the network service n0 based on the communication data d30*a* illustrated in FIG. 13.

(Step S122)

The network service n0 (in other words, the server 50 configured to provide the network service n0) acquires the identification information for specifying the user terminal 10*b* from the user terminal 10*a*. The network service n0 searches the social graph based on the acquired identification information and checks whether the user terminal 10*a* and the user terminal 10*b* are associated. In the example illustrated in FIG. 14, the network service n0 checks whether the user ID "A_account" and the device ID "A_dev_id" are associated with the user ID "B_account" and the device ID "B_dev_id" through the social graph, respectively. Also, the network service n0 may notify the identification information acquisition unit 141 of the user terminal 10*a* of the search result of the social graph, that is, the result of checking whether the user terminal 10*a* and the user terminal 10*b* are associated. In addition, a process of searching the social graph in the network service n0 may be executed by the user terminal 10*a*. In this case, the network service n0 may provide data and a program for executing the process of searching the social graph to the user terminal 10*a*.

When the user terminal 10*a* and the user terminal 10*b* are associated, the network service n0 acquires the encryption key key_B associated with the user terminal 10*b* through the social graph.

(Step S123)

When the encryption key key_B can be acquired, the network service n0 returns the acquired encryption key key_B to the key acquisition unit 142 of the user terminal 10*a*. In this case, the network service n0 may return the encryption key key_B to the user terminal 10*a* by, for example, storing the acquired encryption key key_B in the public key information d350 of the communication data d30*a* and transmitting the communication data d30*a* to the user terminal 10*a*.

Also, when acquisition of the encryption key key_B fails, the network service n0 may notify the user terminal 10*a* of the fact that acquisition of the encryption key key_B has failed. When a notification from the network service n0 is received, the user terminal 10*a* can recognize that the user terminal 10*a* itself is not associated with the user terminal 10*b* in the network service n0. In this case, the user terminal 10*a* may consider that the user terminal 10*b* is not a reliable partner and terminate a series of processes without establishing communication. In this case, the user terminal 10*a* may notify the user terminal 10*b* of failure of mutual authentication.

When the encryption key key_B is acquired, the key acquisition unit 142 of the user terminal 10*a* outputs the acquired encryption key key_B in association with the user ID, the device ID, and the ID type d110 acquired from the user terminal 10*b* to the authentication processing unit 144 of the user terminal 10*a*.

The authentication processing unit 144 of the user terminal 10*a* acquires the user ID, the device ID, and the ID type d110 transmitted from the user terminal 10*b* from the identification information acquisition unit 141. The authentication processing unit 144 of the user terminal 10*a* extracts the encryption key associated with the acquired user ID, device ID, and ID type d110 from the key information storage unit 143. When the corresponding encryption key has already been stored in the key information storage unit 143, the authentication processing unit 144 successfully extracts of the encryption key. In the example illustrated in FIG. 14, the encryption key key_B is extracted.

Also, when the corresponding encryption key is not stored in the key information storage unit 143, the authentication processing unit 144 fails at extracting the encryption key. When extraction of the encryption key fails, the authentication processing unit 144 acquires the encryption key associated with the user ID, the device ID, and the ID type d110 from the key acquisition unit 142. In the example illustrated in FIG. 14, the encryption key key_B is acquired. It will be described below that the authentication processing unit 144 of the user terminal 10*a* has acquired the encryption key key_B.

(Step S131)

Similar to the user terminal 10*a*, the user terminal 10*b* acquires the identification information for specifying the user terminal 10*a* from the user terminal 10*a*. In this case, the user terminal 10*b* is operated as "the user terminal 10 at a side on which identification information is received" (refer to FIG. 7). Specifically, the identification information acquisition unit 141 of the user terminal 10*b* acquires the identification information for specifying the user terminal 10*a* from the user terminal 10*a*. The identification information acquisition unit 141 of the user terminal 10*b* transmits acquired identification information (that is, the user ID "A_account" and the device ID "A_dev_id") for specifying the user terminal 10*a* to the network service n0.

(Step S132)

The network service n0 (in other words, the server 50 configured to provide the network service n0) acquires the identification information for specifying the user terminal 10*a* from the user terminal 10*b*. The network service n0 searches the social graph based on the acquired identification information and checks whether the user terminal 10*b* and the user terminal 10*a* are associated. In the example illustrated in FIG. 14, the network service n0 checks whether the user ID "A_account" and the device ID "A_dev_id" are associated with the user ID "B_account" and the device ID "B_dev_id" through the social graph, respectively.

When the user terminal 10*b* and the user terminal 10*a* are associated, the network service n0 acquires the encryption key key_A associated with the user terminal 10*a* through the social graph.

(Step S133)

When the encryption key key_A can be acquired, the network service n0 returns the acquired encryption key key_A to the user terminal 10*b*. In this case, the network service n0 may return the encryption key key_A to the user terminal 10*b* by, for example, storing the acquired encryption key key_A in the public key information d350 of the communication data d30*a* and transmitting the communication data d30*a* to the user terminal 10*b*.

Also, when acquisition of the encryption key key_A fails, the network service n0 may notify the user terminal 10*b* of the fact that acquisition of the encryption key key_A has failed. When a notification from the network service n0 is received, the user terminal 10*b* can recognize that the user terminal 10*b* itself is not associated with the user terminal 10*a* in the network service n0. In this case, the user terminal 10*b* may consider that the user terminal 10*a* is not a reliable partner and terminate a series of processes without establishing communication.

When the encryption key key_A is acquired, the key acquisition unit 142 of the user terminal 10*b* outputs the acquired encryption key key_A in association with the user ID, the device ID, and the ID type d110 acquired from the user terminal 10*a* to the authentication processing unit 144 of the user terminal 10*b*. Also, the authentication processing unit 144 of the user terminal 10*b* described herein corresponds to "the authentication processing unit 133" when the user terminal 10*b* is operated as "the user terminal 10 at a side from which identification information is transmitted." Therefore, when "the authentication processing unit 133" is described below, "the authentication processing unit 144" will be assumed to have the same configuration.

The authentication processing unit 144 of the user terminal 10*b* acquires the user ID, the device ID, and the ID type d110 transmitted from the user terminal 10*a* from the identification information acquisition unit 141. The authentication processing unit 144 of the user terminal 10*b* extracts the encryption key associated with the acquired user ID, device ID, and ID type d110 from the key information storage unit 143. When the corresponding encryption key has already been stored in the key information storage unit 143, the authentication processing unit 144 successfully extracts of the encryption key. In the example illustrated in FIG. 14, the encryption key key_A is extracted.

Also, when the corresponding encryption key is not stored in the key information storage unit 143, the authentication processing unit 144 of the user terminal 10*b* fails at extracting the encryption key. When extraction of the encryption key fails, the authentication processing unit 144 of the user terminal 10*b* acquires the encryption key associated with the user ID, the device ID, and the ID type d110 from the key acquisition unit 142. In the example illustrated in FIG. 14, the encryption key key_A is acquired. It will be described below that the authentication processing unit 144 of the user terminal 10*b* has acquired the encryption key key_A.

(Step S112)

Here, focusing on a process of the user terminal 10*a* again, the authentication processing unit 144 of the user terminal 10*a* encrypts data based on the extracted encryption key key_B corresponding to the user terminal 10*b*, and executes a process for mutual authentication with the user terminal 10*b* specified by the acquired user ID and device ID.

Specifically, the authentication processing unit 144 of the user terminal 10*a* generates information (hereinafter referred to as a "NONCE" in some cases) for mutual authentication between the user terminal 10*a* and the user terminal 10*b* using each other's encryption keys and decryption keys. Specifically, the authentication processing unit 144 of the user terminal 10*a* creates a string by a predetermined method. This created string corresponds to the "NONCE." Also, a method of generating the "NONCE" is not specifically limited. For example, a randomly generated string may be used or the string in which predetermined information such as a date and time, the user ID and the device ID is combined may be used.

The authentication processing unit 144 of the user terminal 10a encrypts the generated NONCE with the extracted encryption key key_B corresponding to the user terminal 10b. Also, the NONCE encrypted with the encryption key key_B will be described as "key_B:NONCE" below in some cases.
(Step S113)

The authentication processing unit 144 of the user terminal 10a transmits the key_B:NONCE encrypted with the encryption key key_B to the user terminal 10b. In this case, the authentication processing unit 144 of the user terminal 10a may store the encrypted key_B:NONCE, for example, in the NONCE d340 of the communication data d30a and transmit the communication data d30a to the user terminal 10b.
(Step S102)

The authentication processing unit 133 of the user terminal 10b (that is, the above-described authentication processing unit 144) acquires the key_B:NONCE encrypted with the encryption key key_B from the user terminal 10a.

The authentication processing unit 133 of the user terminal 10b decrypts the acquired key_B:NONCE with the decryption key corresponding to itself (the user terminal 10b) stored in the key information storage unit 132. When the key_B:NONCE is decrypted, the authentication processing unit 133 of the user terminal 10b encrypts the decrypted NONCE again based on the extracted encryption key key_A corresponding to the user terminal 10a. Also, the NONCE encrypted with the encryption key key_A will be described below as "key_A:NONCE" in some cases.
(Step S103)

The authentication processing unit 133 of the user terminal 10b transmits the key_A:NONCE encrypted with the encryption key key_A to the user terminal 10a. In this case, the authentication processing unit 133 of the user terminal 10b may store the encrypted key_A:NONCE, for example, in the NONCE d340 of the communication data d30a and transmit the communication data d30a to the user terminal 10a.
(Step S114)

The authentication processing unit 144 of the user terminal 10a acquires the key_A:NONCE encrypted with the encryption key key_A from the user terminal 10b.

The authentication processing unit 144 of the user terminal 10a decrypts the acquired key_A:NONCE with the decryption key corresponding to itself (the user terminal 10a) stored in the key information storage unit 132.
(Step S115)

When the key_A:NONCE is decrypted, the authentication processing unit 144 of the user terminal 10a compares the decrypted NONCE with the NONCE (the NONCE before encryption with the encryption key key_B is performed) generated by the user terminal 10a. In this case, as long as encryption and decryption are correctly performed in both of the user terminals 10a and 10b, the decrypted NONCE matches the NONCE generated by the user terminal 10a. In this case, the authentication processing unit 144 of the user terminal 10a can recognize that the user terminal 10b serving as the connection destination is a reliable partner.
(Step S116)

When the decrypted NONCE matches the NONCE generated by the user terminal 10a, the authentication processing unit 144 of the user terminal 10a encrypts information for establishing interconnection with itself (the user terminal 10a) with the encryption key key_B. As the information for establishing interconnection with the user terminal 10a, for example, information of the access point is exemplified. The information for establishing interconnection with the user terminal 10a will be described as "A_access_point" below in some cases. In addition, the A_access_point encrypted with the encryption key key_B will be described as "key_B: A_access_point" in some cases.
(Step S118)

In addition, when the decrypted NONCE matches the NONCE generated by the user terminal 10a, the authentication processing unit 144 of the user terminal 10a can recognize that the encryption key key_B used for communication with the user terminal 10b is a correct encryption key.

The authentication processing unit 144 of the user terminal 10a checks whether the acquired encryption key key_B is stored in the key information storage unit 143. When the encryption key key_B is not stored in the key information storage unit 143, the authentication processing unit 144 of the user terminal 10a stores the encryption key key_B associated with the user ID, the device ID, and the ID type d110 in the key information storage unit 143. In this manner, when the encryption key key_B is stored in the key information storage unit 143, the authentication processing unit 144 of the user terminal 10a need not acquire the encryption key key_B through the network service n0 again when communication with the user terminal 10b is performed later. That is, as a method of mutual authentication with the user terminal 10b, the authentication processing unit 144 of the user terminal 10a can use the "method using a partner key" below.
(Step S108)

The authentication processing unit 133 of the user terminal 10b acquires the key_B:A_access_point encrypted with the encryption key key_B from the user terminal 10a. When the encrypted key_B:A_access_point is notified of by the user terminal 10a, the authentication processing unit 133 of the user terminal 10b can recognize that the encryption key key_A used for communication with the user terminal 10a is a correct encryption key.

The authentication processing unit 133 of the user terminal 10b checks whether the acquired encryption key key_A is stored in the key information storage unit 132. Also, the key information storage unit 132 of the user terminal 10b described herein corresponds to "the key information storage unit 143" when the user terminal 10b is operated as "the user terminal 10 at a side on which identification information is received." Therefore, information stored in "the key information storage unit 143" when the user terminal 10b is operated as "the user terminal 10 at a side on which identification information is received will be described below as being similarly stored in the key information storage unit 132.

When the encryption key key_A is not stored in the key information storage unit 132, the authentication processing unit 133 of the user terminal 10b stores the encryption key key_A associated with the user ID, the device ID, and the ID type d110 in the key information storage unit 132. In this manner, when the encryption key key_A is stored in the key information storage unit 132, the authentication processing unit 133 of the user terminal 10b need not acquire the encryption key key_A through the network service n0 again when communication with the user terminal 10a is performed later. That is, as a method of mutual authentication with the user terminal 10*a*, the authentication processing unit 133 of the user terminal 10*b* can use the "method using a partner key" below.
(Step S109)

In addition, when the key_B:A_access_point is decrypted, the authentication processing unit 133 of the user terminal 10*b* is connected to the user terminal 10*a* based on the decrypted access point information A_access_point. Accordingly, the interconnection is established between the user terminal 10*a* and the user terminal 10*b*.

As described above, in the wireless communication system according to the embodiment, for example, when the user terminal 10*a* receives a connection request from the other user terminal 10*b*, it is checked whether the user terminals 10*a* and 10*b* are associated in the network service n0. Therefore, when the user terminals 10*a* and 10*b* are associated in the network service n0, the user terminal 10*a* acquires the encryption key key_B corresponding to the user terminal 10*b* through the network service n0, and performs encrypted communication with the user terminal 10*b*. That is, in the wireless communication system according to the embodiment, when interconnection is established between the different user terminals 10*a* and 10*b*, it is possible to ensure security simply and safely when communication is performed. Accordingly, a user of each of the user terminals 10 enables the user terminal 10 that he or she operates to participate in the ad-hoc network without executing a complex operation.

1.5. Communication Sequences (Method in which Identification Information is Encrypted)

Figure 15:
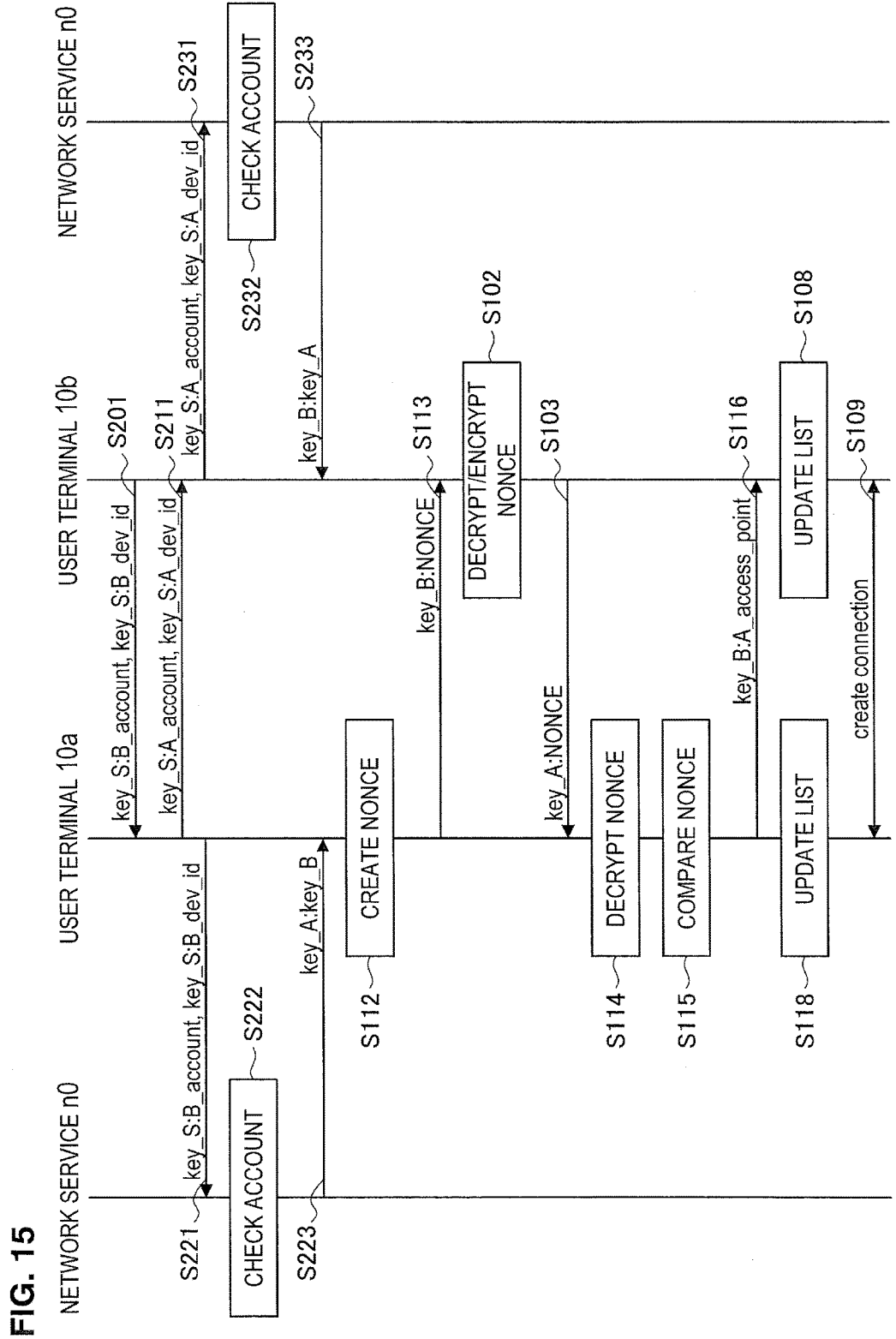
FIG. 15 is a sequence diagram illustrating another exemplary communication processing sequence in the wireless communication system according to the embodiment.

Next, communication sequences when identification information is encrypted in the wireless communication system according to the embodiment will be described with reference to FIG. 15. FIG. 15 is a sequence diagram illustrating an exemplary communication processing sequence in the wireless communication system according to the embodiment and illustrates a series of sequences when identification information is encrypted. Also, the example illustrated in FIG. 15 illustrates a case in which the user terminal 10*b* issues a connection request to the user terminal 10*a*. Also, descriptions will be provided below focusing on parts that are different from the content described in "1.4. Communication sequences (method in which identification information is not encrypted)" and the same parts will not be described.
(Step S201)

First, the identification information notification unit 136 of the user terminal 10*b* distributes identification information encrypted with the encryption key key_S within the identification information for specifying the user terminal 10*b* stored in the identification information storage unit 135 as the owner information d10 to the user terminal 10*a*. The encryption key key_S is a specific encryption key of the network service n0 managed in the network service n0. In the example illustrated in FIG. 15, the identification information notification unit 136 distributes the user ID "B_account" of the user ub, and the device ID "B_dev_id" of the user terminal 10*b* in the network service n0, which are encrypted with the encryption key key_S, as identification information. Also, the user ID "B_account" encrypted with the encryption key key_S will be described below as "key_S:B_account" in some cases. Similarly, the device ID "B_dev_id" encrypted with the encryption key key_S will be described as "key_S:B_dev_id" in some cases. That is, in FIG. 15, the identification information notification unit 136 of the user terminal 10*b* distributes the encrypted user ID "key_S:B_account," and the encrypted device ID "key_S:B_dev_id" to the user terminal 10*a*.

Also, in this case, the identification information notification unit 136 of the user terminal 10*b* may also notify the user terminal 10*a* of the ID type d110. The user terminal 10*a* that has received the ID type d110 can recognize a network service n0 to which the user ID "key_S:B_account" belongs, and a method that is permitted as the mutual authentication method based on the ID type. Also, it is described herein that the "method in which identification information is encrypted" is set as the mutual authentication method in the ID type d120. That is, according to the ID type d120, the user terminal 10*a* can recognize that the user ID "key_S:B_account" is encrypted with the service-specific encryption key key_S.
(Step S211)

The identification information acquisition unit 141 of the user terminal 10*a* acquires the identification information for specifying the user terminal 10*b* encrypted with the service-specific encryption key key_S from the user terminal 10*b*. In this case, the user terminal 10*a* returns identification information for specifying the user terminal 10*a* in the network service n0 to the user terminal 10*b*. In this case, the user terminal 10*a* is operated as "the user terminal 10 at a side from which identification information is transmitted". As a process of step S211, the operation of the user terminal 10*a* in this case will be described below.

When the identification information encrypted with the service-specific encryption key key_S is acquired, the identification information notification unit 136 of the user terminal 10*a* extracts identification information for specifying the user terminal 10*a* from the identification information storage unit 135. In this case, the identification information notification unit 136 also acquires identification information from the owner information d10 corresponding to the same type as the ID type d110 that is notified of by the user terminal 10*b*. In this case, identification information encrypted with the service-specific encryption key key_S that is used by the user terminal 10*b* to encrypt identification information is extracted. Also, when the owner information d10 corresponding to the same type as the ID type d110 that is notified of by the user terminal 10*b* is not stored in the identification information storage unit 135 (that is, when the ID type d110 thereof is not permitted), the identification information notification unit 136 need not respond to the user terminal 10*b*. In addition, in this case, the identification information notification unit 136 may notify the user terminal 10*b* of the fact that no response is performed.

When its own identification information is extracted from the identification information storage unit 135, the identification information notification unit 136 of the user terminal 10*a* returns the extracted identification information (that is, the identification information encrypted with the encryption key key_S) to the user terminal 10*b*. In the example illustrated in FIG. 15, the identification information notification unit 136 returns the user ID "A_account" for specifying the user ua in the network service n0, and its confident device ID "A_dev_id," which are encrypted with the encryption key key_S, as identification information. Also, the user ID "A_account" encrypted with the encryption key key_S will be described below as "key_S:A_account" in some cases. Similarly, the device ID "A_dev_id" encrypted with the encryption key key_S is described as "key_S:A_dev_id" in some cases. That is, in FIG. 15, the identification information notification unit 136 of the user terminal 10*a* distributes the encrypted user ID "key_S:A_account," and the encrypted device ID "key_S:A_dev_id" to the user terminal 10*b*. In addition, in this case, the identification information notification unit 136 of the user terminal 10*a* may also notify the user terminal 10*b* of the ID type d110 indicating a network service n0 to which the user ID "A_account" belongs.

(Step S221)

In addition, the identification information acquisition unit 141 of the user terminal 10*a* transmits the acquired encrypted identification information (that is, the user ID "key_S:B_account" and the device ID "key_S:B_dev_id") for specifying the user terminal 10*b* to the network service n0. Also, it is assumed below that information is unicast among the user terminal 10*a*, the user terminal 10*b*, and the network service n0 based on the communication data d30*a* illustrated in FIG. 13.

(Step S222)

The network service n0 (in other words, the server 50 configured to provide the network service n0) acquires the identification information (that is, the user ID "key_S:B_account" and the device ID "key_S:B_dev_id") for specifying the user terminal 10*b* encrypted with the service-specific encryption key key_S from the user terminal 10*a*. The network service n0 decrypts the identification information encrypted with the encryption key key_S with its own decryption key. Accordingly, the network service n0 acquires the user ID "B_account" and the device ID "B_dev_id."

The network service n0 searches the social graph based on the acquired identification information and checks whether the user terminal 10*a* and the user terminal 10*b* are associated. In the example illustrated in FIG. 15, the network service n0 checks whether the user ID "A_account" and the device ID "A_dev_id" are associated with the user ID "B_account" and the device ID "B_dev_id" through the social graph, respectively. Also, the network service n0 may notify the identification information acquisition unit 141 of the user terminal 10*a* of the search result of the social graph, that is, the result of checking whether the user terminal 10*a* and the user terminal 10*b* are associated. In addition, a process of searching the social graph in the network service n0 may be executed by the user terminal 10*a*. In this case, the network service n0 may provide data and a program for executing the process of searching the social graph to the user terminal 10*a*.

When the user terminal 10*a* and the user terminal 10*b* are associated, the network service n0 acquires the encryption key key_B associated with the user terminal 10*b* through the social graph.

(Step S223)

When the encryption key key_B can be acquired, the network service n0 encrypts the acquired encryption key key_B with the encryption key key_A managed in the network service n0 associated with the user terminal 10*a*. The encryption key key_B encrypted with the encryption key key_A will be described below as "key_A:key_B" in some cases. The network service n0 returns the encryption key "key_A:key_B" encrypted with the encryption key key_A to the key acquisition unit 142 of the user terminal 10*a*.

Also, when acquisition of the encryption key key_B fails, the network service n0 may notify the user terminal 10*a* of the fact that acquisition of the encryption key key_B has failed. When a notification from the network service n0 is received, the user terminal 10*a* can recognize that the user terminal 10*a* itself is not associated with the user terminal 10*b* in the network service n0. In this case, the user terminal 10*a* may consider that the user terminal 10*b* is not a reliable partner and terminate a series of processes without establishing communication.

When the encrypted encryption key "key_A:key_B" is acquired, the key acquisition unit 142 of the user terminal 10*a* decrypts the acquired encryption key "key_A:key_B" with the decryption key corresponding to the user terminal 10*a* stored in the key information storage unit 143. Accordingly, the key acquisition unit 142 of the user terminal 10*a* acquires the encryption key key_B. When the encryption key key_B is acquired, the key acquisition unit 142 of the user terminal 10*a* outputs the encryption key key_B in association with the user ID, the device ID, and the ID type d110 acquired from the user terminal 10*b* to the authentication processing unit 144 of the user terminal 10*a*.

(Step S231)

Similar to the user terminal 10*a*, the user terminal 10*b* acquires the encrypted identification information for specifying the user terminal 10*a* from the user terminal 10*a*. In this case, the user terminal 10*b* is operated as "the user terminal 10 at a side on which identification information is received" (refer to FIG. 7). Specifically, the identification information acquisition unit 141 of the user terminal 10*b* acquires the encrypted identification information for specifying the user terminal 10*a* from the user terminal 10*a*. The identification information acquisition unit 141 of the user terminal 10*b* transmits acquired encrypted identification information (that is, the user ID "key_S:A_account" and the device ID "key_S:A_dev_id") for specifying the user terminal 10*a* to the network service n0.

(Step S232)

The network service n0 (in other words, the server 50 configured to provide the network service n0) acquires the identification information for specifying the user terminal 10*a* encrypted with the service-specific encryption key key_S from the user terminal 10*b*. The network service n0 decrypts the identification information encrypted with the encryption key key_S with its own decryption key. Accordingly, the network service n0 acquires the user ID "A_account" and the device ID "A_dev_id."

The network service n0 searches the social graph based on the acquired identification information and checks whether the user terminal 10*a* and the user terminal 10*b* are associated. In the example illustrated in FIG. 15, the network service n0 checks whether the user ID "A_account" and the device ID "A_dev_id" are associated with the user ID "B_account" and the device ID "B_dev_id" through the social graph, respectively.

When the user terminal 10*a* and the user terminal 10*b* are associated, the network service n0 acquires the encryption key key_A associated with the user terminal 10*a* through the social graph.

(Step S233)

When the encryption key key_A can be acquired, the network service n0 encrypts the acquired encryption key key_A with the encryption key key_A managed in the network service n0 associated with the user terminal 10*b*. The encryption key key_A encrypted with the encryption key key_B will be described below as "key_B:key_A" in some cases. The network service n0 returns the encryption key "key_B:key_A" encrypted with the encryption key key_B to the key acquisition unit 142 of the user terminal 10*b*.

Also, when acquisition of the encryption key key_A fails, the network service n0 may notify the user terminal 10*b* of the fact that acquisition of the encryption key key_A has failed. When a notification from the network service n0 is received, the user terminal 10b can recognize that the user terminal 10b itself is not associated with the user terminal 10a in the network service n0. In this case, the user terminal 10b may consider that the user terminal 10a is not a reliable partner and terminate a series of processes without establishing communication.

When the encrypted encryption key "key_B:key_A" is acquired, the key acquisition unit 142 of the user terminal 10b decrypts the acquired encryption key "key_B:key_A" with the decryption key corresponding to the user terminal 10b stored in the key information storage unit 143. Accordingly, the key acquisition unit 142 of the user terminal 10b acquires the encryption key key_A. When the encryption key key_A is acquired, the key acquisition unit 142 of the user terminal 10b outputs the encryption key key_A in association with the user ID, the device ID, and the ID type d110 acquired from the user terminal 10a to the authentication processing unit 144 of the user terminal 10b.

Also, since the following processes are the same as those of "1.4. Communication sequences (method in which identification information is not encrypted)" described above, details will be omitted.

As described above, when mutual authentication is performed based on the "method in which identification information is encrypted," the user terminals 10a and 10b can encrypt each other's identification information and transmit and receive the encrypted information. Accordingly, the user terminals 10a and 10b can perform safer mutual authentication compared to the "method in which identification information is encrypted."

1.6. Communication Sequences (Method Using a Partner Key)

Figure 16:
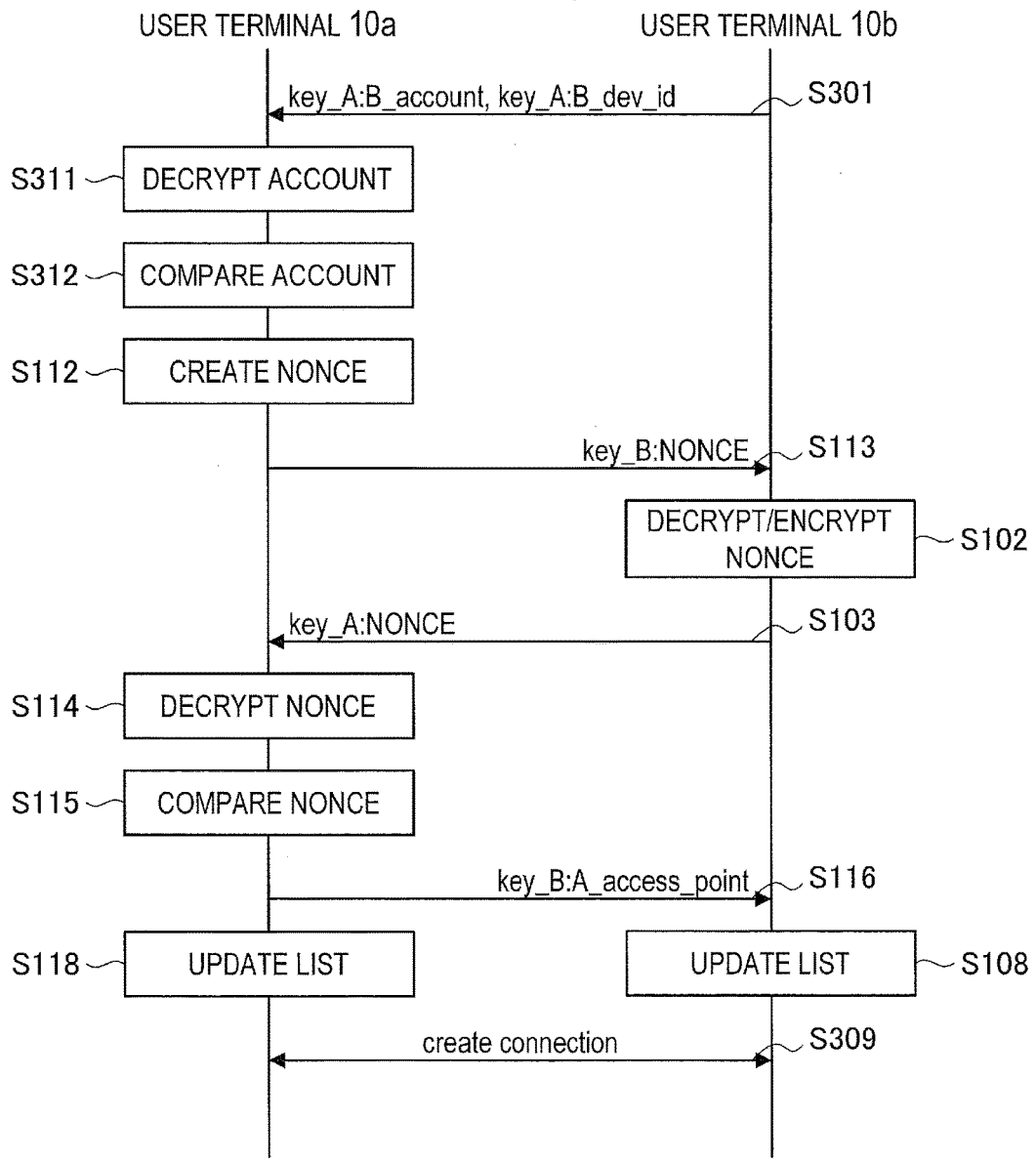
FIG. 16 is a sequence diagram illustrating an exemplary communication processing sequence in the wireless communication system according to the embodiment.

Next, communication sequences when each of the user terminals 10a and 10b has already acquired an encryption key (public key) of a partner and authenticates the other using the encryption key of the partner in the wireless communication system according to the embodiment will be described with reference to FIG. 16. FIG. 16 is a sequence diagram illustrating an exemplary communication processing sequence in the wireless communication system according to the embodiment and illustrates a series of sequences when a public key of a communication partner has already been acquired. Also, a case in which the user terminal 10b receives the beacon b10 broadcast from the user terminal 10a will be described below.
(Step S301)

The user terminal 10b receives the beacon b10 broadcast from the user terminal 10a. In this case, the user terminal 10b is operated as the user terminal 10 at a side on which identification information is received (refer to FIG. 5). That is, the identification information acquisition unit 141 of the user terminal 10b acquires the identification information for specifying the user terminal 10a from the user terminal 10a. In this case, the identification information acquisition unit 141 of the user terminal 10b also acquires information indicating the ID type d110.

As a specific example, the identification information acquisition unit 141 of the user terminal 10b acquires the communication data d20 from the user terminal 10a as the beacon b10. The identification information acquisition unit 141 of the user terminal 10b extracts each owner information field d253 stored in the owner information d250 from the acquired communication data d20. The identification information acquisition unit 141 of the user terminal 10b refers to the ID type d110 stored in the ID type area d254 of the extracted owner information field d253 and checks whether the user terminal 10a permits the "method using a partner key" as the mutual authentication method. Specifically, when the ID type d110 includes the owner information d10 of the "encryption account for internal record search," the identification information acquisition unit 141 of the user terminal 10b recognizes that the user terminal 10a permits the "method using a partner key."

When the user terminal 10a permits the "method using a partner key," the identification information acquisition unit 141 of the user terminal 10b extracts the owner information field d253 in which the corresponding ID type d110 is set from the owner information d250 of the beacon b10. Therefore, the identification information acquisition unit 141 extracts the user ID set in the user ID area d255 from the extracted owner information field d253. When the extracted user ID is encrypted with the service-specific encryption key key_S, the identification information acquisition unit 141 accesses the network service n0 indicated in the ID type d110, and decrypts the user ID. Accordingly, the identification information acquisition unit 141 of the user terminal 10b can recognize identification information (for example, the user ID and the device ID) of the user terminal 10a.

Next, the user terminal 10b is operated as the user terminal 10 at a side from which identification information is transmitted. That is, the identification information notification unit 136 of the user terminal 10b acquires the user ID, the device ID, and the ID type d110 from the identification information acquisition unit 141. The identification information notification unit 136 extracts the encryption key associated with the acquired user ID, device ID, and ID type d110 from the key information storage unit 132. Also, the key information storage unit 132 of the user terminal 10b described herein corresponds to the "key information storage unit 143" when the user terminal 10b is operated as "the user terminal 10 at a side on which identification information is received." Therefore, information stored in "the key information storage unit 143" when the user terminal 10b is operated as "the user terminal 10 at a side on which identification information is received," will be described below as being stored similarly in the key information storage unit 132.

When the encryption key has already been exchanged with the user terminal 10a, the identification information notification unit 136 extracts the encryption key key_A corresponding to the user terminal 10a. Also, when the encryption key cannot be extracted, the identification information notification unit 136 may perform mutual authentication with user terminal 10a by either of the "method in which identification information is not encrypted" and the "method in which identification information is encrypted" described above. It will be described below that the identification information notification unit 136 extracts the encryption key key_A.

When the encryption key key_A is extracted, the identification information notification unit 136 of the user terminal 10b extracts the user ID of the network service n0 corresponding to the extracted encryption key key_A from the owner information d10 stored in the identification information storage unit 135. Specifically, the identification information notification unit 136 refers to the ID type d110 of the owner information d10 and specifies the owner information d10 corresponding to the network service n0 corresponding to the encryption key key_A. The identification information notification unit 136 may extract the user ID from the owner ID d120 of the specified owner information d10.

The identification information notification unit 136 of the user terminal 10b encrypts the identification information for specifying the user terminal 10b with the encryption key key_A. In the example illustrated in FIG. 16, the identification information notification unit 136 of the user terminal 10b encrypts the user ID "B_account" of the user ub and the device ID "B_dev_id" for specifying the user terminal 10b in the network service n0 with the encryption key key_A. Also, the user ID "B_account" encrypted with the encryption key key_A will be described below as "key_A:B_account" in some cases. Similarly, the device ID "B_dev_id" encrypted with the encryption key key_A is described as "key_A:B_dev_id" in some cases.

The identification information notification unit 136 of the user terminal 10b transmits identification information for specifying the user terminal 10b encrypted with the encryption key key_A to the user terminal 10a. In this case, the identification information notification unit 136 may also transmit the ID type d110 indicating that identification information to be transmitted is "encryption account for internal record search" to the user terminal 10a. According to the ID type d110, the user terminal 10a can recognize a network service n0 to which the received identification information corresponds and encryption with its own encryption key key_A. Also, it will be described below that the identification information notification unit 136 transmits the ID type d110 to the user terminal 10a. In addition, it will be described below that the identification information notification unit 136 of the user terminal 10b transmits the encrypted user ID "key_A:B_account" and the encrypted device ID "key_A:B_dev_id" to the user terminal 10a. In addition, it is assumed below that information is unicast between the user terminals 10a and 10b based on the communication data d30a illustrated in FIG. 13.

(Step S311)

The identification information acquisition unit 141 of the user terminal 10a acquires the user ID "B_account" and the device ID "B_dev_id" encrypted with the encryption key key_A from the user terminal 10b as the identification information for specifying the user terminal 10b.

The identification information acquisition unit 141 determines whether the acquired identification information indicates the "encryption account for internal record search" based on the ID type d110 acquired from the user terminal 10b. It is described herein that the acquired ID type d110 indicates the "encryption account for internal record search." The identification information acquisition unit 141 of the user terminal 10a decrypts the encrypted user ID "key_A:B_account" and the encrypted device ID "key_A:B_dev_id" with the decryption key corresponding to the user terminal 10a stored in the key information storage unit 143. Accordingly, the identification information acquisition unit 141 acquires the decrypted user ID "B_account" and device ID "B_dev_id."

(Step S312)

The identification information acquisition unit 141 extracts a type of the network service n0 indicated by the ID type d110 and the encryption key associated with the decrypted user ID "B_account" and device ID "B_dev_id" from the key information storage unit 143. In this case, the encryption key key_B corresponding to the user terminal 10b is extracted.

(Step S112)

The authentication processing unit 144 of the user terminal 10a encrypts data based on the extracted encryption key key_B corresponding to the user terminal 10b and executes a process of mutual authentication with the user terminal 10b specified by the acquired user ID and device ID. Also, the following processes are the same as those of "1.4. Communication sequences (method in which identification information is not encrypted)" and "1.5. Communication sequences (method in which identification information is encrypted)" described above. Therefore, details will not be described.

As described above, when mutual authentication is performed based on the "method using a partner key," the user terminals 10a and 10b need not check whether the user terminals 10a and 10b are associated through the network service n0. Therefore, it is possible to restrict the number of times the user terminals 10a and 10b access the network service n0, compared to the "method in which identification information is not encrypted" and the "method in which identification information is encrypted." Accordingly, the user terminals 10a and 10b can reduce a load according to access to an external network such as the network service n0 when mutual authentication is performed.

Also, in the above-described example, the user terminal 10b determines whether the "method using a partner key" is available according to whether the owner information d250 includes information of the ID type d110 indicating the "encryption account for internal record search." On the other hand, when the encryption key has already been exchanged with the user terminal 10a, the user terminal 10b may be operated to select the "method using a partner key" automatically. In this case, the user terminal 10b specifies the identification information of the user terminal 10a based on the owner information d10 whose ID type d110 is an "encryption account" or an "account." Therefore, when the encryption key associated with the specified identification information has already been acquired, the user terminal 10b may be operated to select the "method using a partner key." Also, in this case, information indicating the "encryption account for internal record search" need not necessarily be set in the ID type d110.

1.7. Conclusion

As described above, in the wireless communication system according to the embodiment, for example, when the user terminal 10a receives a connection request from the other user terminal 10b, it is checked whether the user terminals 10a and 10b are associated in the network service n0. Therefore, when the user terminals 10a and 10b are associated in the network service n0, the user terminal 10a acquires the encryption key key_B corresponding to the user terminal 10b through the network service n0, and performs encrypted communication with the user terminal 10b. That is, in the wireless communication system according to the embodiment, when interconnection is established between the different user terminals 10a and 10b, it is possible to ensure security simply and safely when communication is performed. Accordingly, a user of each of the user terminals 10 enables the user terminal 10 that he or she operates to participate in the ad-hoc network without executing a complex operation.

Also, in the above-described example, an example in which the user ID and the device ID are combined to uniquely specify the user terminal 10 in the network service n0 was described. However, as long as the user terminal 10 can be uniquely specified in the network service n0, the present disclosure is not limited to the above-described example. For example, when the encryption key is not properly used for each user terminal 10 used by each user, the user terminal 10 of the connection destination may be specified to acquire the encryption key only with an association between users in the network service n0.

In addition, the association according to the social graph in the network service n0 is not limited to only an association between users. For example, the user terminals 10 possessed by users may also be directly associated. For example, FIG. 17 is a diagram illustrating another exemplary association between the user terminals 10 in the network service n0, and describes an example when the user terminals 10 are directly associated.

Figure 17:
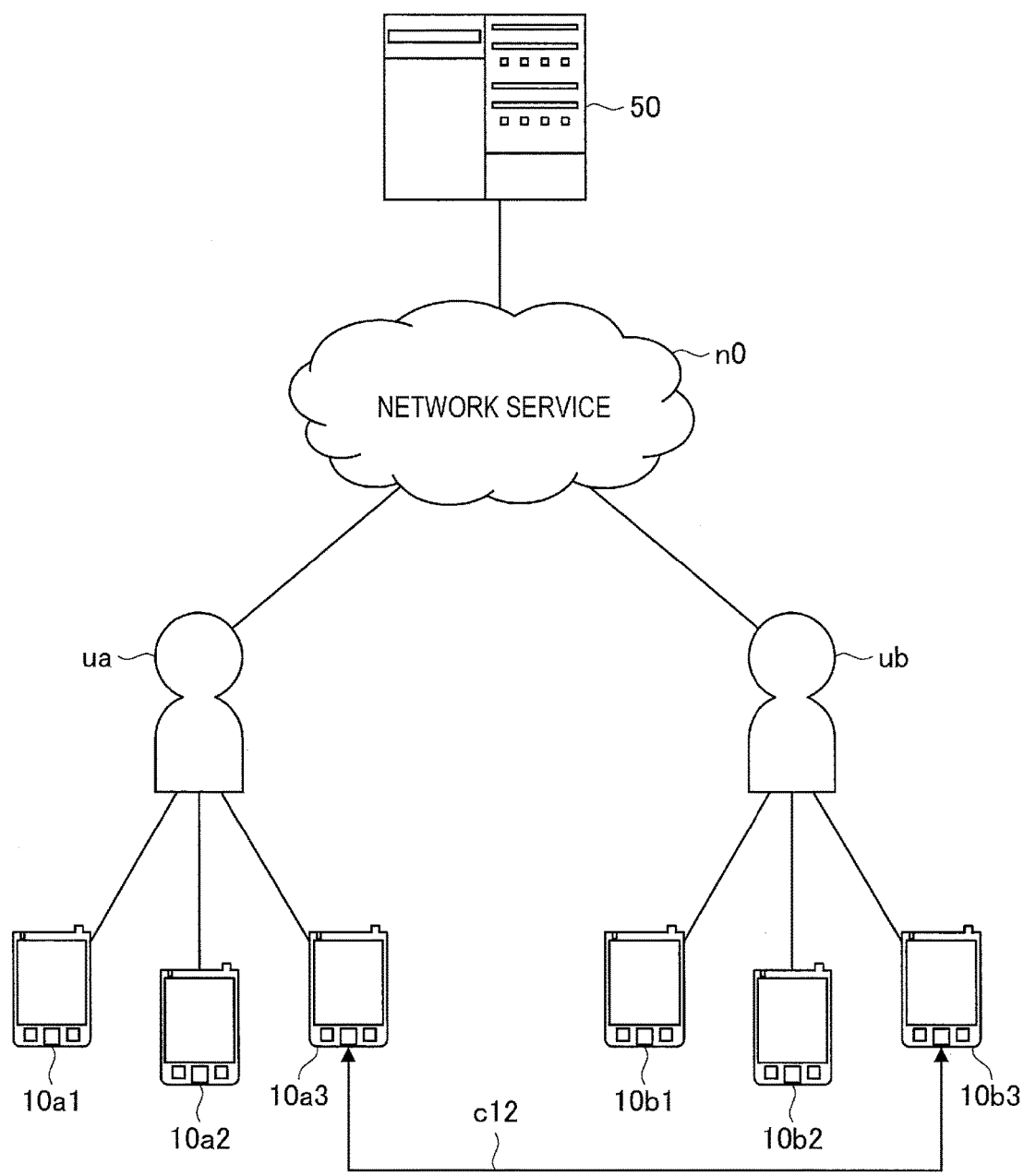
FIG. 17 is a diagram illustrating another exemplary association between user terminals in a network service.

In the example illustrated in FIG. 17, the user terminal 10a3 possessed by the user ua and the user terminal 10b3 possessed by the user ub are directly associated (a relation c12). In such a configuration, since the user terminal 10 of the connection destination can be specified based on the social graph associating the user terminals 10, the user ua and the user ub need not necessarily be associated.

In addition, as another example, the user terminal 10 may directly register for the network service n0 without using the user ID. For example, FIG. 18 is a diagram illustrating another exemplary association between the user terminals 10 in the network service n0 and illustrates an example when the user terminal 10 directly registers for the network service n0.

Figure 18:
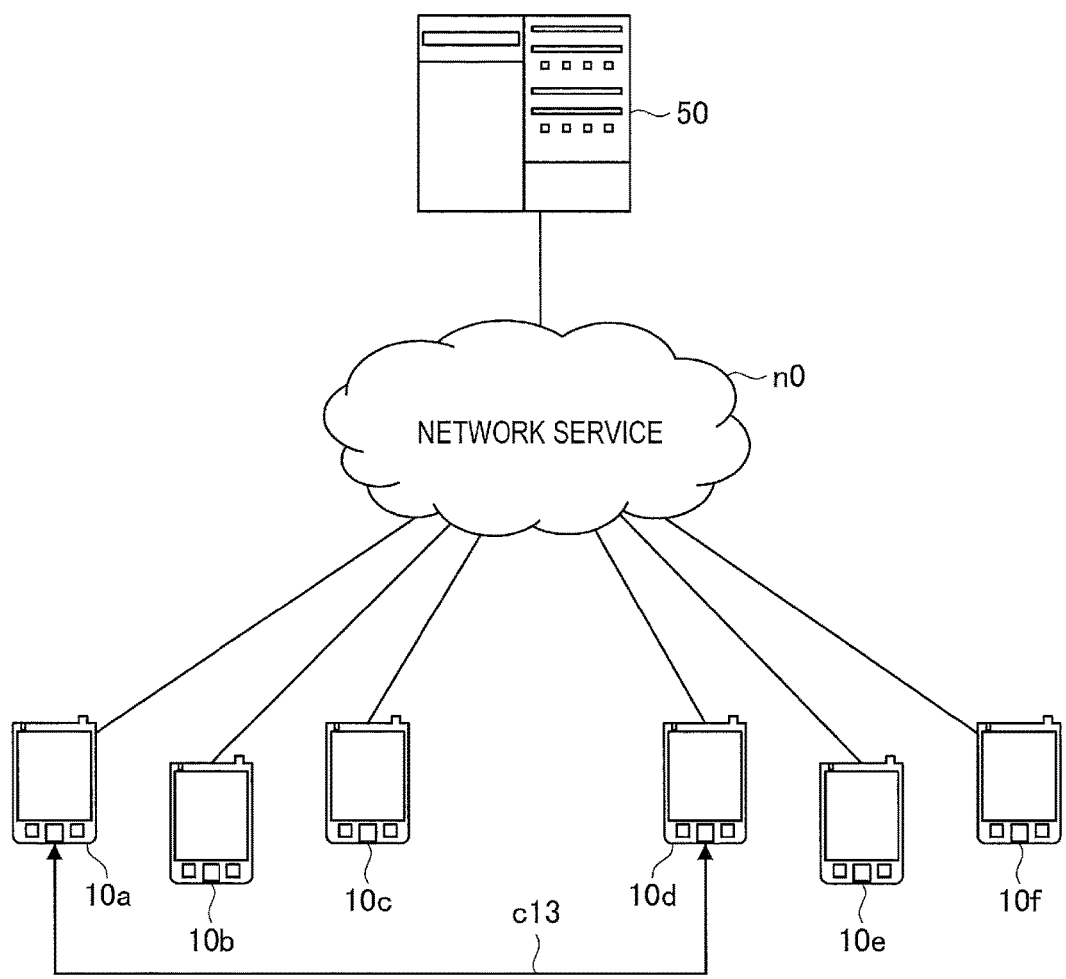
FIG. 18 is a diagram illustrating another exemplary association between user terminals in a network service.

In the example illustrated in FIG. 18, the user terminals 10a to 10f register for the network service n0, and the user terminal 10a and the user terminal 10d are directly associated (a relation c13). Even in such a configuration, the user terminal 10 of the connection destination can be specified based on the social graph with the association between the user terminals 10.

Also, the above-described example is only an example. As long as the encryption key can be acquired by specifying the user terminal 10 of the connection destination through the social graph in the network service n0, a type and an association method of associated information are not limited.

2. Second Embodiment

2.1. Outline of Wireless Communication System

In the wireless communication system according to the first embodiment, an example in which both the user terminals 10a and 10b each acquire the encryption key of the partner from the network service n0 and perform mutual authentication was described. The second embodiment is different from the first embodiment in that either of the user terminals 10a and 10b may acquire the encryption key key_B of the partner from the network service n0.

Specifically, in the second embodiment, for example, the user terminal 10a acquires the encryption key key_B of the partner from the network service n0, encrypts its own encryption key key_A with the acquired encryption key key_B, and transmits the result to the partner. In addition, the user terminal 10b acquires the encrypted encryption key key_A from the user terminal 10a, decrypts the acquired encrypted encryption key key_A with its own decryption key, and thus acquires the encryption key key_A. Accordingly, since only the user terminal 10b may access the network service n0, it is possible to efficiently perform communication sequences between the user terminals 10a and 10b, compared to the wireless communication system according to the first embodiment. Hereinafter, details of the wireless communication system according to the embodiment will be described.

Figure 19:
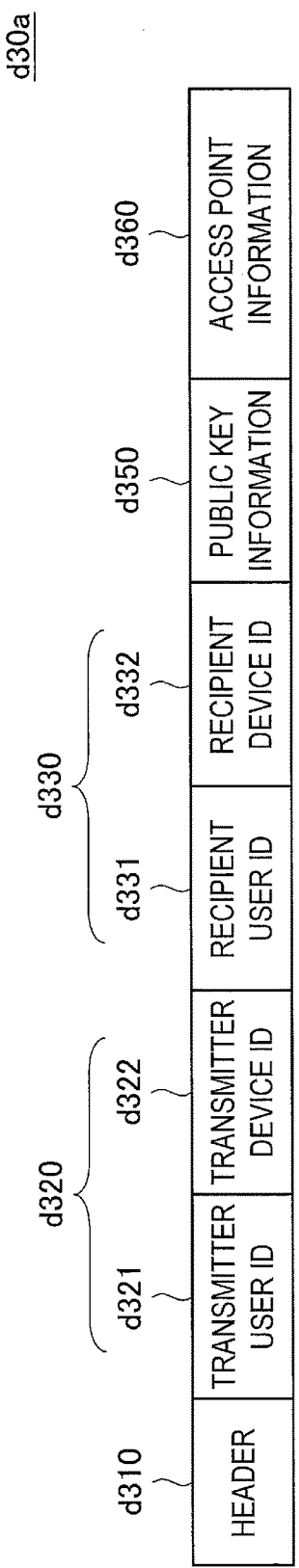
FIG. 19 is a diagram illustrating an exemplary data structure of communication data for transmitting and receiving information in a wireless communication system according to a second embodiment of the present disclosure.

First, communication data d30b used when information is transmitted and received (is unicast) with a specific partner in the wireless communication system according to the embodiment will be described with reference to FIG. 19. FIG. 19 is a diagram illustrating an exemplary data structure of the communication data d30b for transmitting and receiving information in the wireless communication system according to the embodiment.

As illustrated in FIG. 19, the communication data d30b according to the embodiment is different from the communication data d30a (refer to FIG. 13) according to the first embodiment in that the NONCE d340 is not included. In the wireless communication system according to the embodiment, for example, the user terminal 10a encrypts the encryption key key_A corresponding to the user terminal 10a with the encryption key key_B of the user terminal 10b serving as the connection destination in place of the NONCE, and transmits the result to the other user terminal 10b. The encryption key key_A encrypted with the encryption key key_B can be decrypted by only the user terminal 10b with the decryption key corresponding to user terminal 10b. Therefore, the user terminal 10a can safely send the encryption key key_A corresponding to the user terminal 10a to only the user terminal 10b that can decrypt information encrypted with the encryption key key_B. Also, details will be described below.

In addition, since the other information is the same as that of the communication data d30a according to the first embodiment, details will not be described.

2.2. Communication Sequences (Method in which Identification Information is not Encrypted)

Figure 20:
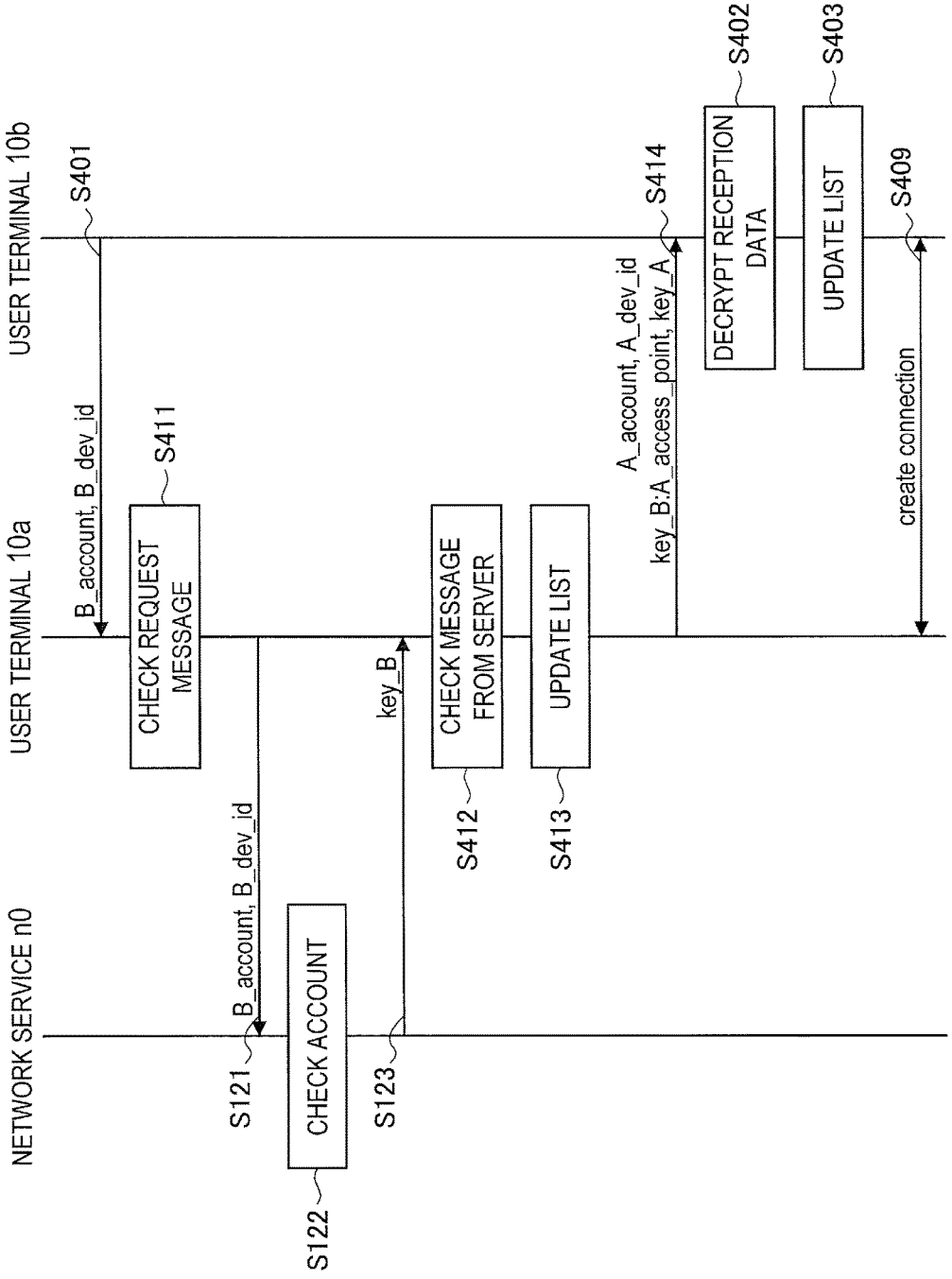
FIG. 20 is a sequence diagram illustrating an exemplary communication processing sequence in the wireless communication system according to the embodiment.

Next, the communication sequences of the wireless communication system according to the present embodiment will be described. First, communication sequences when identification information is not encrypted in the communication system according to the embodiment will be described with reference to FIG. 20. FIG. 20 is a sequence diagram illustrating an exemplary communication processing sequence in the wireless communication system according to the embodiment and illustrates a series of sequences when identification information is not encrypted. Also, the example illustrated in FIG. 20 illustrates a case in which the user terminal 10b issues a connection request to the user terminal 10a.

(Step S401)

First, the identification information notification unit 136 of the user terminal 10b distributes the identification information for specifying the user terminal 10b in the network service n0 to the user terminal 10a. In the example illustrated in FIG. 20, the identification information notification unit 136 distributes the user ID "B_account" of the user ub and the device ID "B_dev_id" of the user terminal 10b in the network service n0 to the user terminal 10a as identification information.

In this case, the identification information notification unit 136 of the user terminal 10b may also notify the user terminal 10a of the ID type d110. Accordingly, the user terminal 10a that has received the ID type d110 can recognize a network service n0 to which the user ID "B_account" belongs, and a method that is permitted as the mutual authentication method based on the ID type.

Also, this section describes that the "method in which identification information is not encrypted" is set as the mutual authentication method in the ID type d120. Cases in which the "method in which identification information is encrypted" and the "method using a partner key" are set as the mutual authentication method will be described in "2.3. Communication sequences (method in which identification information is encrypted)" and "2.4. Communication sequences (method using a partner key)," respectively.

In addition, the identification information notification unit 136 of the user terminal 10b may broadcast and distribute the identification information for specifying the user terminal 10b to the user terminal 10a. In this case, the identification information notification unit 136 of the user terminal 10b may distribute (broadcast) the identification information for specifying the user terminal 10b to the user terminal 10a, for example, as the beacon b10 (refer to FIG. 9) when the passive scan is performed. In addition, the identification information notification unit 136 of the user terminal 10b may unicast the identification information toward the user terminal 10a. In this case, the identification information notification unit 136 of the user terminal 10b may distribute (unicast) the identification information for specifying the user terminal 10b to the user terminal 10a as the response message b30 in response to the request message b20 from the user terminal 10a.

(Step S411)

When the identification information notification unit 136 of the user terminal 10b unicasts the identification information for specifying the user terminal 10b to the user terminal 10a, the user terminal 10a may determine whether information acquired from the user terminal 10b is addressed to the user terminal 10a. In this case, the user terminal 10a may also determine whether information acquired from the user terminal 10b is addressed to the user terminal 10a according to, for example, whether its own information (that is, the user ID of the user ua and the device ID of the user terminal 10a) is set in the recipient information d330 of the communication data d30b (refer to FIG. 19). Also, when the information acquired from the user terminal 10b is not addressed to the user terminal 10a, the user terminal 10a may transmit a rejection notice to the user terminal 10b and immediately terminate the communication sequence.

(Steps S121 to S123)

Also, processes of steps S121 to S123 according to the embodiment are the same as those of steps S121 to S123 (refer to FIG. 14) of the wireless communication system according to the first embodiment described above. That is, the identification information acquisition unit 141 of the user terminal 10a transmits identification information for specifying the acquired user terminal 10b to the network service n0. As a response thereto, the key information acquisition unit 141 of the user terminal 10a acquires the encryption key key_B corresponding to the user terminal 10b. The key information acquisition unit 141 outputs the acquired encryption key key_B in association with the user ID, the device ID, and the ID type d110 acquired by the identification information acquisition unit 141 to the authentication processing unit of the authentication processing unit 144 of the user terminal 10a. Also, it is assumed below that information is unicast among the user terminal 10a, the user terminal 10b, and the network service n0 based on the communication data d30b illustrated in FIG. 19.

(Step S412)

Also, when acquisition of the encryption key key_B fails, the network service n0 may notify the user terminal 10a of the fact that acquisition of the encryption key key_B has failed. When a notification from the network service n0 is received, the user terminal 10a can recognize that the user terminal 10a itself is not associated with the user terminal 10b in the network service n0. In this case, the user terminal 10a may consider that the user terminal 10b is not a reliable partner and terminate a series of processes without establishing communication. In this case, the user terminal 10a may notify the user terminal 10b of failure of mutual authentication.

In addition, even when there is no response from the network service n0 within a predetermined time (that is, when acquisition of the encryption key key_B may be impossible within a predetermined time), the user terminal 10b may similarly notify the user terminal 10a of the fact that acquisition of the encryption key key_B has failed.

(Step S413)

When the encryption key key_B is acquired, the authentication processing unit 144 of the user terminal 10a checks whether the acquired encryption key key_B is stored in the key information storage unit 143. When the encryption key key_B is not stored in the key information storage unit 143, the authentication processing unit 144 of the user terminal 10a stores the encryption key key_B associated with the user ID, the device ID, and the ID type d110 in the key information storage unit 143. In this manner, when the encryption key key_B is stored in the key information storage unit 143, the authentication processing unit 144 of the user terminal 10a need not acquire the encryption key key_B through the network service n0 again when communication with the user terminal 10b is performed later. That is, as a method of mutual authentication with the user terminal 10b, the authentication processing unit 144 of the user terminal 10a can use the "method using a partner key" below.

(Step S414)

In addition, the authentication processing unit 144 of the user terminal 10a extracts the encryption key key_A corresponding to the user terminal 10a stored in the key information storage unit 143.

The authentication processing unit 144 of the user terminal 10a encrypts information for establishing interconnection with the user terminal 10a with the encryption key key_B. As the information for establishing interconnection with the user terminal 10a, for example, information of the access point is exemplified. The information for establishing interconnection with the user terminal 10a will be described as "A_access_point" below in some cases. Note that, in the following description, the A_access_point encrypted with the encryption key key_B will be described as "key_B: A_access_point" in some cases.

The authentication processing unit 144 of the user terminal 10a transmits the identification information for specifying the user terminal 10a, and the key_B:A_access_point encrypted with the encryption key key_A and the encryption key key_B to the user terminal 10b. Also, in the example illustrated in FIG. 20, the authentication processing unit 144 uses the user ID "A_account" of the user ua and the device ID "A_dev_id" of the user terminal 10a in the network service n0 as identification information. Also, it will be described below that the authentication processing unit 144 transmits the user ID "A_account" and the device ID "A_dev_id" to the user terminal 10b as identification information.

In addition, in this case, the user terminal 10a may transmit the ID type d110 to the user terminal 10b as information for specifying a type of the network service n0. Also, it will be described below that the authentication processing unit 144 of the user terminal 10a is used to transmit the ID type d110 to the user terminal 10b.

(Step S402)

The authentication processing unit 133 of the user terminal 10b acquires A_account, A_dev_id, and key_A, and the key_B:A_access_point encrypted with the encryption key key_B from the user terminal 10a. In addition, in this case, the authentication processing unit 133 of the user terminal 10b may also acquire the ID type d110 from the user terminal 10a. When the ID type d110 is acquired, the authentication processing unit 133 can recognize a network service n0 to which the user ID "A_account" corresponds.

The authentication processing unit 133 of the user terminal 10b decrypts the key_B:A_access_point with the decryption key that corresponds to the user terminal 10b and is stored in the key information storage unit 132. Accordingly, the authentication processing unit 133 acquires the decrypted access point information A_access_point.

Also, a user terminal 10 other than the user terminal 10b cannot decrypt data encrypted with the encryption key key_B. Therefore, the access point information A_access_point is not acquired in a user terminal 10 other than the user terminal 10b.

(Step S403)

The authentication processing unit 133 of the user terminal 10b checks whether the acquired encryption key key_A is stored in the key information storage unit 132. Also, the key information storage unit 132 of the user terminal 10b described herein corresponds to "the key information storage unit 143" when the user terminal 10b is operated as "the user terminal 10 at a side on which identification information is received." Therefore, information stored in "the key information storage unit 143" when the user terminal 10b is operated as "the user terminal 10 at a side on which identification information is received will be described below as being similarly stored in the key information storage unit 132.

When the encryption key key_A is not stored in the key information storage unit 132, the authentication processing unit 133 of the user terminal 10b associates the acquired user ID "A_account," device ID "A_dev_id," and ID type d110 with the encryption key key_A. The authentication processing unit 133 stores the encryption key key_A associated with the user ID "A_account," the device ID "A_dev_id," and the ID type d110 in the key information storage unit 132.

(Step S409)

In addition, when the key_B:A_access_point is decrypted, the authentication processing unit 133 of the user terminal 10b is connected to the user terminal 10a based on the decrypted access point information A_access_point. Accordingly, the interconnection is established between the user terminal 10a and the user terminal 10b.

As described above, in the wireless communication system according to the embodiment, only the user terminal 10a accesses the network service n0 and acquires the encryption key key_B, and the user terminal 10b can acquire the encryption key key_A of the user terminal 10a from the user terminal 10a. That is, since the user terminal 10b need not access an external network such as the network service n0, it is possible to reduce a load according to access to the external network, compared to the wireless communication system according to the first embodiment. In addition, the encryption key key_A of the user terminal 10a is encrypted with the encryption key key_B corresponding to the user terminal 10b and transmitted to the user terminal 10b. Therefore, since a user terminal 10 other than the user terminal 10b cannot decrypt the encryption key key_A even when the encrypted encryption key key_A is acquired, it is possible to safely transmit the encryption key key_A to the user terminal 10b.

2.3. Communication Sequences (Method in which Identification Information is Encrypted)

Figure 21:
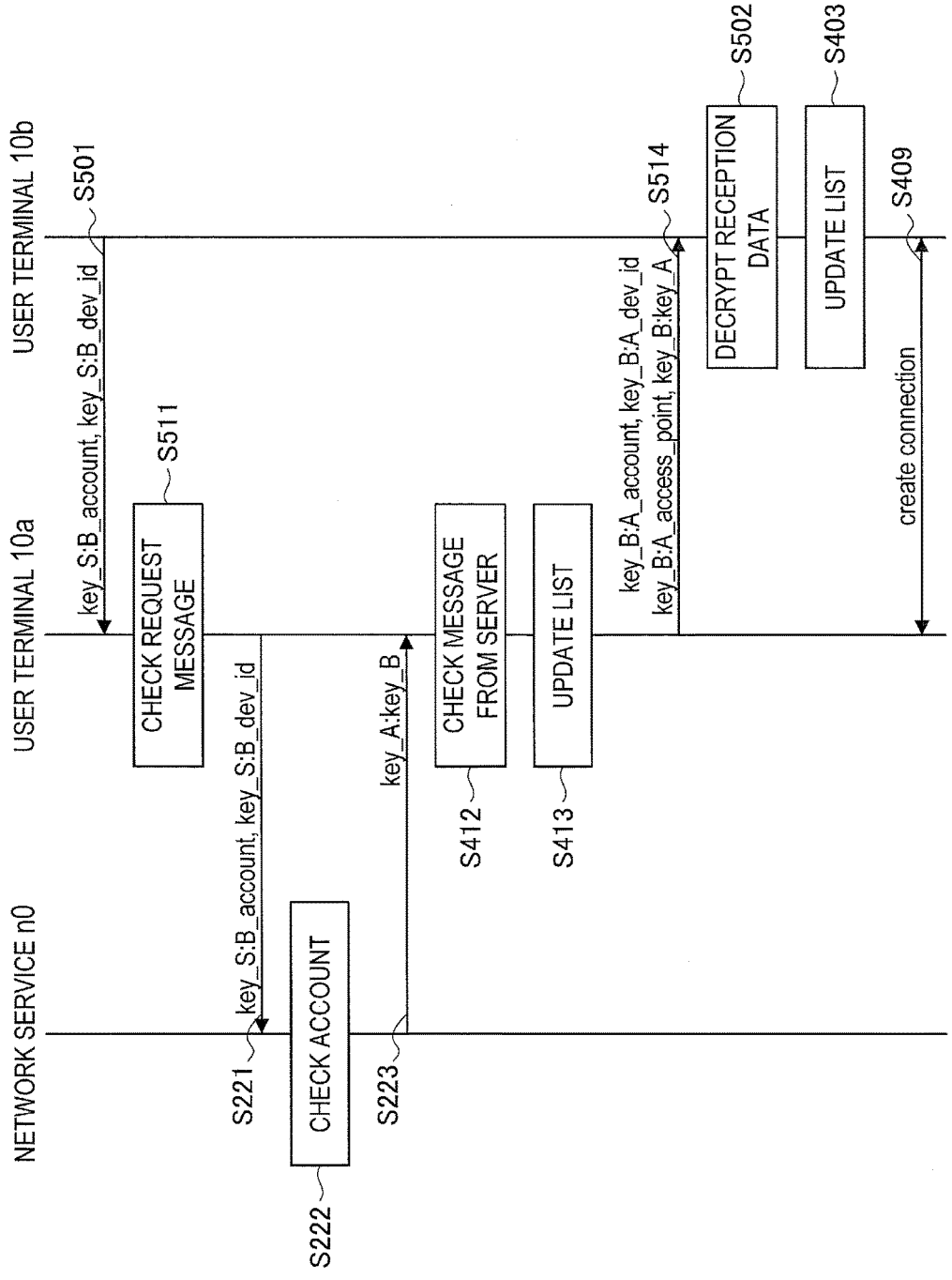
FIG. 21 is a sequence diagram illustrating another exemplary communication processing sequence in the wireless communication system according to the embodiment.

Next, communication sequences when identification information is encrypted in the wireless communication system according to the embodiment will be described with reference to FIG. 21. FIG. 21 is a sequence diagram illustrating an exemplary communication processing sequence in the wireless communication system according to the embodiment and illustrates a series of sequences when identification information is encrypted. Also, the example illustrated in FIG. 21 illustrates a case in which the user terminal 10b issues a connection request to the user terminal 10a. Also, descriptions will be provided below focusing on parts that are different from the content described in "2.2. Communication sequences (method in which identification information is not encrypted)" and the same parts will not be described.

(Step S501)

First, the identification information notification unit 136 of the user terminal 10b distributes identification information encrypted with the encryption key key_S within the identification information for specifying the user terminal 10b stored in the identification information storage unit 135 as the owner information d10 to the user terminal 10a. The encryption key key_S is a specific encryption key of the network service n0 managed in the network service n0. In the example illustrated in FIG. 21, the identification information notification unit 136 distributes the user ID "B_account" of the user ub, and the device ID "B_dev_id" of the user terminal 10b in the network service n0, which are encrypted with the encryption key key_S, as identification information. Also, the user ID "B_account" encrypted with the encryption key key_S will be described below as "key_S:B_account" in some cases. Similarly, the device ID "B_dev_id" encrypted with the encryption key key_S will be described as "key_S:B_dev_id" in some cases. That is, in FIG. 21, the identification information notification unit 136 of the user terminal 10b distributes the encrypted user ID "key_S:B_account," and the encrypted device ID "key_S:B_dev_id" to the user terminal 10a.

Also, in this case, the identification information notification unit 136 of the user terminal 10b may also notify the user terminal 10a of the ID type d110. The user terminal 10a that has received the ID type d110 can recognize a network service n0 to which the user ID "key_S:B_account" belongs, and a method that is permitted as the mutual authentication method based on the ID type. Also, it is described herein that the "method in which identification information is encrypted" is set as the mutual authentication method in the ID type d120. That is, according to the ID type d120, the user terminal 10a can recognize that the user ID "key_S:B_account" is encrypted with the service-specific encryption key key_S.

(Step S511)

When the identification information notification unit 136 of the user terminal 10b unicasts the identification information for specifying the user terminal 10b to the user terminal 10a, the user terminal 10a may determine whether information acquired from the user terminal 10b is addressed to the user terminal 10a. In this case, the user terminal 10a may also determine whether information acquired from the user terminal 10b is addressed to the user terminal 10a according to, for example, whether its own information (that is, the user ID of the user ua and the device ID of the user terminal 10a) is set in the recipient information d330 of the communication data d30b (refer to FIG. 19). Also, when information stored in the recipient information d330 is encrypted with the service-specific encryption key key_S, the user terminal 10a may access the network service n0 and decrypt information encrypted with the encryption key key_S. Similarly, when information stored in the recipient information d330 is encrypted with the encryption key key_A corresponding to the user terminal a, the user terminal 10a may decrypt information encrypted with the encryption key key_A based on the decryption key corresponding to the user terminal a. Also, when the information acquired from the user terminal 10b is not addressed to the user terminal 10a, the user terminal 10a may transmit a rejection notice to the user terminal 10b and immediately terminate the communication sequence.

(Steps S221 to S223)

Also, processes of S221 to S223 according to the embodiment are the same as those of S221 to S223 (refer to FIG. 15) of the wireless communication system according to the first embodiment described above. That is, the identification information acquisition unit 141 of the user terminal 10a transmits acquired encrypted identification information (that is, the user ID "key_S:B_account" and the device ID "key_S:B_dev_id") for specifying the user terminal 10b to the network service n0. As a response thereto, the key information acquisition unit 141 of the user terminal 10a acquires the encryption key key_B that is encrypted with the encryption key key_A corresponding to the user terminal 10a and corresponds to the user terminal 10b (that is, the encryption key "key_A:key_B") from the network service n0.

When the encrypted encryption key "key_A:key_B" is acquired, the key acquisition unit 142 of the user terminal 10a decrypts the acquired encryption key "key_A:key_B" with the decryption key corresponding to the user terminal 10a stored in the key information storage unit 143. Accordingly, the key acquisition unit 142 of the user terminal 10a acquires the encryption key key_B. When the encryption key key_B is acquired, the key acquisition unit 142 of the user terminal 10a outputs the encryption key key_B in association with the user ID, the device ID, and the ID type d110 acquired from the user terminal 10b to the authentication processing unit 144 of the user terminal 10a.

(Step S412)

Also, when acquisition of the encryption key key_B fails, the network service n0 may notify the user terminal 10a of the fact that acquisition of the encryption key key_B has failed. When a notification from the network service n0 is received, the user terminal 10a can recognize that the user terminal 10a itself is not associated with the user terminal 10b in the network service n0. In this case, the user terminal 10a may consider that the user terminal 10b is not a reliable partner and terminate a series of processes without establishing communication.

In addition, even when there is no response from the network service n0 within a predetermined time (that is, when acquisition of the encryption key key_B may be impossible within a predetermined time), the user terminal 10b may similarly notify the user terminal 10a of the fact that acquisition of the encryption key key_B has failed.

(Step S413)

When the encryption key key_B can be acquired, the authentication processing unit 144 of the user terminal 10a checks whether the acquired encryption key key_B is stored in the key information storage unit 143. When the encryption key key_B is stored, the encryption key keyB is stored in the key information storage unit 143. Also, a process of step S413 according to the embodiment is the same as S413 of the wireless communication system according to the first embodiment described above (refer to FIG. 15). Therefore, details will not be described.

(Step S514)

In addition, the authentication processing unit 144 of the user terminal 10a extracts the encryption key key_A corresponding to the user terminal 10a stored in the key information storage unit 143. The authentication processing unit 144 of the user terminal 10a encrypts the extracted encryption key key_A, information for establishing interconnection with itself (the user terminal 10a) and identification information for specifying itself with the encryption key key_B. In the example illustrated in FIG. 20, the authentication processing unit 144 uses the user ID "A_account" of the user ua and the device ID "A_dev_id" of the user terminal 10a in the network service n0 as identification information for specifying itself. In addition, as the information for establishing interconnection with the user terminal 10a, for example, information of the access point is exemplified. Hereinafter, the information for establishing interconnection with the user terminal 10a will be described as "A_access_point" in some cases.

Also, hereinafter, a key_A encrypted with the encryption key key_B will be described as "key_B:key_A," and an A_access_point encrypted with the encryption key key_B will be described as "key_B:A_access_point" in some cases. Similarly, an A_account encrypted with the encryption key key_B will be described as "key_B:A_account" and an A_dev_id encrypted with the encryption key key_B will be described as "key_B:A_dev_id" in some cases.

The authentication processing unit 144 of the user terminal 10a transmits the key_B:A_account, key_B:A_dev_id, key_B:key_A, and key_B:A_access_point encrypted with the encryption key key_B to the user terminal 10b. In this case, the user terminal 10a may also transmit the ID type d110 to the user terminal 10b as information for specifying a type of the network service n0. Also, it will be described below that the authentication processing unit 144 of the user terminal 10a transmits the ID type d110 to the user terminal 10b.

(Step S502)

The authentication processing unit 133 of the user terminal 10b acquires the key_B:A_account, key_B:A_dev_id, key_B:key_A, and key_B:A_access_point encrypted with the encryption key key_B from the user terminal 10a. In addition, in this case, the authentication processing unit 133 of the user terminal 10b may also acquire the ID type d110 from the user terminal 10a. When the ID type d110 can be acquired, the authentication processing unit 133 can recognize a network service n0 to which the user ID "A_account" obtained by decrypting the key_B:A_account corresponds.

The authentication processing unit 133 of the user terminal 10b decrypts the key_B:A_account, the key_B:A_dev_id, the key_B:key_A, and the key_B:A_access_point with the decryption key corresponding to the user terminal 10b stored in the key information storage unit 132. Accordingly, the authentication processing unit 133 acquires the decrypted user ID "B_account" and device ID "B_dev_id," the encryption key key_A, and the access point information A_access_point.

Also, a user terminal 10 other than the user terminal 10b cannot decrypt data encrypted with the encryption key key_B. Therefore, the user ID "A_account," the device ID "A_dev_id," the encryption key key_A, and the access point information A_access_point are not acquired in a user terminal 10 other than the user terminal 10b.

Also, since the following processes are the same as those of "2.2. Communication sequences (method in which identification information is not encrypted)" described above, details will be omitted.

As described above, when mutual authentication is performed based on the "method in which identification information is encrypted," the user terminals 10a and 10b can encrypt each other's identification information and transmit and receive the encrypted information. Accordingly, the user terminals 10a and 10b can perform safer mutual authentication compared to the "method in which identification information is encrypted."

2.4. Communication Sequences (Method Using a Partner Key)

Figure 22:
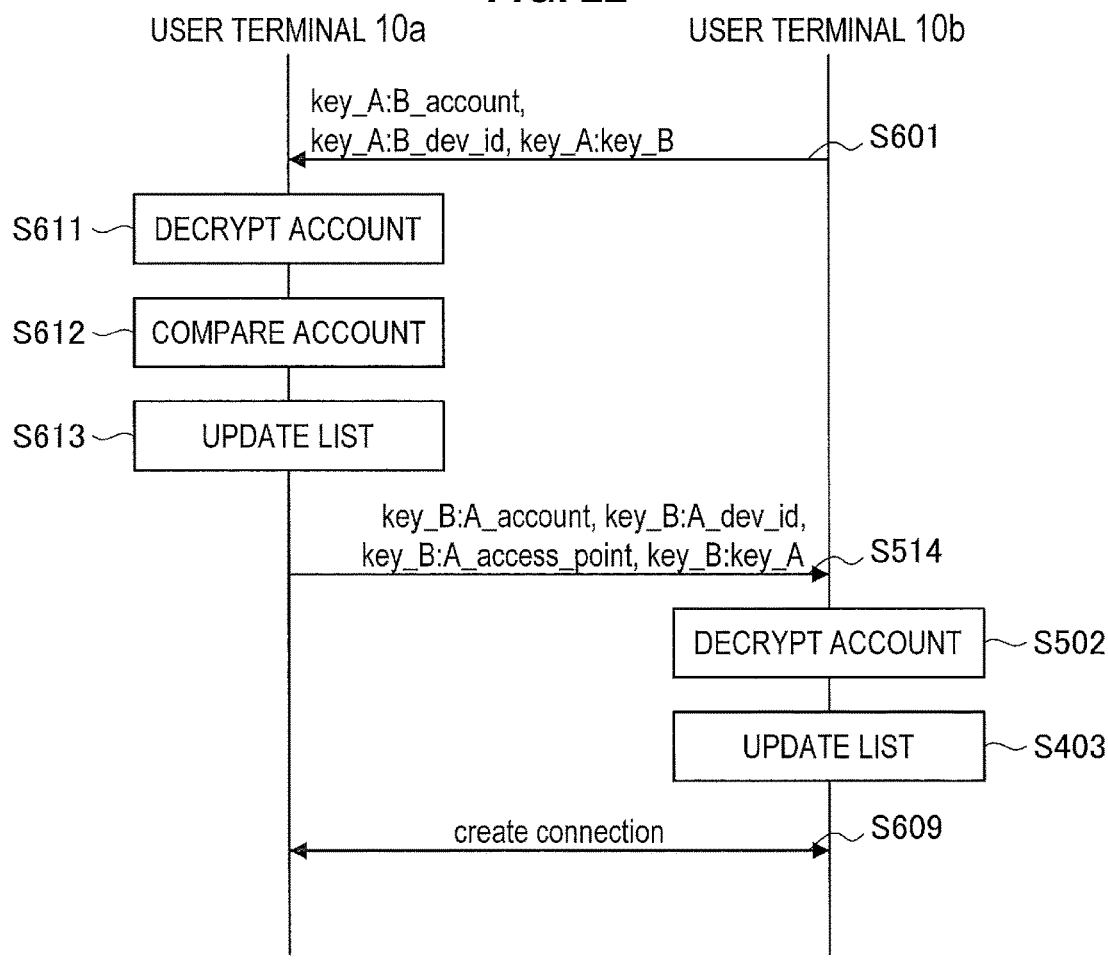
FIG. 22 is a sequence diagram illustrating an exemplary communication processing sequence in the wireless communication system according to the embodiment.

Next, communication sequences when each of the user terminals 10a and 10b has already acquired an encryption key (public key) of a partner and authenticates the other using the encryption key of the partner in the wireless communication system according to the embodiment will be described with reference to FIG. 22. FIG. 22 is a sequence diagram illustrating an exemplary communication processing sequence in the wireless communication system according to the embodiment and illustrates a series of sequences when a public key of a communication partner has already been acquired. Also, a case in which the user terminal 10b receives the beacon b10 broadcast from the user terminal 10a will be described below.

(Step S601)

The user terminal 10b receives the beacon b10 broadcast from the user terminal 10a. In this case, the user terminal 10b is operated as the user terminal 10 at a side on which identification information is received (refer to FIG. 5). That is, the identification information acquisition unit 141 of the user terminal 10b acquires the identification information for specifying the user terminal 10a from the user terminal 10a. In this case, the identification information acquisition unit 141 of the user terminal 10b also acquires information indicating the ID type d110.

Also, an operation of step S601 is the same as the operation of step S301 (refer to FIG. 16) of the wireless communication system according to the first embodiment. That is, the identification information acquisition unit 141 of the user terminal 10b checks whether the user terminal 10a permits the "method using a partner key" as the mutual authentication method based on each piece of information in the beacon b10. In addition, the identification information (for example, the user ID and the device ID) of the user terminal 10a is acquired from the beacon b10. Also, when the identification information is encrypted with the service-specific encryption key key_S, the identification information acquisition unit 141 accesses the network service n0 indicated in the ID type d110 and decrypts the identification information. Also, since a process is the same as the process of step S301 according to the first embodiment, details will not be described.

Next, the user terminal 10b is operated as the user terminal 10 at a side from which identification information is transmitted. That is, the identification information notification unit 136 of the user terminal 10b acquires the user ID, the device ID, and the ID type d110 from the identification information acquisition unit 141. The identification information notification unit 136 extracts the encryption key associated with the acquired user ID, device ID, and ID type d110 from the key information storage unit 143. Here, when the encryption key has already been exchanged with the user terminal 10a, the identification information notification unit 136 extracts the encryption key key_A corresponding to the user terminal 10a. Also, when the encryption key cannot be extracted, the identification information notification unit 136 performs mutual authentication with user terminal 10a by either of the "method in which identification information is not encrypted" and the "method in which identification information is encrypted" described above. It will be described below that the identification information notification unit 136 extracts the encryption key key_A.

Next, the identification information notification unit 136 of the user terminal 10b extracts the user ID of the network service n0 corresponding to the ID type d110 notified of by the user terminal 10b from the owner information d10 stored in the identification information storage unit 135. Specifically, the identification information notification unit 136 refers to the ID type d110 of each piece of owner information d10 and specifies the ID type d110 of the owner information d10 notified of by the user terminal 10b. The identification information notification unit 136 may extract the user ID from the specified owner ID d120 of the owner information d10.

When the encryption key key_A is extracted, the identification information notification unit 136 of the user terminal 10b encrypts the extracted identification information for specifying the user terminal 10b with the encryption key key_A. In the example illustrated in FIG. 22, the identification information notification unit 136 of the user terminal 10b encrypts the user ID "B_account" of the user ub and the device ID "B_dev_id" for specifying the user terminal 10b in the network service n0 with the encryption key key_A. Also, the user ID "B_account" encrypted with the encryption key key_A will be described below as "key_A:B_account" in some cases. Similarly, the device ID "B_dev_id" encrypted with the encryption key key_A is described as "key_A:B_dev_id" in some cases.

The identification information notification unit 136 of the user terminal 10b transmits identification information for specifying the user terminal 10b encrypted with the encryption key key_A to the user terminal 10a. In this case, the identification information notification unit 136 may also transmit the ID type d110 indicating that identification information to be transmitted is "encryption account for internal record search" to the user terminal 10a. According to the ID type d110, the user terminal 10a can recognize a network service n0 to which the received identification information corresponds and encryption with its own encryption key key_A. In addition, the identification information notification unit 136 of the user terminal 10b may unicast the identification information for specifying the user terminal 10b encrypted with the encryption key key_A to the user terminal 10a, or broadcast and transmit the information to the user terminal 10a. Also, it will be described below that the identification information notification unit 136 transmits the ID type d110 to the user terminal 10a. In addition, it will be described below that the identification information notification unit 136 of the user terminal 10b transmits the encrypted user ID "key_A:B_account" and the encrypted device ID "key_A:B_dev_id" to the user terminal 10a. In addition, it is assumed below that information is unicast between the user terminals 10a and 10b based on the communication data d30b illustrated in FIG. 19.

(Step S611)

The identification information acquisition unit 141 of the user terminal 10a acquires the user ID "B_account" and the device ID "B_dev_id" encrypted with the encryption key key_A from the user terminal 10b as the identification information for specifying the user terminal 10b.

The identification information acquisition unit 141 determines whether the acquired identification information indicates the "encryption account for internal record search" based on the ID type d110 acquired from the user terminal 10b. It is described herein that the acquired ID type d110 indicates the "encryption account for internal record search." The identification information acquisition unit 141 of the user terminal 10a decrypts the encrypted user ID "key_A:B_account" and the encrypted device ID "key_A:B_dev_id" with the decryption key corresponding to the user terminal 10a stored in the key information storage unit 143. Accordingly, the identification information acquisition unit 141 acquires the decrypted user ID "B_account" and device ID "B_dev_id."

(Step S612)

Note that, when the identification information notification unit 136 of the user terminal 10b unicasts the identification information for specifying the user terminal 10b to the user terminal 10a, the user terminal 10a may determine whether information acquired from the user terminal 10b is addressed to the user terminal 10a. In this case, the user terminal 10a may also determine whether information acquired from the user terminal 10b is addressed to the user terminal 10a according to, for example, whether its own information (that is, the user ID of the user ua and the device ID of the user terminal 10a) is set in the recipient information d330 of the communication data d30b (refer to FIG. 19). Also, when information stored in the recipient information d330 is encrypted with the service-specific encryption key key_S, the user terminal 10a may access the network service n0 and decrypt information encrypted with the encryption key key_S. Similarly, when information stored in the recipient information d330 is encrypted with the encryption key key_A corresponding to the user terminal a, the user terminal 10a may decrypt information encrypted with the encryption key key_A based on the decryption key corresponding to the user terminal a. Also, when the information acquired from the user terminal 10b is not addressed to the user terminal 10a, the user terminal 10a may transmit a rejection notice to the user terminal 10b and immediately terminate the communication sequence.

(Step S613)

The identification information acquisition unit 141 extracts a type of the network service n0 indicated by the ID type d110 and the encryption key associated with the decrypted user ID "B_account" and device ID "B_dev_id" from the key information storage unit 143. In this case, the encryption key key_B corresponding to the user terminal 10b is extracted.

(Step S614)

Also, the identification information acquisition unit 141 may update information about the extracted encryption key key_B. As a specific example, the identification information acquisition unit 141 may update the update date and time d442 associated with the extracted encryption key key_B in the management data d40 stored in the key information storage unit 143.

Also, the following processes are the same as those of "2.3. Communication sequences (method in which identification information is encrypted)" described above. Therefore, details will not be described.

As described above, when mutual authentication is performed based on the "method using a partner key," the user terminals 10a and 10b need not check whether the user terminals 10a and 10b are associated through the network service n0. Therefore, it is possible to restrict the number of times the user terminals 10a and 10b access the network service n0, compared to the "method in which identification information is not encrypted" and the "method in which identification information is encrypted." Accordingly, the user terminals 10a and 10b can reduce a load according to access to an external network such as the network service n0 when mutual authentication is performed.

2.5. Conclusion

As described above, in the wireless communication system according to the embodiment, either of the user terminals 10a and 10b (the user terminal 10a herein) acquires the encryption key key_B of the partner from the network service n0, encrypts its own encryption key key_A with the acquired encryption key key_B, and transmits the result to the partner. In addition, the user terminal 10b acquires the encrypted encryption key key_A from the user terminal 10a, decrypts the acquired encrypted encryption key key_A with its own decryption key, and thus acquires the encryption key key_A. Accordingly, since only the user terminal 10b may access the network service n0, it is possible to efficiently perform communication sequences between the user terminals 10a and 10b, compared to the wireless communication system according to the first embodiment.

3. Third Embodiment 3.1. Outline of Wireless Communication System

In the first and second embodiments, the user terminals 10a and 10b send the encryption key (public key) for encryption through the social graph in the network service n0 when the user terminals 10a and 10b communicate with each other. On the other hand, according to a security level of communication through the network service n0, information transmitted through the social graph in the network service n0 is not limited to the encryption key (public key). For example, in the first and second embodiments, information of the access point is transmitted and received by encrypted communication between the user terminals 10a and 10b but may be transmitted and received through the network service n0 when a security level of communication through the network service n0 is high. Therefore, in the third embodiment, a case in which the network service n0 is regarded as a communication route whose security is ensured and the user terminals 10a and 10b transmit and receive information for mutual authentication will be described.

Figure 23:
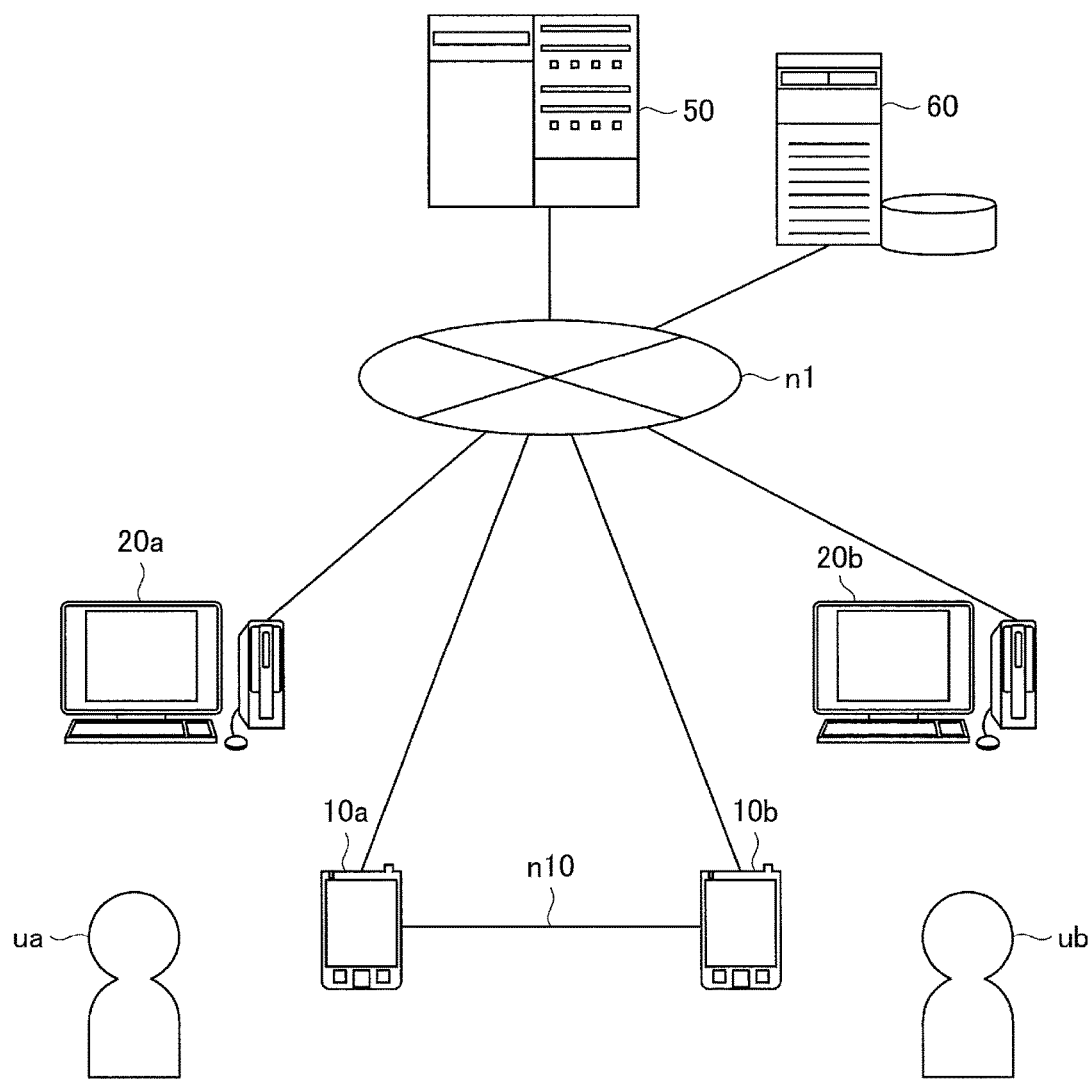
FIG. 23 is a diagram illustrating a schematic configuration of a wireless communication system according to a third embodiment of the present disclosure.

First, a schematic configuration of the wireless communication system according to the embodiment will be described with reference to FIG. 23. According to the embodiment the wireless communication system includes the server 50 and the user terminals 10a and 10b. The server 50 and the user terminals 10a and 10b are connected via a network n1. Also, the server 50, and the user terminals 10a and 10b are the same as those of the first and second embodiments described above. That is, the server 50 provides the network service n0, and the user terminals 10a and 10b can access the network service n0. In addition, the wireless communication system according to the embodiment may include a user terminal 20a, a user terminal 20b, and a file server 60. The user terminal 20a, the user terminal 20b, and the file server 60 can communicate with the server 50, the user terminal 10a, and the user terminal 10b via the network n1.

The user terminal 20a indicates a terminal that can be operated by the user ua and is different from the user terminal 10a. In addition, the user terminal 20b indicates a terminal that can be operated by the user ub and is different from the user terminal 10b. The user terminals 20a and 20b are configured as communication devices that can communicate with other communication devices directly (communication by interconnection) or indirectly (communication via a predetermined network such as the Internet), for example, personal computers (PCs) or smartphones.

The user terminals 20a and 20b may readably disclose information stored in themselves via a predetermined network. In this case, the user terminals 20a and 20b can set authentication information (for example, an ID and a password) for reading the information based on an instruction from a user of the information with respect to information stored in themselves. Accordingly, for example, the user ua stores his or her own information in the user terminal 20a and sets authentication information for reading the information. Therefore, when the user ua notifies the other user ub to whom he or she wants to disclose the information of the set authentication information, he or she can disclose the information to only the user notified of the authentication information.

The file server 60 indicates an external service that the users ua and ub access through communication devices (for example, the user terminals 10a, 10b, 20a, or 20b) that they operate and thus its own information is readably stored. The file server 60 can set authentication information (for example, an ID and a password) for reading the information based on an instruction from a user corresponding to the information with respect to information stored in itself. Accordingly, the users ua and ub stores its own information in the file server 60 and set authentication information for reading the information. Therefore, when the users ua and ub notify another user to whom they want to disclose the information of the set authentication information, they can disclose the information to only a user notified of the authentication information.

Figure 24:
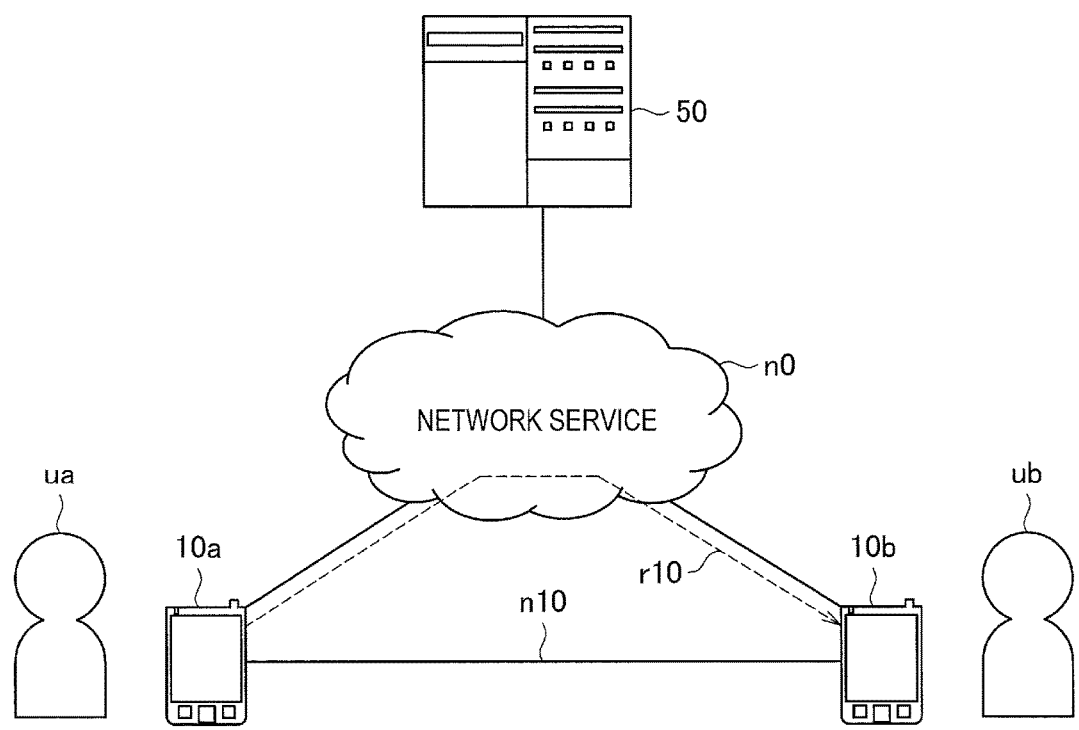
FIG. 24 is a diagram for describing a schematic operation of the wireless communication system according to the embodiment.

Next, a schematic operation of the wireless communication system according to the embodiment will be described with reference to FIG. 24. FIG. 24 is a diagram for describing a schematic operation of the wireless communication system according to the embodiment, and illustrates a case in which information is transmitted and received between the user terminal 10a and the user terminal 10b. The example illustrated in FIG. 24 illustrates a case in which the user terminal 10a and the user terminal 10b can access the same network service n0.

As illustrated in FIG. 24, in the wireless communication system according to the embodiment, the user terminal 10a and the user terminal 10b regard the network service n0 as a reliable communication route r10, and transmit and receive information for mutual authentication through the communication route r10.

As a specific example of information for mutual authentication, an encryption key (public key) owned by each of the user terminals 10a and 10b is exemplified as in the first and second embodiments. In addition, as another example, the user terminals 10a and 10b may transmit information for establishing interconnection with themselves such as information of the access point through the communication route r10 as information for mutual authentication. In addition, as another example, the user terminals 10a and 10b may transmit authentication information for reading information stored in the file server 60 (refer to FIG. 23) through the communication route r10 as information for mutual authentication.

3.2. Configuration of User Terminal

Next, a configuration of the user terminal 10 according to the embodiment will be described. In the wireless communication system according to the embodiment, in order for the plurality of user terminals 10 to determine whether partners can rely on each other, one user terminal 10 receives identification information for identifying the partner in the network service n0 from the other user terminal 10. This is the same as in the wireless communication system according to the above-described first and second embodiments. Hereinafter, in an example in which the user terminals 10a and 10b perform communication, the user terminal 10b will be described as a transmission side of identification information and the user terminal 10a will be described as a reception side of identification information.

(The User Terminal 10 at a Side from which Identification Information is Transmitted)

Figure 25:
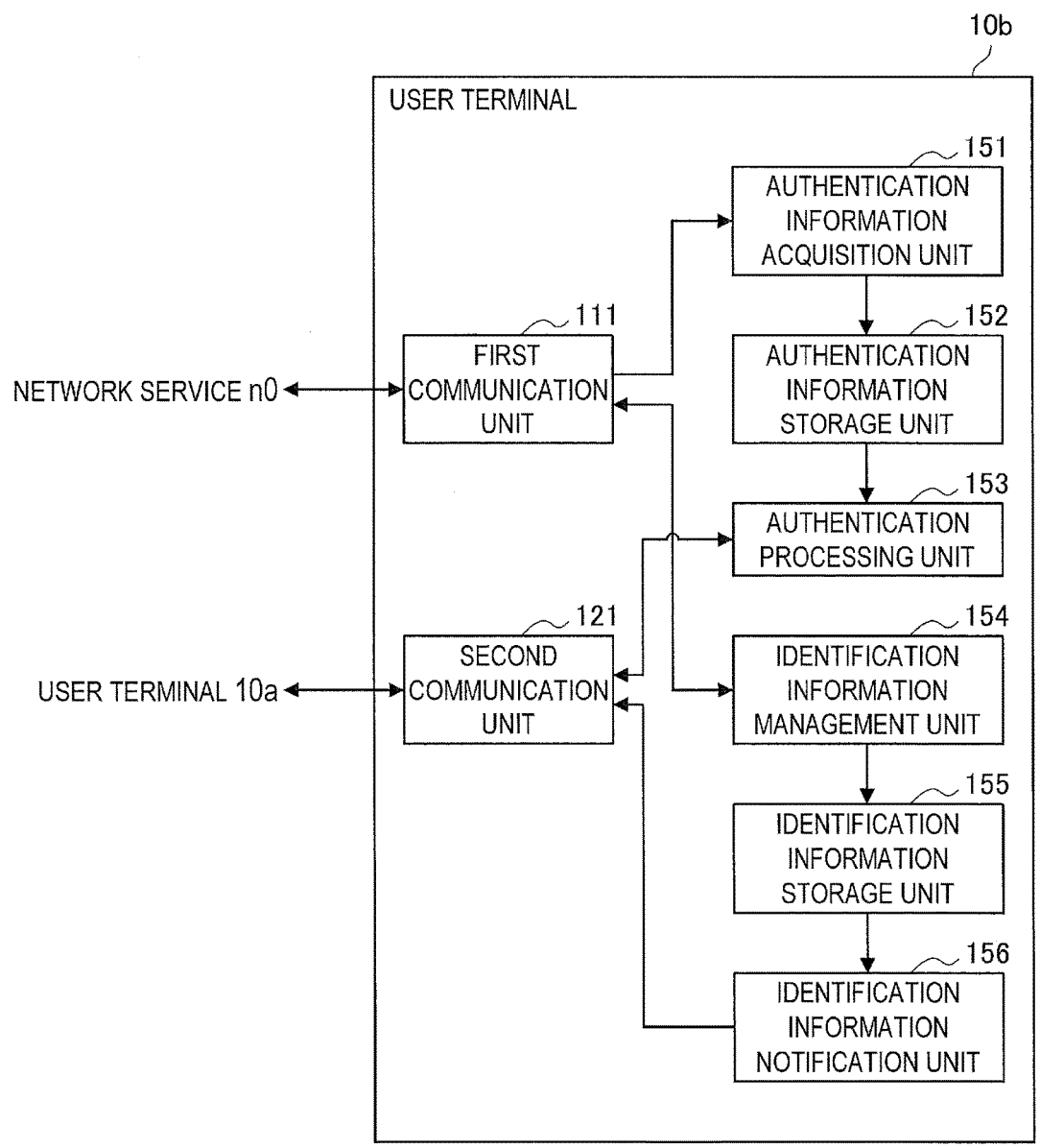
FIG. 25 is a block diagram illustrating a configuration of a user terminal according to the embodiment.

First, a configuration of the user terminal 10b at a side from which identification information is transmitted will be described with reference to FIG. 25. FIG. 25 is a block diagram illustrating a configuration of the user terminal 10b according to the embodiment and illustrates an exemplary configuration of the user terminal 10b at a side from which identification information is transmitted. As illustrated in FIG. 25, the user terminal 10b according to the embodiment includes the first communication unit 111, the second communication unit 121, an authentication information acquisition unit 151, an authentication information storage unit 152, an authentication processing unit 153, an identification information management unit 154, an identification information storage unit 155, and an identification information notification unit 156.

The first communication unit 111 is used for respective components in the user terminal 10b to communicate with other communication devices through infrastructure facilities such as a mobile communication network. Also, in FIG. 25, the first communication antenna 112 is not illustrated. In the wireless communication system according to the embodiment, the respective components in the user terminal 10b access the network service n0 through the first communication unit 111. Also, when the respective components in the user terminal 10b transmit and receive data to and from the network service n0, unless otherwise specified, it is assumed below that data is transmitted and received through the first communication unit 111.

The second communication unit 121 is used for the respective components in the user terminal 10b to interconnect with another user terminal 10 (for example, the user terminal 10a). Also, in FIG. 25, the second communication antenna 122 is not illustrated. When the user terminals 10a and 10b build the ad-hoc network, the respective components in the user terminal 10b access the user terminal 10a through the second communication unit 121. Also, when the respective components in the user terminal 10b transmit and receive data to and from another user terminal (for example, the user terminal 10a), unless otherwise specified, it is assumed below that data is transmitted and received through the second communication unit 121.

The identification information management unit 154, the identification information storage unit 155, and the identification information notification unit 156 are the same as the identification information management unit 134, the identification information storage unit 135, and the identification information notification unit 136 in the first and second embodiments described above, respectively. When the identification information management unit 154, the identification information storage unit 155, and the identification information notification unit 156 are operated, the owner information d10 of the user ub who is a user of the user terminal 10b is distributed to the user terminal 10a.

When the user ub is associated with the user ua of the user terminal 10a to whom owner information has been distributed in the network service n0, the authentication information acquisition unit 151 acquires information for mutual authentication through the social graph in the network service n0 from the user terminal 10a. As a specific example of information for mutual authentication, the encryption key key_A for performing encrypted communication with the user terminal 10a is exemplified. In addition, as another example, the authentication information acquisition unit 151 may acquire information for establishing communication with the user terminal 10a such as information of the access point as information for mutual authentication. In addition, as another example, the authentication information acquisition unit 151 may acquire a passphrase for accessing the user terminal 10a and the user terminal 20a as information for mutual authentication. In addition, as another example, the authentication information acquisition unit 151 may acquire authentication information for reading information of the user ua stored in the file server 60 as information for mutual authentication. In addition, as another example, the authentication information acquisition unit 151 may acquire information (hereinafter referred to as a "device password") for determining whether a partner of a communication destination can be relied on such as a device password in a Wi-Fi Simple Configuration (WSC) as information for mutual authentication.

The authentication information acquisition unit 151 stores the acquired information for mutual authentication in association with information (for example, the user ID and the device ID) for specifying the user terminal 10a in the authentication information storage unit 152. The authentication information storage unit 152 is a storage unit for storing information for mutual authentication acquired from the other user terminal 10.

The authentication processing unit 153 executes a process of authentication based on information for mutual authentication stored in the authentication information storage unit 152. As a specific example, when the encryption key key_A is stored in the authentication information storage unit 152, the authentication processing unit 153 executes a process for performing encrypted communication with the user terminal 10a based on the encryption key key_A.

In addition, as another example, when information of the access point of the user terminal 10a is stored in the authentication information storage unit 152, the authentication processing unit 153 establishes interconnection with the user terminal 10a based on information of the access point. That is, when the user terminals 10a and 10b are associated in the network service n0, the user terminal 10b can acquire information of the access point of the user terminal 10a through the network service n0 as a response to identification information.

In addition, as another example, when a passphrase for accessing the user terminal 10a is stored in the authentication information storage unit 152, the authentication processing unit 153 accesses the user terminal 10a using the passphrase. Also, this is similar to a case in which a passphrase for accessing the user terminal 20a is stored in the authentication information storage unit 152.

In addition, as another example, when authentication information for the file server 60 is stored in the authentication information storage unit 152, the authentication processing unit 153 requests authentication from the file server 60 based on the authentication information.

In addition, as another example, when the device password is stored in the authentication information storage unit 152, the authentication processing unit 153 may determine whether a partner (that is, the user terminal 10a) of a communication destination can be relied on using the device password.

As a specific example, when a communication path is encrypted by, for example, a Diffie-Hellman (DH) key agreement method, the authentication processing unit 153 may determine whether partners can rely on each other with the user terminal a based on the device password. In this case, the authentication processing unit 153 calculates a hash value from the device password and transmits the calculated hash value to the user terminal 10a. In addition, the authentication processing unit 153 receives the hash value calculated from the device password in the same manner from the user terminal 10a. The authentication processing unit 153 compares the hash value it has created from the device password with the hash value acquired from the user terminal 10a. In this case, the device password used by the authentication processing unit 153 to create the hash value is acquired from the user terminal 10a. Therefore, when a communication partner is the user terminal 10a (that is, a reliable partner), the hash value created by the authentication processing unit 153 from the device password matches the hash value acquired from the user terminal 10a. In this manner, the authentication processing unit 153 can determine whether a communication partner can be relied on (whether a partner is the user terminal 10a) based on the device password (that is, the device password acquired from the user terminal 10a) stored in the authentication information storage unit 152.

(The User Terminal 10 at a Side on which Identification Information is Received)

Figure 26:
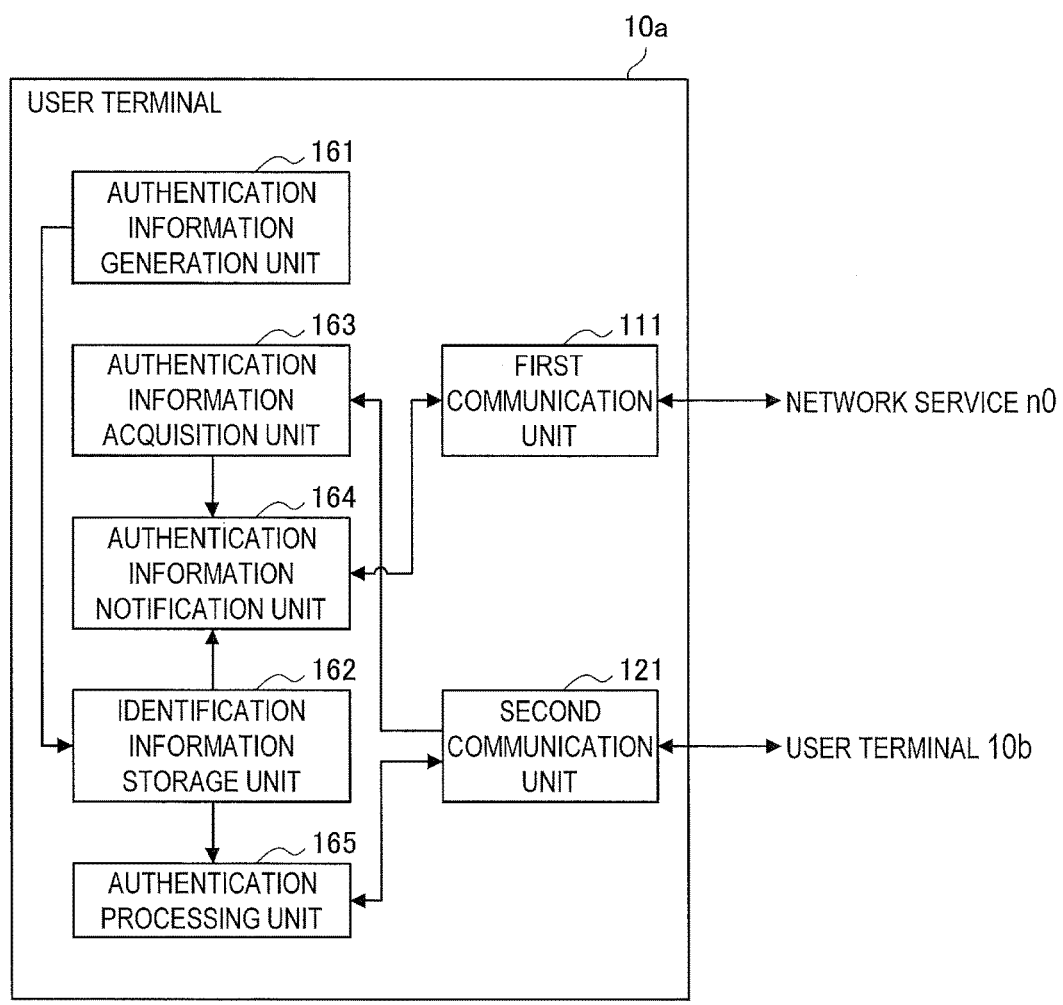
FIG. 26 is a block diagram illustrating a configuration of a user terminal according to the embodiment.

Next, a configuration of the user terminal 10a at a side on which transmitted identification information is received will be described with reference to FIG. 26. FIG. 26 is a block diagram illustrating a configuration of the user terminal 10a according to the embodiment and illustrates an exemplary configuration of the user terminal 10a at a side on which identification information is received. As illustrated in FIG. 26, the user terminal 10a according to the embodiment includes the first communication unit 111, the second communication unit 121, an authentication information generation unit 161, an authentication information storage unit 162, an identification information acquisition unit 163, an authentication information notification unit 164, and an authentication processing unit 165.

The first communication unit 111 is used for respective components in the user terminal 10a to communicate with other communication devices through infrastructure facilities such as a mobile communication network. Also, in FIG. 26, the first communication antenna 112 is not illustrated. In the wireless communication system according to the embodiment, the respective components in the user terminal 10a access the network service n0 through the first communication unit 111. Also, when the respective components in the user terminal 10a transmit and receive data to and from the network service n0, unless otherwise specified, it is assumed below that data is transmitted and received through the first communication unit 111.

The second communication unit 121 is used for the respective components in the user terminal 10a to interconnect with another user terminal 10 (for example, the user terminal 10b). Also, in FIG. 26, the second communication antenna 122 is not illustrated. When the user terminals 10a and 10b build the ad-hoc network, the respective components in the user terminal 10a access the user terminal 10b through the second communication unit 121. Also, when the respective components in the user terminal 10a transmit and receive data to and from another user terminal (for example, the user terminal 10b), unless otherwise specified, it is assumed below that data is transmitted and received through the second communication unit 121.

The authentication information generation unit 161 generates information for the user terminal 10a to perform mutual authentication with the other user terminal (for example, the user terminal 10b). As a specific example, similar to the key generation unit 131 according to the first and second embodiments, the authentication information generation unit 161 may generate an encryption key (for example, a public key) and a decryption key (for example, a secret key). In this case, the generated encryption key corresponds to information for mutual authentication. In addition, as another example, the authentication information generation unit 161 may generate information for the other user terminal 10 to establish communication with the user terminal 10a such as information of the access point. In addition, as another example, the authentication information generation unit 161 may generate a passphrase for accessing the user terminal 10a and the user terminal 10a. In addition, as another example, the authentication information generation unit 161 may generate or acquire (acquire from the file server 60) authentication information for reading information of the user ua stored in the file server 60.

The authentication information generation unit 161 stores the generated or acquired authentication information in the authentication information storage unit 162. The authentication information storage unit 162 is a storage unit for storing the generated authentication information.

The identification information acquisition unit 163 is the same as the identification information acquisition unit 141 according to the above-described first and second embodiments. That is, the identification information acquisition unit 163 acquires the owner information d10 from the other user terminal 10a and determines whether the user ua of the user terminal 10a is associated with the user of the user terminal 10 of the transmission source in the network service n0 based on the acquired owner information d10. Also, since a determination method is the same as that of the identification information acquisition unit 141, details will not be described.

The identification information acquisition unit 163 notifies the authentication information notification unit 164 of the user ID and device ID acquired from the user terminal 10b and the ID type d110 extracted from the owner information d10.

The authentication information notification unit 164 acquires the user ID, the device ID, and the ID type d110 from the identification information acquisition unit 163. The authentication information notification unit 164 accesses the network service n0 corresponding to the acquired ID type d110 and searches the acquired user ID and device ID through the social graph in the network service n0. In this case, when the user (for example, the user ub) indicated by the acquired user ID and the user ua of the user terminal 10a are associated in the network service n0, the authentication information notification unit 164 can specify the user ID and the device ID in the network service n0.

When the user ID and the device ID can be specified in the network service n0, the authentication information notification unit 164 reads authentication information stored in the authentication information storage unit 162. The authentication information notification unit 164 transmits the read authentication information to the user terminal 10b through the social graph in the network service n0. In this case, the social graph in the network service n0 corresponds to the communication route r10 in FIG. 24.

The authentication processing unit 165 executes a process of authentication for performing interconnection between the user terminal 10a and the other user terminal 10 (for example, the user terminal 10b). As a specific example, when the authentication information notification unit 164 transmits information of the access point to the user terminal 10b as authentication information, the authentication processing unit 153 of the user terminal 10b accesses the authentication processing unit 165 based on the authentication information. The authentication processing unit 165 compares authentication information (for example, information of the access point) presented by the authentication processing unit 153 with authentication information stored in the authentication information storage unit 162. When the authentication information presented by the authentication processing unit 153 is correct, the authentication processing unit 165 establishes interconnection between the user terminal 10a and the user terminal 10b.

Also, in the above-described example, when the user terminal 10 of the connection destination can be specified through the social graph in the network service n0, the authentication information notification unit 164 transmits authentication information to the user terminal 10 of the connection destination through the network service n0. On the other hand, the authentication information notification unit 164 may transmit authentication information that is addressed to the user terminal 10 of the connection destination through the network service n0 without searching the social graph in the network service n0. In this case, at a side of the network service n0, it is determined whether the user terminals 10 of the transmission source and the connection destination are associated in the network service n0. The user terminal 10 of the connection destination may be notified of authentication information only when the user terminals 10 are associated. In addition, when the user terminals 10 of the transmission source and the connection destination are not associated in the network service n0, the network service n0 may notify the user terminal 10 of the transmission source of an error indicating communication failure.

3.3. Conclusion

As described above, in the wireless communication system according to the embodiment, when the user terminals 10a and 10b are associated in the network service n0, the user terminals 10a and 10b regard the network service n0 as a communication route whose security is ensured. Therefore, the user terminals 10a and 10b transmit and receive information for mutual authentication through the social graph in the network service n0.

Accordingly, for example, the user terminal 10a can transmit information for establishing interconnection such as information of the access point to the other user terminal 10b through the social graph in the network service n0.

Accordingly, the user terminal 10b can establish interconnection with the user terminal 10a based on information of the access point acquired through the social graph in the network service n0.

In addition, as another example, the user terminal 10a can transmit a passphrase for accessing itself and the user terminal 20a to the other user terminal 10b through the social graph in the network service n0. Accordingly, the user terminal 10b can access the user terminal 10a and the user terminal 20a using the passphrase acquired through the social graph in the network service n0.

In addition, as another example, the user terminal 10a can transmit the encryption key key_A corresponding to the user terminal 10a to the other user terminal 10b through the social graph in the network service n0. Accordingly, the user terminal 10b can easily acquire the encryption key key_A corresponding to the user terminal 10a and perform encrypted communication with the user terminal 10a.

In addition, as another example, the user terminal 10a can transmit authentication information for reading information of the user ua from the external service such as the file server 60 to the other user terminal 10b through the social graph in the network service n0. Accordingly, the user terminal 10b can acquire information about the user ua from the external service such as the file server 60 based on the acquired authentication information.

In this manner, in the wireless communication system according to the embodiment, it is possible to mutually authenticate communication partners easily and safely between the user terminals 10a and 10b.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Also, a series of operations of the wireless communication system according to the embodiments described above can be implemented by a program for causing the CPU 101 of the user terminal 10 to be functioned. The program may be implemented to be executed through an operating system (OS) installed in the device (for example, the user terminal 10). In addition, as long as the program can be read by a device including a configuration executing the above-described processes, a storage location is not limited. For example, the program may be stored in a recording medium connected from the outside of the device. In this case, when the recording medium in which the program is stored is connected to the device, a CPU of the device may cause the program to be executed.

In addition, while the example in which the ad-hoc network is built between the user terminals 10 such as a smartphone has been described above, the terminal is not limited to the communication device such as a smartphone as long as it is a device capable of performing communication. For example, the user terminal 10 may be a home appliance such as a TV that can access a network.

Additionally, the present technology may also be configured as below.

(1)

An information processing device including:
an acquisition unit configured to acquire first identification information for identifying another terminal; and
a communication unit configured to transmit information for mutual authentication between an own terminal and the other terminal to the other terminal specified based on the first identification information through a network service.

(2)

The information processing device according to (1),
wherein, when the first identification information is associated with second identification information for identifying the own terminal in the network service, the communication unit transmits the information for mutual authentication to the other terminal specified based on the first identification information through the network service.

(3)

The information processing device according to (2),
wherein the information for mutual authentication includes an encryption key associated with the second identification information.

(4)

The information processing device according to (3), including:
a key generation unit configured to generate the encryption key and a decryption key decrypting information encrypted with the encryption key.

(5)

The information processing device according to (2),
wherein the information for mutual authentication includes a passphrase for mutual authentication.

(6)

The information processing device according to any one of (2) to (5),
wherein the first identification information includes a first user ID indicating a user of the other terminal.

(7)

The information processing device according to (6),
wherein the second identification information includes a second user ID indicating a user of the own terminal, and
wherein, when the first user ID is associated with the second user ID in the network service, the communication unit transmits the information for mutual authentication to the other terminal specified based on the first identification information through the network service.

(8)

The information processing device according to any one of (2) to (6),
wherein the first identification information includes a first device ID for uniquely specifying the other terminal.

(9)

The information processing device according to (8),
wherein the second identification information includes a second device ID for uniquely specifying the own terminal, and
wherein, when the first user ID is associated with the second user ID in the network service, the communication unit transmits the information for mutual authentication to the other terminal specified based on the first identification information through the network service.

(9)

A wireless communication system including:
a first information processing device; and
a second information processing device configured to wirelessly communicate with the first information processing device,
wherein the first information processing device includes
a first communication unit configured to transmit first identification information for specifying the first information processing device to the second information processing device, and wherein the second information processing device includes
an acquisition unit configured to acquire the first identification information, and
a second communication unit configured to transmit information for mutual authentication between the second information processing device and the first information processing device to the first information processing device specified based on the first identification information through a network service.

(10)

An information processing method including:
acquiring first identification information for identifying another terminal; and
transmitting information for mutual authentication between an own terminal and the other terminal to the other terminal specified based on the first identification information through a network service.

(11)

A program causing a computer to execute:
acquiring first identification information for identifying another terminal; and
transmitting information for mutual authentication between an own terminal and the other terminal to the other terminal specified based on the first identification information through a network service.

REFERENCE SIGNS LIST 10, 10a, 10b user terminal
20a, 20b user terminal
50 server
60 file server
102 memory
103 output unit
103 display unit
104 input unit
105 storage unit
106 interface
111 first communication unit
112 first communication antenna
121 second communication unit
122 second communication antenna
131 key generation unit
132 key information storage unit
133 authentication processing unit
134 identification information management unit
135 identification information storage unit
136 identification information notification unit
141 identification information acquisition unit
142 key acquisition unit
143 key information storage unit
144 authentication processing unit
151 authentication information acquisition unit
152 authentication information storage unit
153 authentication processing unit
154 identification information management unit
155 identification information storage unit
156 identification information notification unit
161 authentication information generation unit
162 authentication information storage unit
163 identification information acquisition unit
164 authentication information notification unit
165 authentication processing unit

The invention claimed is:

1. A device comprising:
processing circuitry configured to
acquire first identification information from a second device for identifying the second device from the device, the first identification information including a device identification and a user identification;
generate information for mutual authentication between the device and the second device;
encrypt the information using an encryption key associated with the second device;
transmit the encrypted information to the second device;
receive second encrypted information received from the second device;
decrypt the second encrypted information received from the second device using a decryption key associated with the device;
compare decrypted information with the information; and
establish a connection between the device and the second device when the decrypted information matches the information by sending encrypted access point information to the second device.

2. The information processing device according to claim 1,
wherein, when the first identification information is associated with second identification information for identifying the device in the network service, the processing circuitry transmits the information for mutual authentication to the second device based on the first identification information through the network service.

3. The information processing device according to claim 2,
wherein the information for mutual authentication includes an encryption key associated with the second identification information.

4. The information processing device according to claim 3,
wherein the processing circuitry is further configured to generate the encryption key and a decryption key decrypting information encrypted with the encryption key.

5. The information processing device according to claim 2,
wherein the information for mutual authentication includes a passphrase for mutual authentication.

6. The information processing device according to claim 2,
wherein the first identification information includes a first user ID indicating a user of the second device.

7. The information processing device according to claim 6,
wherein the second identification information includes a second user ID indicating a user of the device, and
wherein, when the first user ID is associated with the second user ID in the network service, the communication unit transmits the information for mutual authentication to the other terminal specified based on the first identification information through the network service.

8. The information processing device according to claim 2,
wherein the first identification information includes a first device ID for uniquely specifying the second device.

9. The information processing device according to claim 8,
wherein the second identification information includes a second device ID for uniquely specifying the device, and
wherein, when the first user ID is associated with the second user ID in the network service, the processing circuitry transmits the information for mutual authentication to the second device specified based on the first identification information through the network service.

10. A wireless communication system comprising:
a first device; and
a second device configured to wirelessly communicate with the first information processing device,
wherein the first device includes processing circuitry configured to
transmit first identification information for specifying the first device to the second device, and
wherein the first device includes processing circuitry configured to
acquire the first identification information, from the second device for identifying the second device from the device, the first identification information including a device identification and a user identification,
generate information for mutual authentication between the first device and the second device,
encrypt the information using an encryption key associated with the second device,
transmit the encrypted information to the second device,
receive second encrypted information received from the second device,
decrypt the second encrypted information received from the second device using a decryption key associated with the device,
compare decrypted information with the information, and
establish a connection between the device and the second device when the decrypted information matches the information by sending encrypted access point information to the second device.

11. An information processing method comprising:
acquiring first identification information from a second device for identifying the second device from a first device, the first identification information including a device identification and a user identification;
generating, using processing circuitry, information for mutual authentication between the first device and the second device;
encrypting the information using an encryption key associated with the second device;
transmitting the encrypted information to the second device;
receiving second encrypted information received from the second device;
decrypting the second encrypted information received from the second device using a decryption key associated with the device;
comparing decrypted information with the information; and
establishing a connection between the device and the second device when the decrypted information matches the information by sending encrypted access point information to the second device.

12. A non-transitory computer-readable recording medium having a program recorded thereon, the program for causing a computer to:
acquiring first identification information from a second device for identifying the second device from a first device, the first identification information including a device identification and a user identification;
generating information for mutual authentication between the first device and the second device;
encrypting the information using an encryption key associated with the second device;
transmitting the encrypted information to the second device;
receiving second encrypted information received from the second device;
decrypting the second encrypted information received from the second device using a decryption key associated with the device;
comparing decrypted information with the information; and
establishing a connection between the device and the second device when the decrypted information matches the information by sending encrypted access point information to the second device.

13. The device of claim 1, wherein the processing circuitry is further configured to
store the encryption key associated with the second device when the decrypted information matches the decrypted information.

14. The device of claim 1, wherein the processing circuitry is further configured to:
analyze the first identification information to determine a network service to which the second device belongs;
transmit the first identification information to the network service;
receive the encryption key associated with the second device from the network service when the device and the second device are associated within a social graph; and
receive a notification from the network service when the device and the second device are not associated within the social graph.

15. The device of claim 14, wherein the processing circuitry is further configured to:
send second identification information to the second device including a second network service to which the device belongs when information associated with the first identification information are stored in the device.

16. The device of claim 1, wherein the first identification information is encrypted with a key associated with the device.

17. The device of claim 1, wherein the processing circuitry is further configured to:
receive a beacon from the second device including a preamble, a header, and beacon information that includes service information, time information, a network attribute, the service information describes services that can be provided by the second device.

18. The device of claim 1, wherein the connection established is through an ad-hoc network.

* * * * *